(12) United States Patent
Convertino et al.

(10) Patent No.: US 12,248,888 B2
(45) Date of Patent: Mar. 11, 2025

(54) HYPERPARAMETER TUNING USING VISUAL ANALYTICS IN A DATA SCIENCE PLATFORM

(71) Applicant: Cloudera, Inc., Palo Alto, CA (US)

(72) Inventors: Gregorio Convertino, Sunnyvale, CA (US); Tianyi Li, Blacksburg, VA (US); Haley Allen Most, San Francisco, CA (US); Wenbo Wang, San Bruno, CA (US); Yi-Hsun Tsai, San Francisco, CA (US); Michael Tristan Zajonc, Oakland, CA (US); Michael John Lee Williams, Los Angeles, CA (US)

(73) Assignee: CLOUDERA, INC., Palo Alto, CA (US)

( * ) Notice: Subject to any disclaimer, the term of this patent is extended or adjusted under 35 U.S.C. 154(b) by 1157 days.

(21) Appl. No.: 16/138,684

(22) Filed: Sep. 21, 2018

(65) Prior Publication Data
US 2020/0097847 A1 Mar. 26, 2020

(51) Int. Cl.
*G06N 7/01* (2023.01)
*G06F 11/34* (2006.01)
(Continued)

(52) U.S. Cl.
CPC ............ *G06N 7/01* (2023.01); *G06F 11/3447* (2013.01); *G06F 16/904* (2019.01); *G06N 20/00* (2019.01)

(58) Field of Classification Search
CPC .......... G06N 7/005; G06N 20/00; G06N 7/01; G06F 16/904; G06F 11/3447
See application file for complete search history.

(56) References Cited

U.S. PATENT DOCUMENTS 10,810,491 B1 * 10/2020 Xia .......................... G06N 3/04
2016/0232457 A1 * 8/2016 Gray ...................... G06F 16/26
(Continued)

FOREIGN PATENT DOCUMENTS

WO WO-2018227277 A1 * 12/2018 ........... G06F 3/0482

OTHER PUBLICATIONS

Engdahl, S. (2008, June 7). Blogs. Amazon. Retrieved Jan. 29, 2022, from https://aws.amazon.com/blogs/aws/sagemaker-automatic-model-tuning/ (Year: 2018).*

(Continued)

*Primary Examiner* — Oluwatosin Alabi
*Assistant Examiner* — Adam C Standke
(74) *Attorney, Agent, or Firm* — Perkins Coie LLP

(57) ABSTRACT

Techniques are disclosed for facilitating the tuning of hyperparameter values during the development of machine learning (ML) models using visual analytics in a data science platform. In an example embodiment, a computer-implemented data science platform is configured to generate, and display to a user, interactive visualizations that dynamically change in response to user interaction. Using the introduced technique, a user can, for example, 1) tune hyperparameters through an iterative process using visual analytics to gain and use insights into how certain hyperparameters affect model performance and convergence, 2) leverage automation and recommendations along this process to optimize the tuning given available resources, 3) collaborate with peers, and 4) view costs associated with executing experiments during the tuning process.

29 Claims, 37 Drawing Sheets

(51) Int. Cl.
G06F 16/904 (2019.01)
G06N 20/00 (2019.01)

(56) References Cited

U.S. PATENT DOCUMENTS

2019/0050723 A1* 2/2019 Kong .................. G06N 3/08
2019/0228335 A1* 7/2019 Suzuki ............... G06F 16/3344
2019/0236487 A1* 8/2019 Huang ................. G06N 20/00

OTHER PUBLICATIONS

Bright Staff, A Single GUI for HPC Cluster Management. (Jan. 15, 2015). Retrieved Jan. 29, 2022, from https://www.brightcomputing.com/blog/a-single-gui-for-hpc-cluster-management (Year: 2015).*
Zhang, Haoyu, et al. "Slaq: quality-driven scheduling for distributed machine learning." Proceedings of the 2017 Symposium on Cloud Computing. 2017 (Year: 2017).*
Scatter plot matrices—R base graphs. Scatter Plot Matrices—R Base Graphs—Easy Guides—Wiki—STHDA. (May 18, 2017). Retrieved Jan. 29, 2022, from https://web.archive.org/web/20170518031739/http://www.sthda.com/english/wiki/scatter-plot-matrices-r-base-graphs (Year: 2017).*
Training visualization. (Jan. 19, 2018). Retrieved Jan. 29, 2022, from https://cran.r-project.org/web/packages/keras/vignettes/training_visualization.html (Year: 2018).*
Plotly. (Jan. 15, 2018). Plotly.js v1.32.0 is out! our largest release yet. Medium. Retrieved Jan. 29, 2022, from https://codeburst.io/notes-from-the-latest-plotly-js-release-b035a5b43e21 (Year: 2018).*
Willett et al. "CommentSpace: structured support for collaborative visual analysis." Proceedings of the SIGCHI conference on Human Factors in Computing Systems. 2011 (Year: 2011).*
Hope, T., Resheff, Y. S., & Lieder, I. (2017). Learning TensorFlow: A Guide to Building Deep Learning Systems. O'Reilly Media, Inc("Hope") (Year: 2017).*
Hope, T., Resheff, Y.S., & Lieder, I. Learning TensorFlow: A Guide to Building Deep Learning Systems. O'Reilly Media, Inc (Year: 2017).*
Willett et al. "CommentSpace: structured support for collaborative visual analysis." Proceedings of the SIGCHI conference on Human Factors in Computing Systems. (Year: 2011).*
Engdahl, S. Blogs. Amazon. Retrieved Jan. 29, 2022, from https://aws.amazon.com/blogs/aws/sagemaker-automatic-model-tuning/ (Year: 2018).*
Bright Staff, A Single GUI for HPC Cluter Management. Retrieved Jan. 29, 2022, from https://www.brightcomputing.com/blog/a-single-gui-for-hpc-cluster-management (Year: 2015).*
Zhang, Haoyu, et al. "Slaq: quality-driven scheduling for distributed machine learning." Proceedings of the 2017 Symposium on Cloud Computing (Year: 2017).*
Scatter plot matrices—R base graphs. Scatter Plot Matrices—R Base Graphs—Easy Guides—Wiki—STHDA. Retrieved Jan. 29, 2022 from https://web.archive.org/web/20170518031739/http://www.sthda.com/english/wiki/scatter-plot-matrices-r-base-graphs (Year: 2017).*
Training visualization. Retrieved Jan. 29, 2022 from https://cran.r-project.org/web/packages/keras/vignettes/training_visulization.html (Year: 2018).*
Plotly. (Jan. 15, 2018). Plotly.js v1.32.0 is out! our latest release yet. Medium. Retrieved Jan. 29, 2022, from https://codeburst.io/notes-from-the-latest-plotly-js-release-b035a5b43e21 (Year: 2018).*
M. Claesen, J. Simm, D. Popovic, Y. Moreau and D. Moor, "Easy Hyperparameter Search Using Optunity," Leuven Department of Electrical Engineering, (Dec. 2014).
D. Sacha, M. Sedlmair, L. Zhang, J.A. Lee., D. Weiskopf, S. North and D. Keim, "Human-Centered Machine Learning though Interactive Visualization: Review and Open Challenges," ESANN 2016 Proceedings (Apr. 2016).
D. Sacha, M. Sedlmair, L. Zhang, J.A. Lee, J. Peltonen, D. Weiskopf, S. North and D. Keim, "What you see is what you can change: Human-centered machine learning by interactive visualization," Neurocomputing 268 (2017) pp. 164-175.
J. Tsay, T. Mummert, N. Bobroff, A. Braz, P. Weterink, and M. Herzel, "Runway: machine learning model experiment management tool," SYSML '18, (Feb. 2018).
M. Sedlmair, C. Heinzl, S. Buckner, H. Piringer and T. Moller, "Visual Parameter Space Analysis: A Conceptual Framework," IEEE Transactions on Visualization and Computer Graphics, (2014).
J. Wang, L. Gou, H. Yang and H.-W. Shen, "GANViz: A Visual Analytics Approach to Understand the Adversarial Game," IEEE transactions on visualization and computer graphics, 24(6): 1905-1917, (Aug. 2015).
D. Yogatama and G. Mann, "Efficient Transfer Learning Method for Automatic Hyperparameter Tuning," Artificial Intelligence and Statistics, pp. 1077-1085 (2014).
S. Azfal, R. Maciejewski and D. Elbert, "Visual Analytics Decision Support Environment for Epidemic Modeling and Response Evaluation," Visual Analytics Science and Technology, 2011 IEEE Conference on, pp. 191-200, IEEE (2011).
R. Bardenet, M. Brendel, B. Kegl and M. Sebag, "Collaborative hyperparameter tuning," International Conference on Machine Learning, pp. 199-207 (2013).
J. Bergstra, R. Bardenet, Y. Bengio and B. Kegl, "Algorithms for Hyper-Parameter Optimization," Advances in neural information processing systems, pp. 2546-2554, (2011).
M. Claesen and B. DeMoor, "Hyperparameter Search in Machine Learning," MIC 2015; The XI Metaheuristics International Conference pp. 14-1-14-5, (Jun. 2015).
A. Coates, A. Ng and H. Lee, "An Analysis of Single-Layer Networks in Unsupervised Feature Learning," Proceedings of the 14th International Conference on Artificial Intelligence and Statistics, pp. 215-223 (2011).
J. Fogarty, D. Tan, A. Kapoor and S. Winder, "CueFlik: Interactive Concept Learning in Image Search," Proceedings of the Sigchi Conference on Human Factors in computing systems, pp. 29-38 (Apr. 2008).
R. Fong and A. Vevaldi, "Interpretable Explanations of Black Boxes by Meaningful Perturbation," University of Oxford (Jan. 2018).
C.-W.Hsu, C.-C. Chang and C.-J. Lin, "A Practical Guide to Support Vector Classification," Dept. of Computer Science, National Taiwan University, (May 2016).
F.Hutter, H.H. Hoos, K. Leyton-Brown and T. Stutzle, "ParamILS: An Automatic Algorithm Configuration Network," Journal of Artificial Intelligence Research, 36:267-306 2009 (Oct. 2009).
M. Liu, J. Shii, Z. Li, C. Li, J. Zhu and S. Liu, "Towards Better Analysis of Deep Convolutional Neural Networks," IEEE Transactions on Visualization and Computer Graphics, vol. 23, No. 1, 91-100 (Jan. 2017).
S. Liu, X. Wang, M. Liu and J. Zhu, "Towards better analysis of machine learning models: A visual analytics perspective," Visual Informatics 1 2017 48-56 (2017).
F. Pedregosa, G. Varoquaux, A. Gramfort, V. Micheli, B. Thirion, O. Grisel, M. Blondel, P. Prettenhoffer, R. Weiss, V. Dubourg, J. Vanderplas, A. Passos, D. Cournapeau, M. Brucher, M. Perrot and E. Duchesnay, "Skicit-learn: Machine Learning in Python," Journal of Machine Learning Research, 12(Oct): 2825-2830 (Oct. 2011).
N. Pinto, D. Doukhan, J. Dicarlo and D. D. Cox, A High-Throughput Screening Approach to Discovering Good Forms of Biologically Inspired Visual Presentation PLOS Computational Biology, (Nov. 2009).
K. Potter, A. Wilson, P.-T. Bremer, D. Williams, C. Doutriaux, V. Pascucci and C. R. Jonhson, "Ensemble-Vis: A Framework for the Statistical Visualization of Ensemble Data," 2009 International Conference of Data Mining Workshops, pp. 233-240 IEEE 12 2009, (2009).
A. L. Pretorius, M.-A. P. Bray, A. E. Carpenter, and R.A. Ruddle, "Visualization of Parameter Space for Image Analysis," IEEE Transactions on Visualization and Computer Graphics, (Dec. 2011).
M.T. Ribeiro, S. Singh and C. Guestrin, "Why should I trust you? Explaining the Predictions of any Classifier," Proceedings of the 22 ACM SIGKDD international conference on knowledge discovery and data mining, pp. 1135-1144 ACM 2016 (2016).

(56) References Cited

OTHER PUBLICATIONS

D. Sacha, H. Senaratne, B.C. Kwon, G. Ellis and D.A. Keim, "The Role of Uncertainty, Awareness, and Trust in Visual Analytics," IEEE Transactions on Visualization and Computer Graphics, 22(1):240-249, (Jan. 2016).

F.-Y. Tseng and K.-L. Ma, "Opening the Black-Box-Data Driven Visualization of Neural Networks," in Visualization 2005. VIS 05.IEEE, pp. 383-390 IEEE, (2005).

* cited by examiner

FIG. 17

| | |
|---|---|
| < Account | admin > Demo: CNN Model on MNIST |
| Overview | Demo: CNN Model on MNIST 🔒 |
| Sessions | Train a handwritten digit recognizer with CNN model and MNIST dataset for CloudBank |
| Experiments | Models |
| Models | This project has no models yet. Create a new model. |
| Jobs | Jobs |
| Files | This project has no jobs yet. Create a new job to document your analytics pipelines. |
| Team | Files |
| Settings | |

| | Name ∧ |
|---|---|
| ☐ | seaborn-data |
| ☐ | analysis_py |
| ☐ | README_md |

FIG. 19

THE MNIST DATABASE of handwritten digits

Status: 12/13 Experiments finished

View all Experiments — Epoch Observatory — 1906

| Experiment | Status | num_epochs | batch_size | dropoutRate | val_acc | val_loss |
|---|---|---|---|---|---|---|
| exp1 | Finished | 6 | 128 | 0.5 | 0.9 | 0.06 |
| exp2 | Finished | 6 | 56 | 0.5 | 0.9 | 0.04 |
| exp3 | Finished | 6 | 128 | 0.5 | 0.96 | 0.01 |
| exp4 | Finished | 12 | 128 | 0.5 | 0.81 | 0.47 |
| exp5 | Finished | 12 | 56 | 0.5 | 0.92 | 0.09 |
| exp6 | Finished | 12 | 128 | 0.5 | 0.96 | 0.03 |
| exp7 | Finished | 12 | 26 | 0.5 | 0.9 | 0.07 |
| exp8 | Finished | 12 | 26 | 0.5 | 0.94 | 0.07 |

Hyperparameters — 1902

Search

- batch_size  Tuned: 28 | 56 | 128   28 ─── 128   Lock
- num_epochs  Tuned: 6 | 12   6 ─── 12   Lock
- dropout_rate  Tuned: 0.3 | 0.5 | 0.7   0.3 ─── 0.7   Lock Show untuned hyperparameters

Metrics — 1904

Search

- accuracy   0.9 ─── 0.98   Set Rule
- loss   0.04 ─── 0.31   Set Rule validation accuracy

Metric Performance among Experiments — 1908

View by Experiments | View by Epoch

Performance of All Experiments in Current Run (bar chart with experiments 1–8, y-axis 0 to 1)

Experiment 3
Configuration

Script      bikeshare_v3.py
Arguments   1 3 4
Comment     testSnapshot04a8fe285c84076d5bf2971cc7be9e9210595128
Build       6/4/18 11:39 AM
Created At  admin
Submitter 2312 — Confusion matrix (Predicted vs Actual, 0–9)

|   | 0 | 1 | 2 | 3 | 4 | 5 | 6 | 7 | 8 | 9 |
|---|---|---|---|---|---|---|---|---|---|---|
| 0 | 954 | 0 | 2 | 7 | 1 | 10 | 6 | 3 | 7 | 3 |
| 1 | 0 | 1031 | 4 | 3 | 1 | 4 | 1 | 2 | 16 | 2 |
| 2 | 12 | 21 | 852 | 18 | 11 | 8 | (14) | 10 | 29 | 5 |
| 3 | 2 | 5 | 9 | 899 | 1 | 71 | 7 | 12 | 23 | 7 |
| 4 | 2 | 2 | 2 | 2 | 861 | 7 | 7 | 1 | 4 | 89 |
| 5 | 7 | 5 | 9 | 24 | 3 | 833 | 12 | 8 | 12 | 2 |
| 6 | 11 | 6 | 2 | 0 | 6 | 31 | 902 | 0 | 8 | 1 |
| 7 | 3 | 10 | 5 | 3 | 7 | 7 | 1 | 1041 | 0 | 14 |
| 8 | 2 | 28 | 4 | 29 | 2 | 31 | 1 | 9 | 882 | 21 |
| 9 | 7 | 3 | 1 | 7 | 10 | 11 | 1 | 44 | 4 | 873 |

2314 — 2 misclassified as 6

| 91% | 86% | 82% | 78% | 77% | 69% | 67% | 66% |
| 63% | 62% | 59% | 59% | 55% | 49% | | |

FIG. 23B

Run Parameters

Hyperparameters

2502 batch_size [Tuned: 28 | 56 | 128]
[128] —————————[256]————————— Step: [2*]

num_epochs [Tuned: 6 | 12]
[6] —————————[6]————————— Step: [0]

dropout_rate [Tuned: 0.3 | 0.5 | 0.7]
[0.5] —————————[0.5]————————— Step: [0.0]

Add more hyperparameters

[Save changes]  [Start run]  [Go back]

◁▷  2504

2 experiments scheduled

Run Parameters

Save changes | Start run | Go back

Hyperparameters batch_size [Tuned: 28 | 56 | 128]
128 — 256 — Step: 2* num_epochs [Tuned: 6 | 12]
6 — 6 — Step: 0 dropout_rate [Tuned: 0.3 | 0.5 | 0.7]
0.5 — 0.5 — Step: 0.0 num_layers [Tuned: 3]
3 — 12 — Step: 3

Number of Layers

8 experiments scheduled — 2508

| | | | | |
|---|---|---|---|---|
| python arguments.py | --batch_size 128 --num_epocs 12 --dropout_rate 0.5 --num_laye | Star | Skip | |
| | Same setting found in 1 previous run | | | |
| python arguments.py | --batch_size 128 --num_epocs 12 --dropout_rate 0.5 --num_laye | Star | Skip | |
| python arguments.py | --batch_size 128 --num_epocs 12 --dropout_rate 0.5 --num_laye | Star | Skip | |
| python arguments.py | --batch_size 128 --num_epocs 12 --dropout_rate 0.5 --num_laye | Star | Skip | |

Total | Duration | Cost — 2518

Resource Selection — 2516
Premises Cluster | Duration | Cost | Select
Cloud Cluster 1 | Duration | Cost | Select
Cloud Cluster 2 | Duration | Cost | Select

*FIG. 25D*

Run Parameters

Save changes   Start run   Go back

Hyperparameters batch_size  [Tuned: 28 | 56 | 128]
[ 128 ] —————————— [ 256 ]   Step: 2* num_epochs  [Tuned: 6 | 12]
[ 6 ] —————————— [ 6 ]   Step: 0 dropout_rate  [Tuned: 0.3 | 0.5 | 0.7]
[ 0.5 ] —————————— [ 0.5 ]   Step: 0.0 num_layers  [Tuned: 3]
[ 3 ] —————————— [ 12 ]   Step: 3

Number of Layers
[ ⟨⟩ ]

---

8 experiments scheduled  — 2508

| | | Recommendation |
|---|---|---|
| python arguments.py | --batch_size 128 --num_epocs 12 --dropout_rate 0.5 --num_laye | Star  Skip  ☐ |
| | Same setting found in 1 previous run | |
| python arguments.py | --batch_size 128 --num_epocs 12 --dropout_rate 0.5 --num_laye | Star  Skip  ✓ |
| python arguments.py | --batch_size 128 --num_epocs 12 --dropout_rate 0.5 --num_laye | Star  Skip  ☐ |
| python arguments.py | --batch_size 128 --num_epocs 12 --dropout_rate 0.5 --num_laye | Star  Skip  ✓ |

Experiment 1

| Script | bikeshare_v3.py |
|---|---|
| Arguments | 1 3 4 |
| Comment | test |
| Build | Snapshot04a8fe285c84076d5bf2971cc7be9e9210595128 |
| Created At | 6/4/18 11:39 AM |
| Submitter | admin |

2802

Predicted

| Actual | 0 | 1 | 2 | 3 | 4 | 5 | 6 | 7 | 8 | 9 |
|---|---|---|---|---|---|---|---|---|---|---|
| 0 | 954 | 0 | 2 | 7 | 1 | 10 | 6 | 3 | 7 | 3 |
| 1 | 0 | 1031 | 4 | 3 | 1 | 4 | 1 | 2 | 16 | 2 |
| 2 | 12 | 21 | 852 | 18 | 11 | 8 | (14) | 10 | 29 | 5 |
| 3 | 2 | 5 | 9 | 899 | 2 | 24 | 7 | 12 | 23 | 7 |
| 4 | 2 | 8 | 2 | 2 | 861 | 3 | 7 | 1 | 4 | 89 |
| 5 | 7 | 5 | 9 | 71 | 3 | 833 | 12 | 8 | 12 | 2 |
| 6 | 11 | 6 | 2 | 0 | 6 | 31 | 902 | 0 | 8 | 1 |
| 7 | 3 | 10 | 5 | 3 | 7 | 7 | 1 | 1041 | 0 | 14 |
| 8 | 2 | 28 | 4 | 29 | 2 | 31 | 1 | 9 | 882 | 21 |
| 9 | 7 | 3 | 1 | 10 | 11 | 1 | 1 | 44 | 4 | 873 |

2 misclassified as 6

| | | | | | |
|---|---|---|---|---|---|
| 91% | 86% | 82% | 78% | 77% | 69% | 67% | 66% |
| 63% | 62% | 59% | 59% | 55% | 49% |

Experiment 2

| Script | bikeshare_v3.py |
|---|---|
| Arguments | 1 3 5 |
| Comment | test |
| Build | Snapshot04a8fe285c84076d5bf2971cc7be9e9210595128 |
| Created At | 6/4/18 14:19 AM |
| Submitter | admin |

2804

Predicted

| Actual | 0 | 1 | 2 | 3 | 4 | 5 | 6 | 7 | 8 | 9 |
|---|---|---|---|---|---|---|---|---|---|---|
| 0 | 954 | 0 | 12 | 2 | 2 | 7 | 11 | 3 | 2 | 7 |
| 1 | 0 | 1031 | 21 | 5 | 8 | 5 | (2) | 10 | 28 | 3 |
| 2 | 2 | 4 | 852 | 9 | 2 | 9 | 5 | 5 | 4 | 1 |
| 3 | 7 | 3 | 18 | 899 | 2 | 24 | 3 | 3 | 29 | 7 |
| 4 | 1 | 1 | 11 | 1 | 861 | 3 | 6 | 7 | 2 | 10 |
| 5 | 10 | 4 | 8 | 71 | 7 | 833 | 31 | 1 | 31 | 11 |
| 6 | 6 | 1 | 14 | 0 | 7 | 12 | 902 | 1 | 1 | 1 |
| 7 | 3 | 2 | 20 | 12 | 1 | 8 | 0 | 1041 | 9 | 44 |
| 8 | 7 | 16 | 29 | 23 | 4 | 12 | 8 | 1 | 882 | 4 |
| 9 | 3 | 2 | 5 | 89 | 89 | 2 | 1 | 14 | 21 | 873 |

2 misclassified as 6

HYPERPARAMETER TUNING USING VISUAL ANALYTICS IN A DATA SCIENCE PLATFORM

TECHNICAL FIELD

The present disclosure relates to machine learning (ML) technology, more specifically to techniques and tools for hyperparameter tuning in the development of ML models.

BACKGROUND

The increasing availability of big data is invigorating the more prevalent use of ML models among a wide variety of users to solve real-world problems. As the demand for application-specific ML models increases, tools to enable users to efficiently and confidently build ML models have become increasingly important.

When implementing some ML models, data science and/or ML professionals must set values for certain parameters referred to as "hyperparameters" that configure the structure and other characteristics of the ML models. Hyperparameters define higher-level model properties and are generally set before models are trained using datasets. Hyperparameters can include, for example, a learning rate for a model, the number of layers or a dropout rate in a deep neural network, the number of clusters for a k-means clustering model, the number of trees or depth of a random forest classifier, etc. Hyperparameter tuning (also referred to as "hyperparameter optimization" or "hyperparameter searching") refers to the process of selecting an optimal set of hyperparameter values for a given ML model.

BRIEF DESCRIPTION OF THE DRAWINGS

FIG. 17 shows a view of an example ML model project overview screen in an example graphical user interface (GUI);

FIG. 19 shows an example hyperparameter tuning dashboard in the example GUI;

FIG. 23B shows a detail of an example interactive confusion matrix visualization in the example hyperparameter tuning dashboard in the example GUI;

FIGS. 25A-25E show details of example GUI elements for setting up a new batch of experiments;

FIG. 28 shows a detail of an example interactive experiment comparison visualization in the example hyperparameter analytics dashboard in the example GUI.

DETAILED DESCRIPTION

Overview

Figure 1:
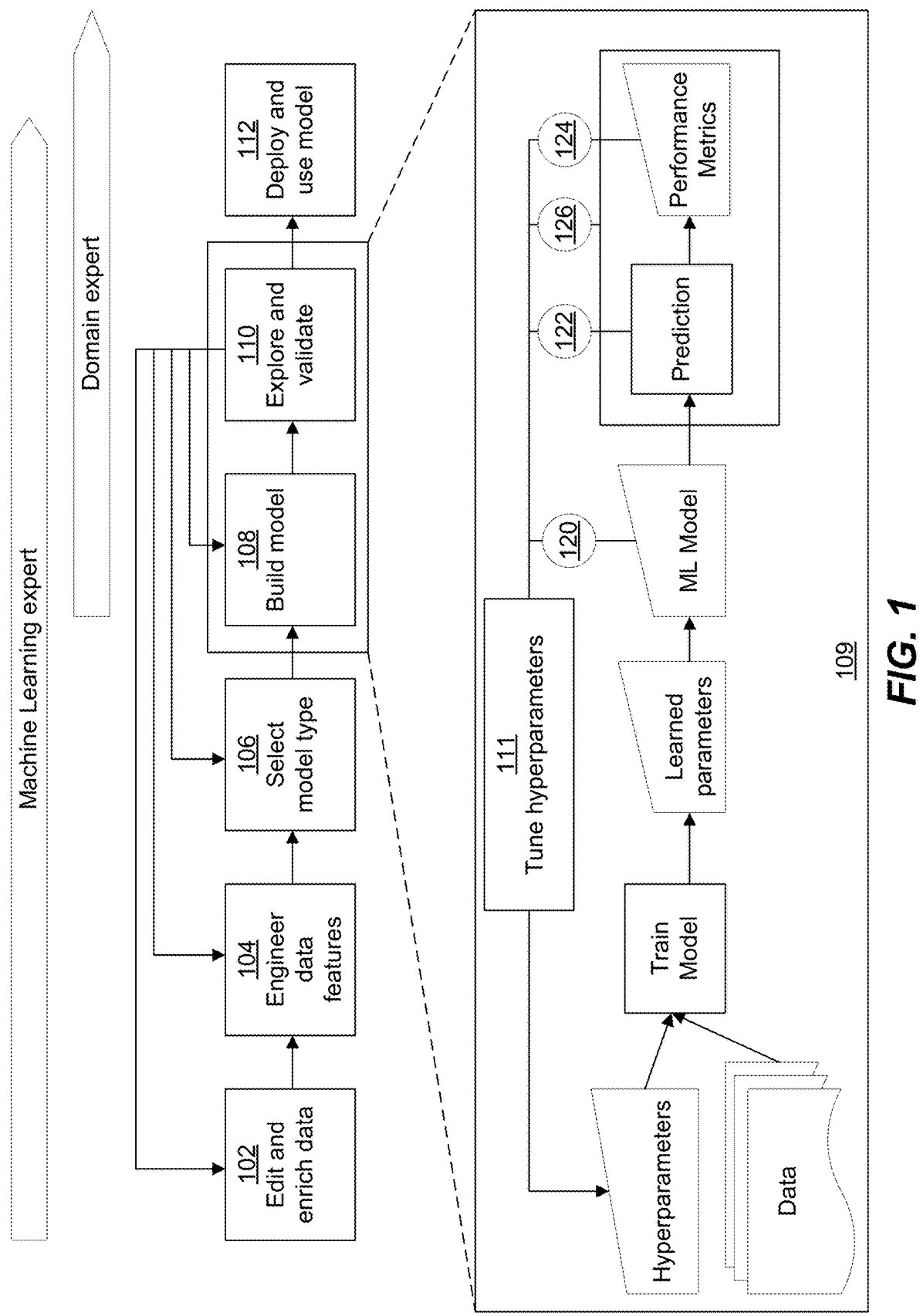
FIG. 1 shows a flow diagram of an example ML model development and deployment workflow.

Building suitable ML models typically involves an iterative process, which can be time consuming an expensive. The process for developing ML models generally includes data preparation, feature engineering, model building, hyperparameter tuning, script debugging and adjustment, validation and robustness checks, and other project-specific tasks.

Hyperparameters, such as the number of layers or the dropout rate, can dramatically affect the performance of ML models. Hyperparameter tuning, to improve performance, is therefore critical to the successful implementation of ML models. To configure an ML model to work well in practice, hyperparameters should be tuned when training the model. Evaluating the effect of a given hyperparameter setting is expensive since it usually requires the model to be trained and tested, which can be time consuming and computationally expensive. Further, the optimal value for a particular hyperparameter may differ depending on a number of factors such as the values set for other hyperparameters, the underlying datasets used to train the model, the goals associated with implementation of the model, etc. These multiple, often random, factors impacting the effect of hyperparameter settings can make the process of evaluation of hyperparameter settings difficult.

Existing techniques for hyperparameter tuning can generally be divided into two categories: 1) fully automated approaches based, for example, on ML and/or artificial intelligence (AI), and 2) human-in-the-loop approaches that rely on human users to set and experiment with hyperparameter values to arrive at optimal settings. While there have been advancements in automated approaches, such approaches can be impractical and/or inapplicable in certain scenarios. For example, an exhaustive grid search is computationally expensive, time-consuming, and typically not practical or scalable. As another example, random search and surrogate-based model optimization usually requires a broad set of trials for a given data set (again, computationally expensive and time consuming). Furthermore, implementing such automated approaches usually requires writing additional scripts and an in-depth understanding of machine learning, which can hinder novice practitioners with less expertise in ML models. Accordingly, the current reality of hyperparameter tuning is a highly human-driven 'art.' Hyperparameter tuning is currently usually performed manually by data science practitioners following rules-of-thumb and domain knowledge accumulated through experience. Such a process, based on trial and error, is inefficient and does not facilitate reproducibility, knowledge transfer, or collaboration. As a result, current hyperparameter tuning processes remain error-prone and time consuming.

To address the problems with existing processes for hyperparameter tuning, a technique is introduced that enables users (e.g., data science and/or ML professionals) to: 1) tune hyperparameters through an iterative process using visual analytics to gain and use insights into how certain hyperparameters affect model performance and convergence, 2) leverage automation and recommendations along this process to optimize the tuning given available resources, and 3) collaborate with their peers.

Machine Learning Model Development and Deployment Workflow

FIG. 1 shows a flow diagram of steps in an example ML model development and deployment workflow, according to some embodiments. The example ML model development and deployment workflow may begin with acquiring, cleaning, transforming, enriching, or otherwise preparing available data to be used with the ML model (step 102). Next, certain relevant features may be engineered, for example, based on defined goals of the ML model (e.g., predicting a customer churn based on customer data) (step 104). Next, a type of ML model to be used is selected (step 106). The type of ML model selected will depend on characteristics of the data as well as the defined goals of the ML model. Example ML model types include neural networks, clustering models, decision trees, random forest classifiers, etc. Once an ML model type is selected, the ML model is built (step 108), for example, by setting values for one or more hyperparameters, and then validated (step 110), for example, by training and testing the model using at least some of the available data. If not satisfied with the results of the ML validation process, the developer of the ML model can iteratively return to any of the previous steps, for example, to modify the available data, chose a different ML type, or set different hyperparameters values. Finally, once the ML model developer is satisfied with the results generated by the ML model, the ML model can be deployed and used (step 112), for example, by sharing with other data analysts and domain experts or by embedding the ML model into a business process.

The technique disclosed herein focuses primarily on hyperparameter tuning which typically falls under steps 108 and 110 in the workflow depicted in FIG. 1. For example, FIG. 1 depicts a sub process 109 by which data and hyperparameter settings are used to perform model training. This training of the ML model results in learned parameters which along with the hyperparameters define the properties of the ML model. Once parameters and hyperparameters are set, the ML model can be validated by analyzing certain performance metrics based on predictions.

Based on the results of the validation process, hypermeter values are iteratively adjusted (step 111). The hyperparameters can therefore be conceptualized as adjustable knobs that enable a developer to steer the resulting ML model and performance. FIG. 1 further depicts several leverage points that support this process of hyperparameter tuning. A first leverage point 120 provides a visualization of the structure of the ML model. As an illustrative example, a visualization of a neural network may include a visualization that relates the processing of certain data features to certain layers in the neural network. Another leverage point 122 provides for learning a local model around model prediction. For example, a local model may learn what features an image recognition model relies on to classify a given image. Another leverage point 124 provides for algorithmically optimizing hyperparameter values with an objective function. In some embodiments, the introduced technique treats the ML model as a black box and involves combining leverage points 122 and 124 (collectively leverage point 126) using interactive visual analytic tools to support hyperparameter tuning.

Hyperparameter Tuning Workflow

Figure 2:
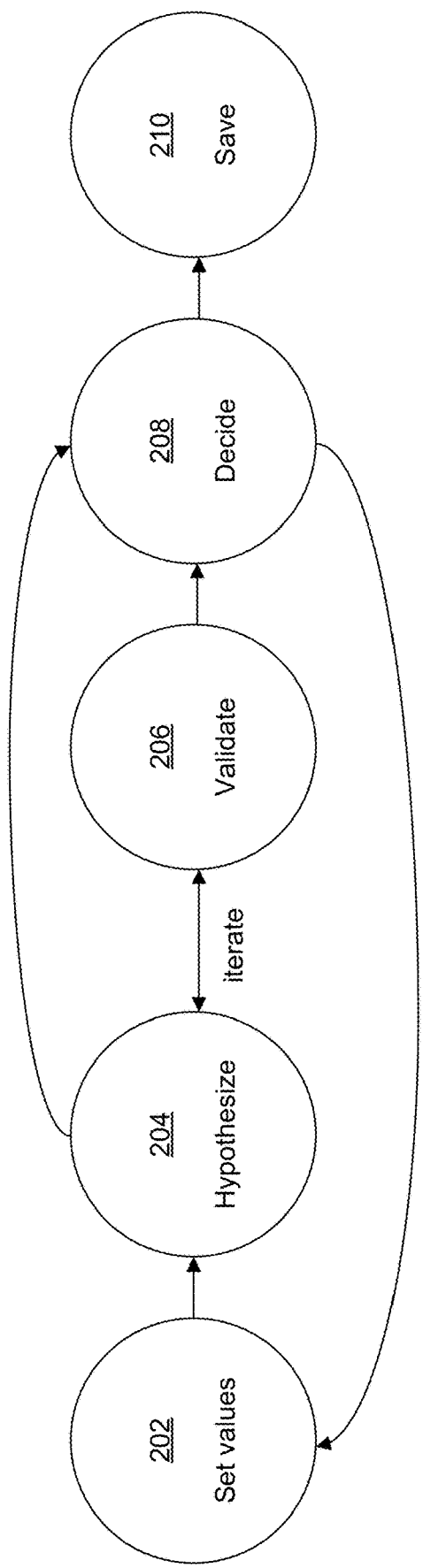
FIG. 2 shows a flow diagram of an example hyperparameter tuning workflow.

FIG. 2 shows a flow diagram of an example hyperparameter tuning workflow in accordance with certain embodiments of the introduced technique.

Step 202 includes setting hyperparameter values for an ML model. This initial step may rely on the knowledge and expertise of the user (e.g., a data science or ML professional) to set initial hyperparameter values based, for example, on their understanding of the data, the problem to be solved using the data, and the model type being utilized. Due to the iterative nature of the process, this step of setting hyperparameter values may be repeated after subsequent steps in the hyperparameter tuning process.

Step 204 includes hypothesizing the impact of tuned hyperparameters using results of one or more experiments run using the ML model on the data. At this stage a user has run a batch of experiments (described in more detail later) using a set of hyperparameter values and is seeking answers to questions such as 1) "is a particular hyperparameter relevant to the results and the performance of the ML model?", and 2) "which of the one or more potential hyperparameters has the greatest impact on the results and the performance of the ML model?" This step may be performed with the support of summative reports on the hyperparameters and resulting performance metrics for batches of experiments.

Step 206 includes validating hypotheses formed at step 204 using details of the experiments. For example, while testing a general hypothesis, a user may drill down into specific experiments to determine, for example, 1) what the details of a given experiment say about the hypotheses, and 2) whether the predictions generated using the current state of a given ML model can be trusted by looking at the results. The combination of steps 204 and 206 represent an in-depth iterative investigation. Steps 204 and 206 may be iteratively performed with the support of detailed reports on hyperparameters and performance metrics from individual experiments.

Step 208 includes deciding if additional tuning of one or more hyperparameters is needed. Once a user has gathered evidence through hypotheses and validation from a current batch of experiments, the user then decides, for example, 1) whether the ML model in its current state meets expectations, 2) whether additional training will improve the performance of the ML model, and 3) whether additional tuning of the hyperparameters is worth the effort, given limited available resources to run additional experiments. This step may be performed with the support of summative and detailed reports from steps 204 and 206.

Step 210 involves reviewing and saving progress results. If a user decides, at step 208, that no additional hyperparameter tuning is needed, the user may save the results (i.e., the optimized hyperparameter values) for communication to other users (e.g., other data science and/or ML professionals) and/or implementation in the ML model. In performing this step, a user may consider, for example, 1) whether the hyperparameter tuning process can be reproduced and/or communicated to other users, 2) the utility of the record of the tuning process, 3) what other details are missing, and/or 4) what details are superfluous. Step 210 may be performed with the support of a final project-level report summarizing all the experiments from all batches plus any comments or reminders recorded by the user during the tuning process.

Example Operating Environment

Figure 3:
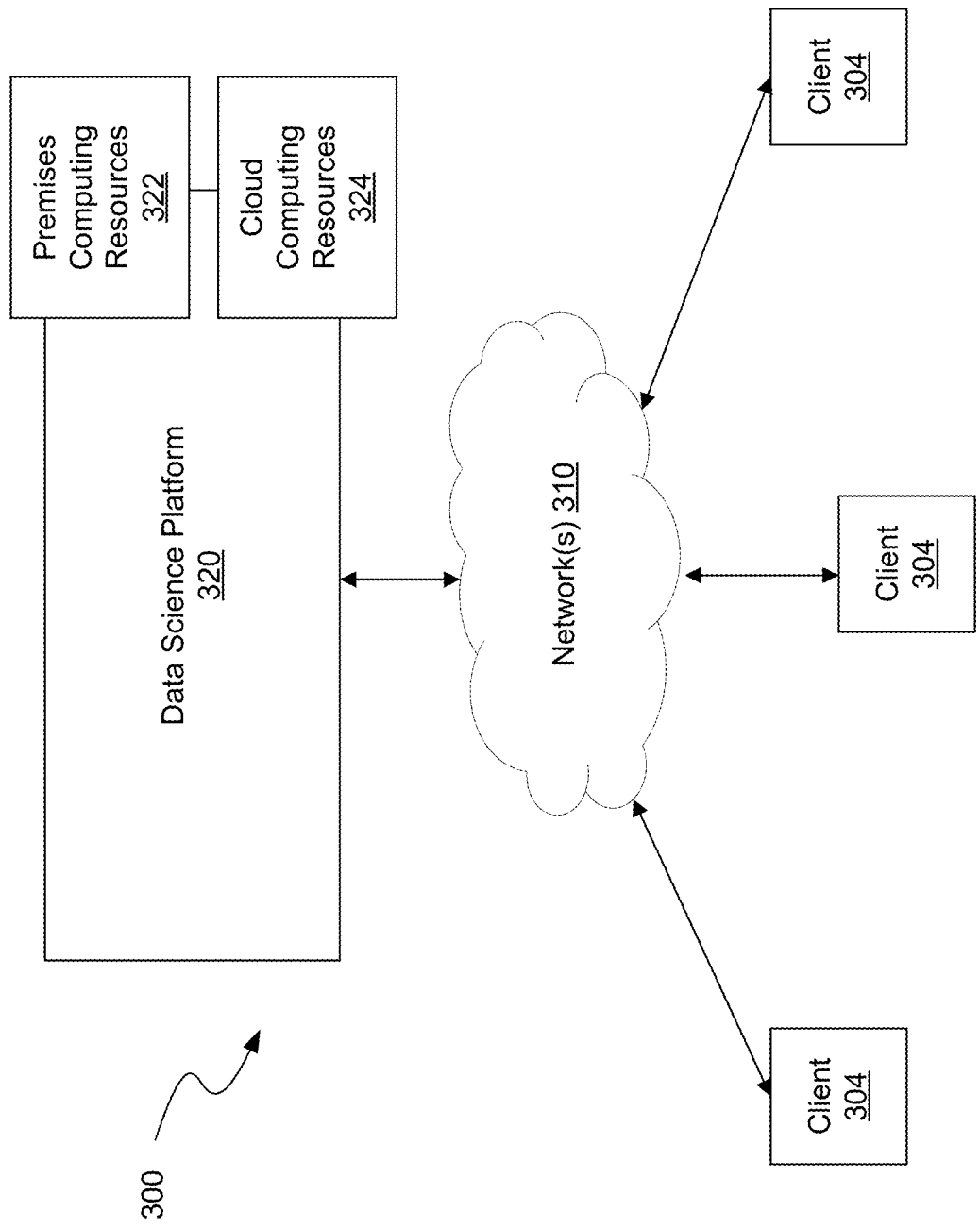
FIG. 3 shows a diagram of an example networked computing environment in which the introduced technique can be implemented.

FIG. 3 shows a diagram of an example networked computing environment 300 in which the introduced technique can be implemented. The example environment 300 includes computing devices associated with a data science platform (herein, "DS platform") 320 and one or more clients that 304 access the services provided by the DS platform 320. In some embodiments, the computing devices associated with each of these entities/systems may communicate with each other over one or more communications networks 310. Alternatively, in some embodiments, the DS platform 320 may be implemented locally at any one of the devices associated with clients 304.

The DS platform 320 may represent any combination of hardware and/or software for executing instructions to carry out the functionalities described herein. For example, the DS platform 320 may be implemented using one or more network connected server computer systems (physical or virtual) with associated non-transitory processor-readable storage media or other data storage facilities. For example, one or more databases for storing data (including metadata) may be accessible to the server computer systems. Instructions for carrying out certain processes described herein may be implemented as software instantiated in a computer-readable medium or computer-readable storage medium on a machine, in firmware, in hardware, in a combination thereof, or in any applicable known or convenient device or system. This and other modules, sub-modules, or engines described in this specification are intended to include any machine, manufacture, or composition of matter capable of carrying out at least some of the functionality described implicitly, explicitly, or inherently in this specification, and/or carrying out equivalent functionality.

In some embodiments, the DS platform 320 comprises an internet-based web service and/or a cloud-computing service. For example, the DS platform 320 may be implemented (at least partially) in instructions executed by computing entities in a cloud-computing environment. Such a cloud-computing environment may be hosted by a third-party cloud-computing provider. For example, Amazon™ offers cloud computing services as part of the Amazon Web Services (AWS) platform. One or more of the functionalities of the DS platform 320 may be implemented using products and services associated with a cloud-computing platform such as Amazon™ AWS. In an illustrative embodiment, computing functionality is provided using virtual computing entities (e.g., Amazon™ EC2 virtual server instances and or Lambda event-based computing instances) executing across one or more physical computing devices and storage functionality is provided using scalable cloud-based storage (e.g., Amazon™ S3 storage) and/or managed databases, data warehouses, etc. (e.g., Amazon™ Aurora, Amazon™ DynamoDB, Amazon™ Redshift, Google™ Spanner, etc.).

Various users may use computing devices to interact with and access the services of the DS platform 320. The users and associated computing devices are represented in FIG. 3 as clients 304. Users, in this context, may include, for example, data science professionals, ML professionals, DS platform administrators, etc. In some embodiments, computing devices may execute an application or "app" that communicates with the DS platform 320 via any suitable communications interface. In some embodiments, interaction between an application instantiated at a computing device and the DS platform 320 may be via an application programming interface (API). Computing devices may include any number of types of devices configured to process data and communicate with other devices via one or more communications networks 310. Examples of such devices include desktop computers, laptop computers, smart phone devices, tablet devices, digital assistant devices (e.g., Amazon Echo™), wearable computing devices, smart televisions, video game consoles, etc.

The various systems, subsystems, and/or processor-based devices are capable of communications, for example, via the one or more communications networks 310. The one or more communications networks 310 can include, for example, a wired or wireless local area network (LAN), a wired or wireless wide area network (WAN), a cellular data network, or any combination or variation thereof. Further, the one or more networks can include open networks (e.g., the Internet) and/or private network (e.g., an intranet and/or the extranet). For example, the Internet can provide file transfer, remote log in, email, news, RSS, cloud-based services, and other services through any known or convenient protocol, such as, but is not limited to, the TCP/IP protocol, Open System Interconnections (OSI), FTP, UPnP, etc. The one or more communications networks 310 can include any collection of distinct networks operating wholly or partially in conjunction to provide connectivity to the computing devices associated with the example environment 300 depicted in FIG. 3 and may appear as one or more networks to the serviced devices. In one embodiment, communications to and from computing devices can be achieved by an open network, such as the Internet, or a private network, such as an intranet and/or the extranet. In one embodiment, communications can be achieved by a secure communications protocol, such as secure sockets layer (SSL), or transport layer security (TLS). The type of communications infrastructure should not be considered limiting Data Science Platform The DS platform 320 shown in FIG. 3 may comprise computing tools and resources that enable users (e.g., data science and ML professionals) to manage their own analytics pipelines, thereby accelerating ML projects from exploration to production. In some embodiments, the DS platform 320 can be configured to enable users to bring their existing skills and tools to run computations on data to facilitate the development of ML models. For example, the DS platform 320 may provide on-demand access to computing resources on which models can be trained, deployed, and managed.

To facilitate a workflow for developing and deploying ML models, the DS platform 320 provides tools that enable users to, for example, explore and analyze data, deploy automated processing pipelines for performing batch computing jobs, train and evaluate ML models through running experiments comprising batch computing jobs, and deploy ML models once developed. Users may access such tools through an interactive user interface, for example, provided via a web browser or an application at a client device.

In some embodiments, the DS platform 320 may include a job and pipeline scheduling system that enables users to automate analytics workloads and that supports, for example, real-time monitoring, job history, and notifications. In the context of this disclosure, a "job" generally refers to any unit of computer processing implemented as part of the workflow for developing and deploying ML models. In certain embodiments, a job may specifically refer to a set of automated processing tasks that may include, for example, launching a processing engine to run a script, processing data using the launched engine according to the script, and tracking results of the processing. All of the processing tasks associated with a particular job may comprise a single batch process.

Developing an ML model often involves iteratively experimenting with datasets, features, model algorithms, and parameters such as hyperparameters. To support this iterative process, the DS platform 320 can be configured to support running and repeating versioned experiments in parallel and on demand, as users analyze results and modify certain aspects of the ML model (e.g., through hyperparameter tuning). In the context of this disclosure, an "experiment" generally refers to any data processing workload that enables users to compare versioned reproduceable ML models. For example, in some embodiments, an experiment may comprise a non-interactive batch execution script that is versioned across inputs (e.g., hyperparameters), project files, and outputs. An example experiment workflow, as applied using DS platform 320, may include creating, selecting, or otherwise defining a script that will be executed as part of the experiment, selecting or otherwise defining input parameters (e.g., hyperparameters), generating an executable file for running the experiment based on the script and input parameters, and executing the file to run the experiment. As mentioned, the experiments may be versioned which allows users to track different versions of ML model code, input parameters (e.g., hyperparameters), and model outputs (e.g., performance metrics and other ML model results and artifacts).

The DS platform 320 may include or access different types of computing resources, for example, to perform the processing of data when executing experiments. As shown in FIG. 3, the computing resources may include on-premises computing resources 322 and/or off-premises computing resources such as cloud-computing resources 324. As will be described in more detail below, in some embodiments, the computing resources utilized to execute experiments (premises and/or cloud-based) may be configured based on a distributed computing architecture.

Distributed Computing Architecture

In some embodiments, the introduced technique for hyperparameter tuning can be implemented using a distributed computing architecture. A person having ordinary skill in the art will recognize that a distributed computing environment is not required to perform processes in accordance with certain embodiments of the introduced technique; however, the parallel processing capabilities of a distributed computing environment may be particularly suited to efficiently process large amounts of data, for example, to run experiments as part of a hyperparameter tuning process.

Figure 4:
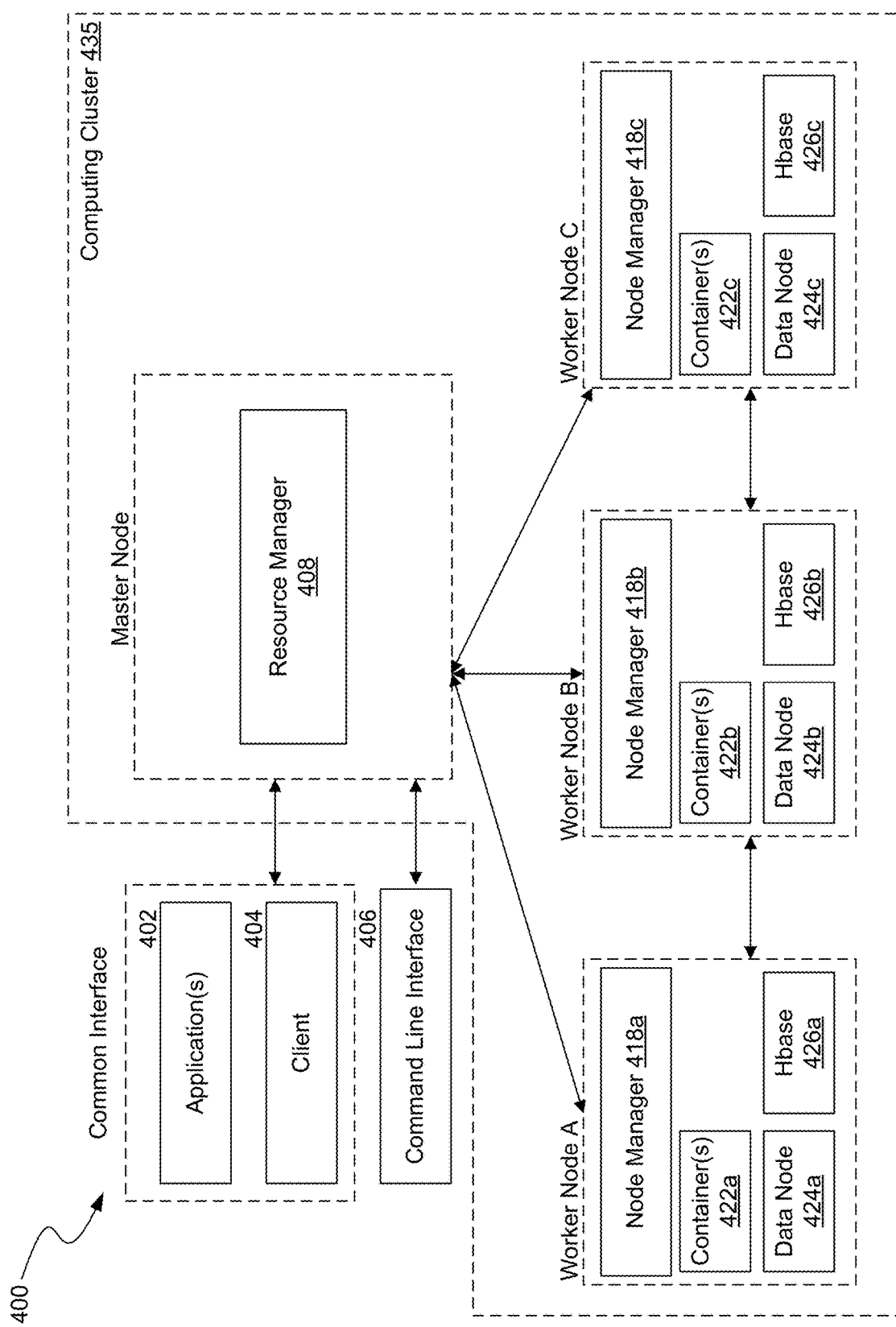
FIG. 4 shows a diagram of an example distributed computing architecture in which the introduced technique can implemented.

FIG. 4 shows a block diagram of an example distributed computing architecture 400 in which the introduced technique can implemented. The example architecture 400 includes a plurality of nodes comprising a distributed computing cluster 435. The plurality of nodes includes data nodes 424a-c that comprise a cluster of worker nodes in communication (e.g., via a computer network) with each other and one or more master nodes. Some of the data nodes 424a-c may run just HDFS, while others may run HBase region servers 426a-c.

The computing cluster 435 may represent a logical entity that includes sets of host machines that run instances of services configured for distributed processing of data. In an example embodiment, the computing cluster 435 may comprise an Apache Hadoop™ deployment. Apache Hadoop™ is an open-source software framework for reliable, scalable and distributed processing of large data sets across clusters of commodity machines. Examples of services include the Apache Hadoop™ Distributed File System (HDFS), MapReduce™, Apache Hadoop™ YARN, and/or the like. Services of the computing cluster 435 are described in more detail with respect to FIG. 5. A host, as used herein, can include a physical and/or virtual machine that runs an instance of a role. As used herein, a role is a category of functionality within a service. For example, the Apache™ HDFS service can have the following example roles: a NameNode, a secondary NameNode, DataNode and balancer. In a distributed system such as computing cluster 435, one service may run on multiple hosts.

The example distributed computing architecture 400 also includes a client 404 that provides an API and other tools for connecting and/or accessing the distributed computing cluster 435. Applications 402 provide an interface through which users can run jobs (e.g., associated with experiments), browse the HDFS, create workflows and the like. The architecture 400 may also include a command line interface 406 for issuing queries. In some embodiments, the client 404, the application(s) 402, and the command line interface 406, each or together, may be commonly referred to as a client.

The example distributed computing architecture 400 also includes a central resource manager 408. A "resource" in this context may be generally understood to include processing capabilities of the cluster nodes in the distributed computing environment. For example, resources may include processing units (e.g., CPU cores), memory, network bandwidth, and storage space. Resources may be abstracted into units called containers (e.g., containers 422*a-c*) that may include one or more of the previously mentioned resources. The central resource manager 408 is a general resource manager configured to manage and arbitrate resources among applications in the system. Communicating with node managers 418*a-c* which act as the agents at each node, the central resource manager 408 may allocate and schedule resources available at the various nodes based on the available resources reported from each node manager 418*a-c*. In other words, the resource manager 408 may queue processing tasks until resources are made available.

In Hadoop, the basic system of negotiation between a resource manager 408 and node managers 418*a-c* is sometimes referred to as Yet Another Resource Negotiator (YARN). YARN can implement one of several types of schedulers, some of which allow for user input to configure the queuing of jobs, for example, to effectuate relative priority among jobs. For example, YARN can implement a fair scheduler that allows an admin to assign weights to certain job queues. The fair scheduler then computes a "fairshare" for each queue/application in a hierarchy based on these weights and priorities the allocation of computing resources based on the calculated "fairshare."

The example distributed computing architecture 400 is described in the context of Apache Hadoop for illustrative purposes; however, this is not to be construed as limiting. Further, whether implemented in Apache Hadoop or not, more or fewer components than as shown in FIG. 4 may be included while remaining within the scope of the present teachings.

Elements depicted in the distributed computing environment of FIG. 4 may be implemented across one or more physical and/or virtual computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components. Additional detail regarding components of the one or more computing devices is described with respect to FIG. 29.

In some embodiments, the computing devices (real or virtual) implementing the elements depicted in FIG. 4 may be communicatively coupled via one or more communications networks such as the one or more communications networks 310 described with respect to FIG. 3.

Figure 5:
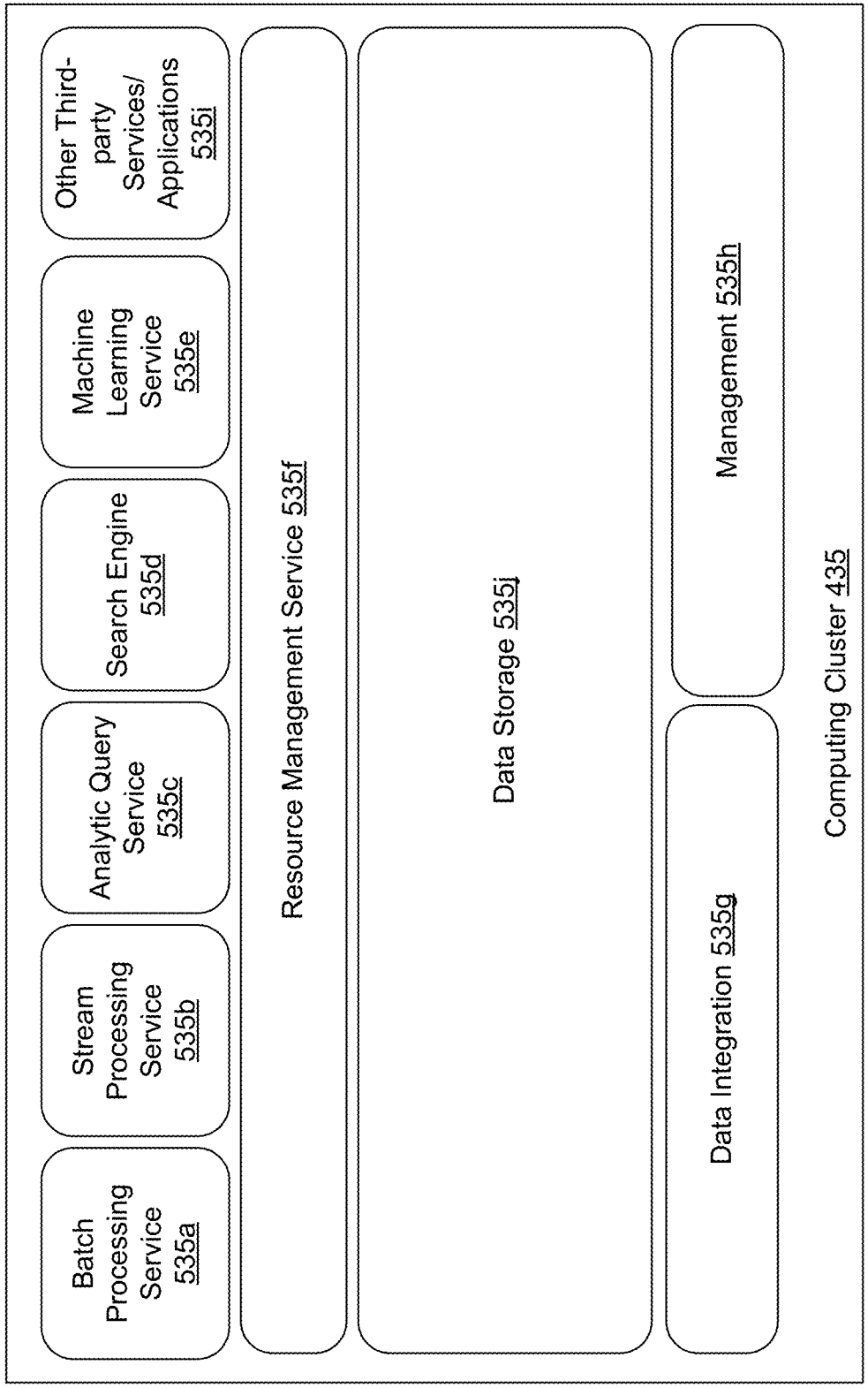
FIG. 5 shows a block diagram of example services that may be deployed in a distributed computing cluster.

As previously mentioned, the computing cluster 435 can be configured to implement one or more services, for example, for processing and storing data. FIG. 5 is a block diagram showing some example services that may be deployed in a distributed computing cluster 435. The term "services" is used herein uniformly for simplicity to refer to various components of the distributed computing cluster 435; however, one or more of the described "services" may include, for example, file systems (e.g., Apache™ HDFS), processing engines (e.g., MapReduce™, Apache Spark™, etc.), query interfaces (e.g., Apache Hive™), resource managers (e.g., Apache Hadoop™ YARN), and other types of components implemented in hardware and/or software. As shown in FIG. 5, the computing cluster 435 may include one or more batch processing services 535*a* (e.g., MapReduce™, Apache Hive™, Apache Pig™, etc.) one or more stream processing services 535*b* (e.g., Apache Spark™), one or more analytic query services 535*c* (e.g., Apache Impala™, etc.), one or more search engines 535*d* (e.g., Cloudera™ Search, etc.), one or more ML services 535*e* (e.g., Apache Spark™, MapReduce™, Apache Mahout™, etc.), one or more resource management services 535*f* (e.g., Apache Hadoop™ YARN), one or more data interface/integration services 535*g* (e.g., Apache Sqoop™), one or more management services 535*h* (e.g., part of or associated with a management system 650 described with respect to FIG. 6), and one or more other third party services and apps 535*i*. The computing cluster 435 also includes one or more storage services 535*j* for handling the storage of any type of data. The storage services 535*j* may include a distributed file system such as Apache™ HDFS, database frameworks such as Apache HBase™, Amazon™ S3, EMC Isilon™, etc. Each of the one or more services described with respect to FIG. 5 may include instances running on multiple hosts in the computing cluster 435. Further, each service may include multiple roles representing categories of functionality. For example, an Apache™ HDFS service may include the following roles: NameNode, secondary NameNode, DataNode, balancer. Accordingly, a given host of the multiple hosts may include instances of a particular role associated with a given service. Returning to the example of the Apache™ HDFS service, one or more of the hosts may include a respective role instance of the Apache™ HDFS service (e.g., DataNode_a, DataNode_b, . . . DataNode_n).

In some embodiments, a management system 650 is communicatively coupled to the computing cluster 435. The management system 650 can perform various roles for managing the operation of the computing cluster 435. For example, the management system 650 can be configured for installing software, configuring, starting, and stopping services in the cluster 435, and managing the hosts of the cluster 435 on which the services run.

Figure 6A:
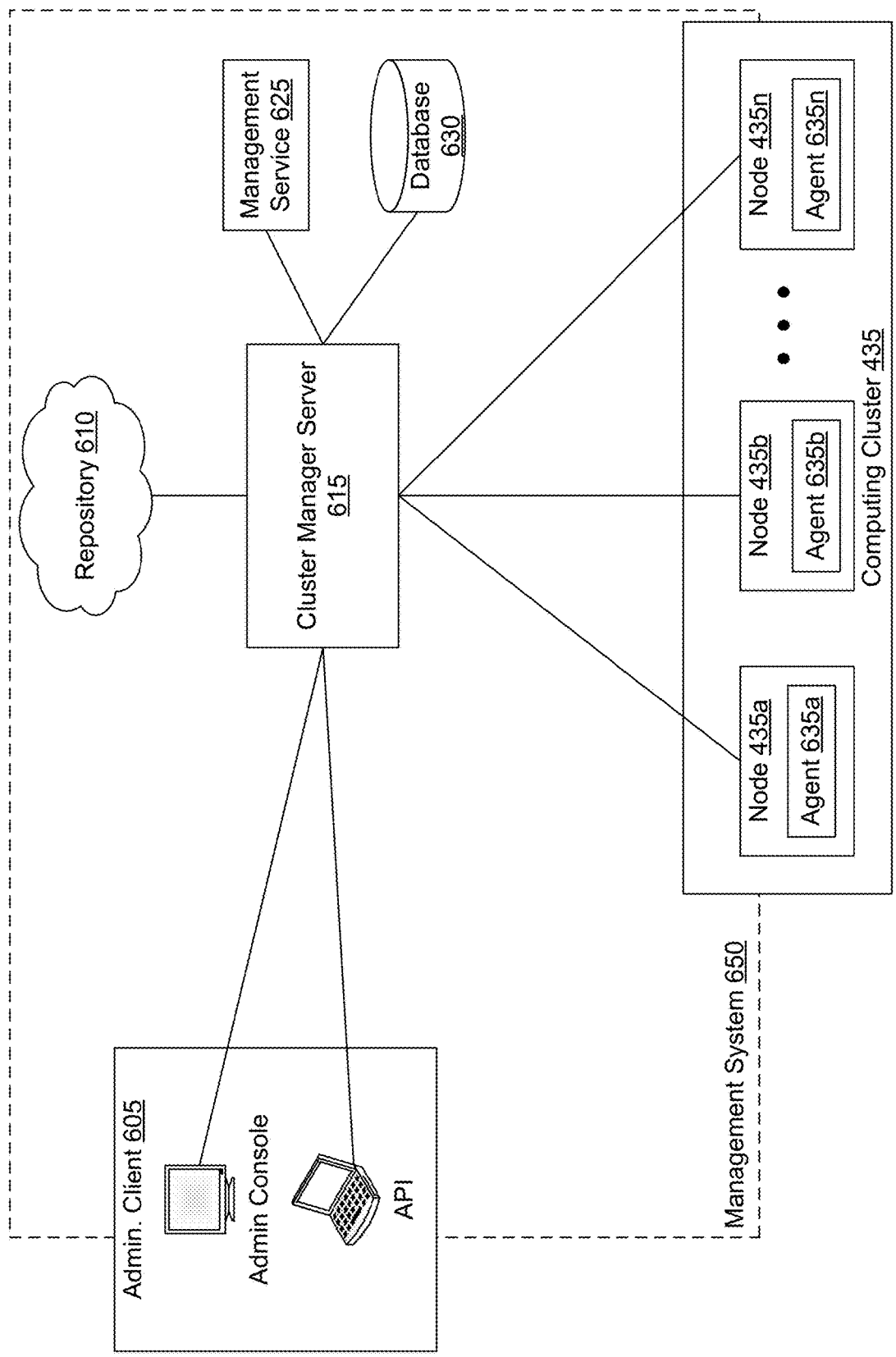
FIG. 6A shows a block diagram of an example management system associated with a distributed computing cluster.

FIG. 6A is a block diagram that shows the components of the example management system 650. In some embodiments, a cluster manager server 615 is in communication with a management service 625 that consists of a set of roles, for example, an activity monitor, a host monitor, a service monitor, reports manager, and/or the like. Configuration information (e.g., cluster configuration information), monitoring information, and/or other information associated with the computing cluster 435 can be stored in a database 630. The database 630 can include multiple logical databases running across one or more database servers. In some embodiments, the administrative client 605 represents an interface for interacting with the cluster manager server 615. The administrative client 605 can include an admin console which may be a web-based user interface (UI) or graphical user interface (GUI) that an administrator ("admin") can use to interact with the cluster manager server 615 and manage one or more clusters (e.g., computing cluster 435). The administrative client 605, in some embodiments, can also include one or more application programming interfaces (APIs) used by other applications to manage the cluster. Software for use in the computing cluster 435 can be stored in a repository 610 for distribution by the cluster manager server 615.

In some embodiments, each of the nodes 435*a-n* (e.g., master nodes, worker nodes, etc.) of the computing cluster 435 include an agent 635*a-n* for facilitating communication and coordination between processes running at the cluster manager server 615 and the multiple nodes 435a-n of the computing cluster 435. For example, the agent 635a-n may be responsible for starting and stopping processes, unpacking configurations, triggering installations, and monitoring the respective nodes 435a-n. Through communicating with the cluster manager server 615, the various agents 635a-n may facilitate the coordinated operation of multiple role instances of a given service of the computing cluster 435. Communication between the agents 635a-n and the cluster manager server 615 may be accomplished using heartbeats. For example, each of the one or more agents 635a-n may transmit a heartbeat signal at regular (e.g., every 15 seconds) or irregular intervals to the cluster manager server 615. With each heartbeat signal, an agent 635a-n may notify the cluster manager server 615 of its activities. The cluster manager server 615 may, in turn, respond with instructions on what activities the agent 635a-n should be performing. This exchange may include some type of reconciliation.

In some embodiments, the computing resources utilized to processes data may be deployed in a public or private cloud-based environment. Where a distributed computing cluster is deployed in a cloud-based environment, the multiple hosts that form the nodes of the distributed computing cluster may be implemented as virtual machines instead of physical machines. Specifically, a distributed computing cluster comprising a plurality of virtual host devices may be deployed in a cloud-computing platform managed by a third party such as Amazon™, Microsoft™, Google™, etc. Such a cloud-based computing cluster can be provisioned and destroyed as-needed to satisfy certain processing requirements. In this sense, such a cloud-based computing cluster may be considered "ephemeral" or "transient."

Figure 6B:
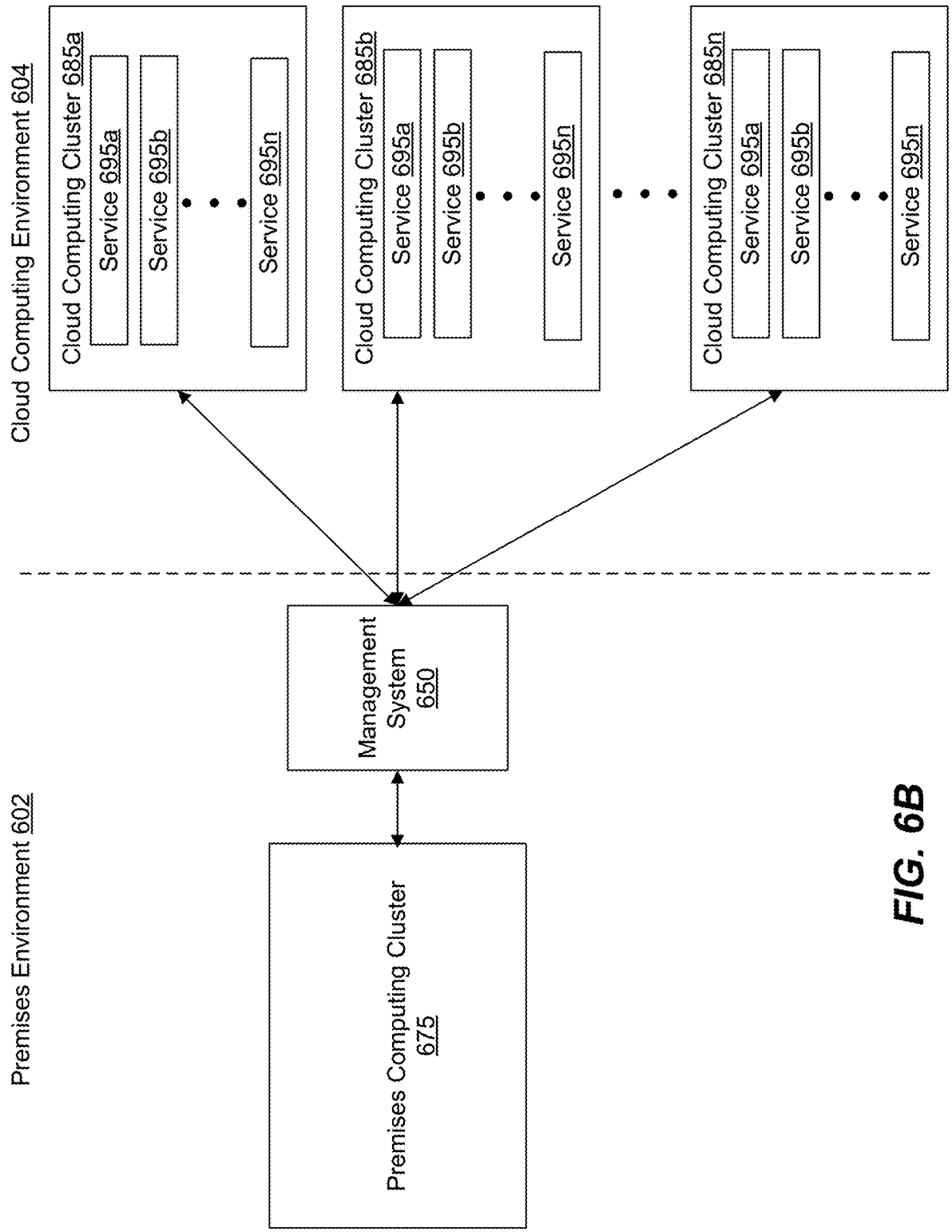
FIG. 6B shows a block diagram of an example

FIG. 6B is a block diagram that illustrates an example operating environment that includes a premises environment 602 and a cloud environment 604. The premises environment 602 includes the management system 650 (as described with respect to FIG. 6A), and premises computing cluster 675, for example similar to the computing cluster 435 (as described with respect to FIG. 4). The cloud computing environment 604 includes one or more transient computing clusters 685a-n. Each of the transient computing clusters 685a-n can implement one or more services 695a-n (e.g., similar to the one or more services 535a-n described with respect to FIG. 5). The premises computing cluster 675 represents the premises computing resources 322 that were previously mentioned with respect to FIG. 3. Similarly, the one or more transient computing clusters 685a-n represent the cloud computing resources 324 that were previously mentioned with respect to FIG. 3

The cloud computing environment 604 may represent one or more public or private cloud computing environments operated and/or managed by one or more third-party cloud providers. For example, Amazon™ offers cloud computing services as part of the Amazon Web Services (AWS) platform. Other examples of cloud computing providers include Microsoft Azure™ and Google Cloud™. Functionality of certain described components residing in the cloud computing environment 604 may be implemented using products and services associated with a cloud computing platform such as Amazon AWS. In an illustrative embodiment, computing functionality is provided using virtual computing entities (e.g., Amazon™ EC2 virtual server instances and/or Lambda event-based computing instances) executing across one or more physical computing devices and storage functionality is provided using scalable cloud-based storage (e.g., Amazon™ S3 storage) and/or managed databases, data warehouses, etc. (e.g., Amazon™ Aurora, Amazon™ DynamoDB, Amazon™ Redshift, Google™ Spanner, etc.). In the architecture depicted in FIG. 6B, each transient computing cluster 685a-n may comprise a plurality of host machines similar to the host machines of cluster 435 except that the host machines are implemented in software as virtual machines. For example, in the case of AWS, a particular transient computing cluster (e.g., cluster 685a) may comprise an Amazon™ ECS cluster that includes a logical grouping of Amazon™ EC2 instances. Otherwise, each transient computing cluster 685a-n may be treated as a functional equivalent to the computing cluster 435 for purposes of data processing. Any reference functionality by or in relation to the computing cluster 435 may similarly apply to any one or more of the transient computing clusters 685a-n, and vice versa.

An administrator user may provision one or more transient computing clusters 585a-n to process certain workloads (e.g., experiments). In some cases, an administrator user of the management system 650 may temporarily provision one or more transient computing clusters 685a-n, for example, through the management system 650. For example, transient computing clusters 685a-n may be provisioned to expand computing resources beyond those available in a premises computing cluster 675. For example, an administrator user may schedule, via the management system 650, the provisioning of transient cloud computing clusters 685a-n to handle workload during peak hours when demand may otherwise exceed the capabilities of any available premises computing cluster 675. Alternatively, transient cloud computing clusters 685a-n may be temporarily provisioned as needed depending on workload requirements without maintaining a separate premises computing cluster 675. The specific manner in which the system is implemented will depend on system requirements.

In some embodiments, the DS platform 320 may enable end users (e.g., data science professionals) to select from different computing resources to process workloads. For example, a data science professional developing an ML model using the DS platform 320 may elect to execute experiments in a premises computing cluster 675 or in one or more cloud-based computing cluster 685a-n, for example, operated by a third-party provider such as Amazon™. The data science procession may elect to utilize on computing resource over another, for example, based on availability, costs, data lineage control, etc. FIG. 25D shows an example screen in a hyperparameter tuning GUI through which a user may select from multiple computing resources when scheduling experiments to execute.

Figure 7:
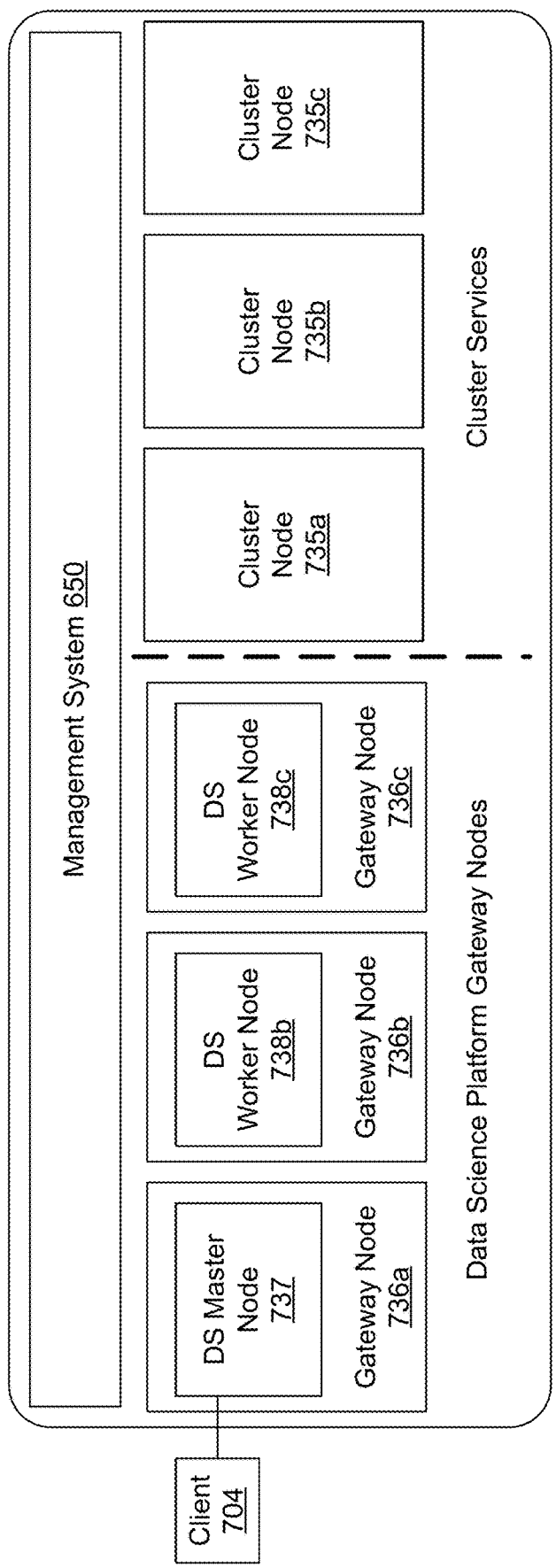
FIG. 7 shows a diagram of an example deployment of a data science platform using a distributed computing architecture.

Implementation of a Data Science Platform in a Distributed Computing Environment FIG. 7 shows a diagram that illustrates an example deployment of a DS platform 320 using a distributed computing architecture similar to that described with respect to FIGS. 4-6. As shown in FIG. 7, in some embodiments, the DS platform 320 may run on one or more dedicated gateway nodes 736a-c. A "gateway node" in this context refers to a role that designates that a node should receive client configuration for a given service of the distributed computing cluster 435 (e.g., Apache Spark™, Apache Hive™, Apache™ HDFS, etc.), but that does not have any role instances of such services running on it. In some embodiments, each of the gateway nodes has an instance of an agent for the DS platform 320 that includes the necessary libraries, configurations, etc. to allow clients 704 to securely access services running on other cluster nodes 735a-b of a distributed computing cluster (e.g., cluster 435).

In the embodiment illustrated in FIG. 7, services such as Apache Spark™, Apache Hive™, Apache™ HDFS, etc. are not run on the dedicated gateway nodes 736a-c. The gateway nodes 736a-c are instead dedicated to DS platform 320 to provide dedicated computing resources (e.g., CPU, memory, etc.) to client workloads.

Of the dedicated gateway nodes 736a, one will serve as a DS master node 737, while others will serve as DS worker nodes 738b-c. The DS master node 737 keeps track of any critical persistent and stateful data for a given client 704 of the DS platform 320. For example, the DS master node 737 may handle the storage of project files (e.g., user code, libraries, data files, etc.). The DS master node 737 may also handle storage of realtime state information for running jobs, experiments, etc. Access to this realtime state information allows users to work interactively, for example, using R, Python, Scala, etc., from a client 704 and display results in realtime. While the DS master node 737 hosts stateful components of the DS platform 320, the DS worker nodes 738b-c are transient. Such DS worker nodes 738b-c can be added or removed, as needed, to provide flexibility and scalability.

The worker nodes 738b-c are not required in all embodiments. In some embodiments, the DS platform 320 can be deployed using a single node cluster with just a DS master node 737. In other words, the DS master node 737 can be configured to run workloads just as the worker nodes 738b-c can. Even in multi-node deployments (e.g., as depicted in FIG. 7), the master node 737 can be configured to perform stateful functions as well as transient workload functions generally handled by worker nodes 738b-c.

Engines associated with the DS platform 320 are responsible for executing code (e.g., R, Python, Scala, etc.) written by users and intermediating access to services in the rest of the computing cluster. Engines in the context of this disclosure can be conceptualized as virtual machines configured to include the necessary dependencies to access services in the rest of a computing cluster while maintaining an isolated project environment. Each gateway node 736a-c dedicated to the DS platform 320 may include one or more engines configured by DS agents.

Figure 8:
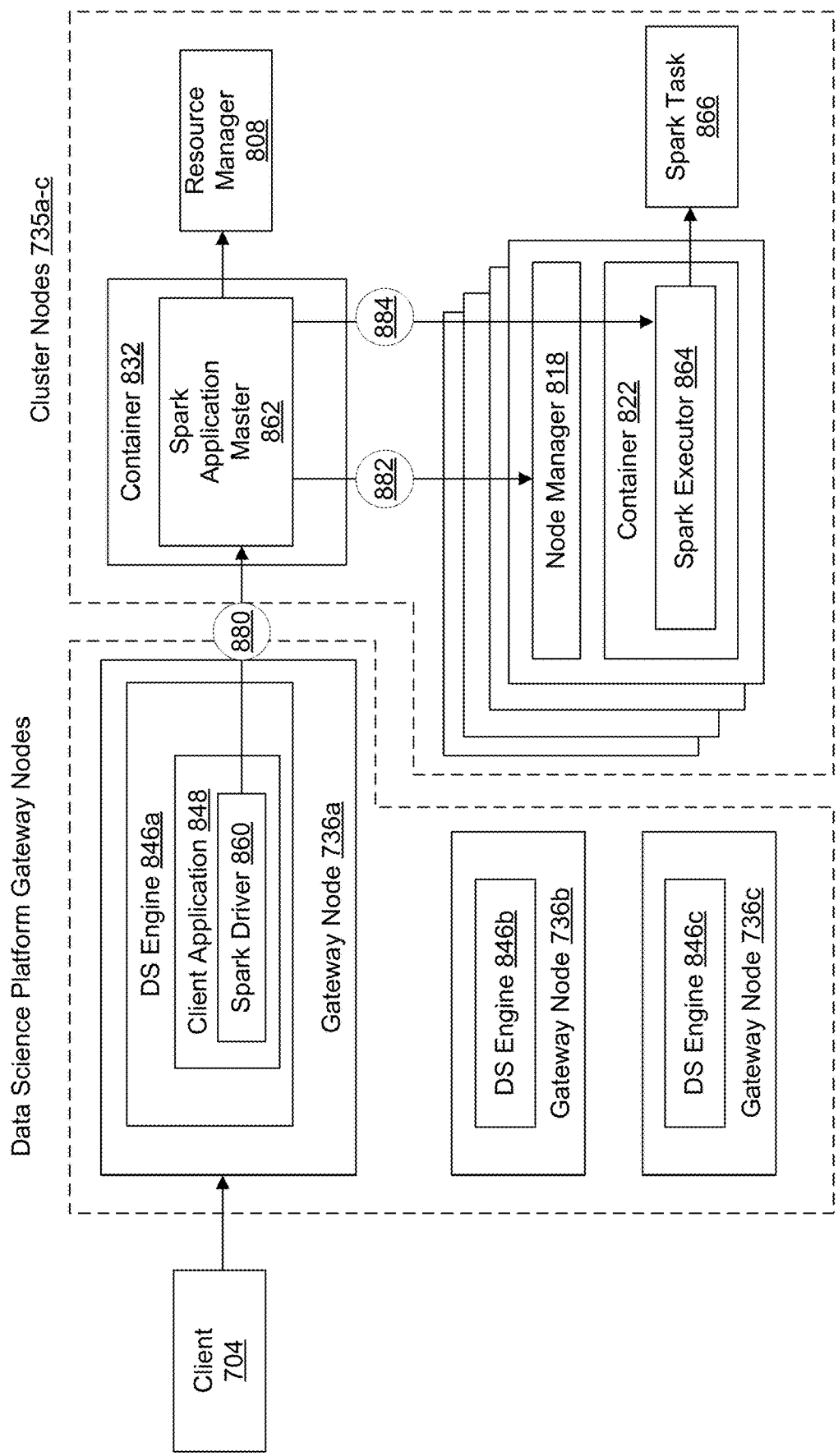
FIG. 8 shows a diagram of the example deployment of the data science platform of FIG. 7 that further shows the deployment of engines at nodes in a distributed computing cluster.

FIG. 8 shows a diagram of an example deployment of a DS platform 320 in a distributed computing environment that illustrates the operation of such engines. As in FIG. 7, FIG. 8 depicts one or more gateway nodes 736a-c dedicated to the DS platform 320. At each of the one or more gateway nodes 736a-c are one or more DS engines 846a-c (respectively). Although FIG. 8 shows one DS engine at each gateway node, in some embodiments, multiple engines may be run at each gateway node.

In the example depicted in FIG. 8, a DS engine 846a running at a gateway node 736a is executing a client application 848 that includes a driver 860 for a particular service (e.g., Apache Spark) available in the computing cluster. Apache Spark is a general-purpose framework for distributed computing that offers high performance for both batch and stream processing. Apache Spark exposes APIs for Java, Python, R, and Scala, as well as an interactive shell to run jobs in the cluster. The client application 848 is depicted in FIG. 8 as running at gateway node 736a for illustrative purposes; however, this shall not be construed as limiting. The client application 848 may be similarly executed using the engines at any of the other gateway nodes.

In some embodiments, the DS platform 320 may provide interactive batch access to Apache Spark in the cluster thereby enabling users of the DS platform 320 to run Spark applications (e.g., application 848) in an isolated project workspace provided by the dedicated gateway nodes 736a-c. For example, as shown in FIG. 8, the Spark driver 860 may, at step 880, transmit application commands to a Spark application master 862 executing in a container 832 associated with a resource manager 808 (e.g., similar to resource manager 408) of the cluster. The Spark application master 862 may then, at step 882, transmit commands to resource node managers 818 (e.g., similar to node managers 418a-c) at one or more of the nodes 736a-c in the computing cluster to launch Spark executors 864 in node containers 822 (e.g., similar to containers 422a-c). The Spark application master 862 may then communicate with the launched spark executors 864 to perform workload tasks 866. The process flow depicted in FIG. 8 allows a user to launch a Spark application and work iteratively, for example, using R, Python, or Scala, instead of waiting for the application to complete its processing before viewing the results. Although described in the context of Apache Spark, this process may similarly be applied to utilize other services available in a distributed computing cluster.

Example Processes for Hyperparameter Tuning Using Visual Analytics

FIGS. 9-16 show several flow charts of example processes for facilitating hyperparameter tuning using visual analytics, according to some embodiments of the introduced technique. One or more steps of the example processes depicted in FIGS. 9-16 may be performed by any one or more of the components of the example computer system described with respect to FIG. 29. For example, the processes may be represented in instructions stored in memory that are then executed by a processor. Specifically, in some embodiments, one or more steps of the example processes may be performed by one or more computer systems associated with a DS platform 320, as previously described. The processes described with respect to FIGS. 9-16 are examples provided for illustrative purposes and are not to be construed as limiting. Other processes may include more or fewer steps than depicted while remaining within the scope of the present disclosure. Further, the steps depicted in example processes of FIGS. 9-16 may be performed in a different order than is shown.

Figure 9:
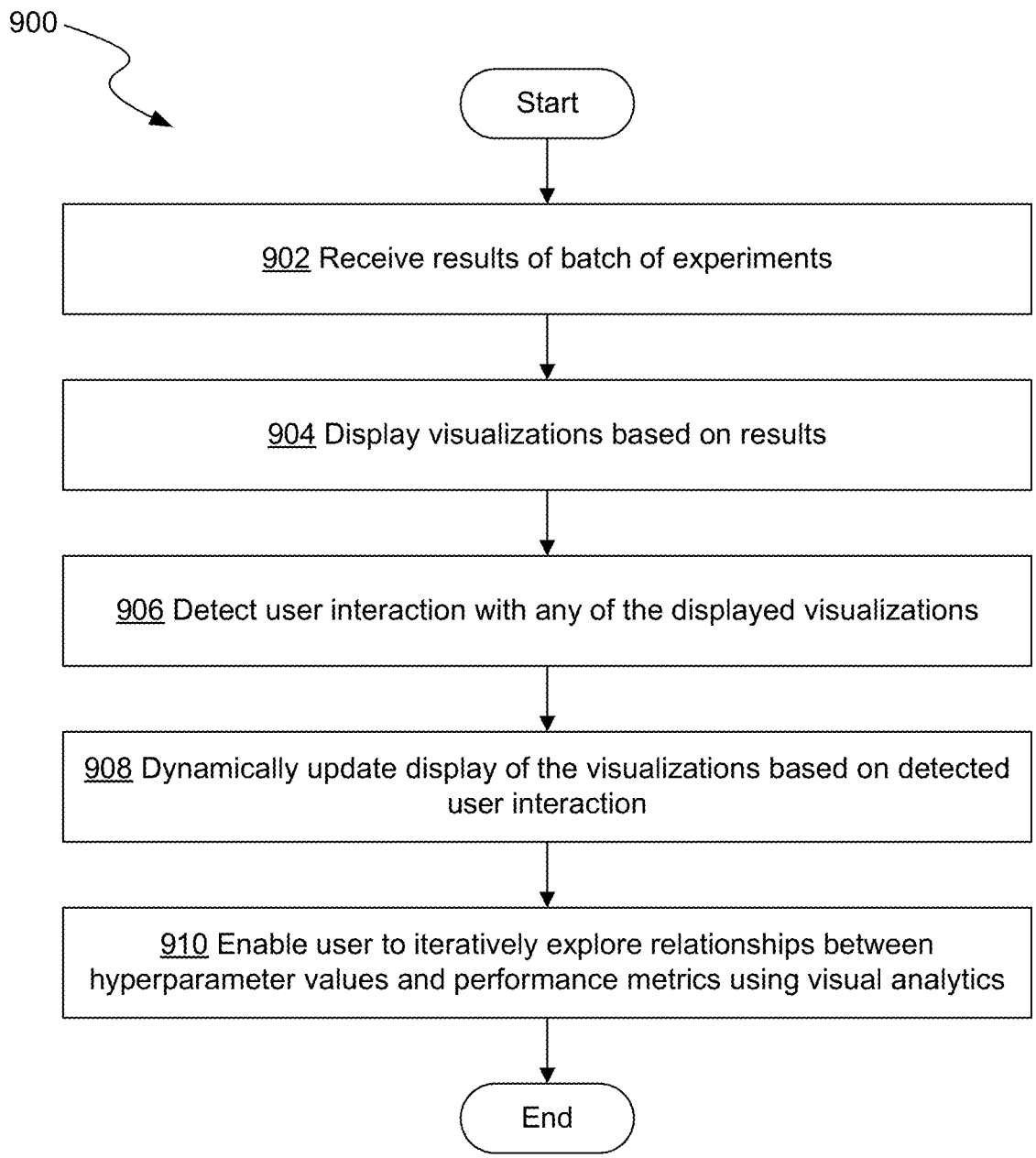
FIG. 9 shows a flow chart of an example process for facilitating hyperparameter tuning using visual analytics.

FIG. 9 shows a flow chart of an example process 900 for facilitating hyperparameter tuning using visual analytics, according to some embodiments of the introduced technique. The example process 900 begins at step 902 with receiving results of a batch of experiments. The received results may include a plurality of performance metric values generated by the execution of multiple experiments using a dataset and a plurality of hyperparameter values. Hyperparameter values and performance metric values may include continuous, discrete, and/or categorical values.

As previously discussed, the DS platform 320 enables a user such as a data science professional to set up and run batches of experiments. Each experiment may represent the results of training an ML model configured using a particular combination of hyperparameter values using a training data set. For example, if the user wants to test how varying the number of layers (a hyperparameter) in a convolutional neural network affects various model performance metrics, the user can run multiple experiments that involve processing a dataset (or datasets) using convolutional neural networks each having a different number of layers to obtain performance metric results. FIGS. 17-28, described in more detail later, depict an example GUI of the DS platform 320 through which a user can analyze experiments results when performing hyperparameter tuning during the development of an ML model.

In some embodiments, the experiments can be executed in a distributed computing cluster 435 that enables efficient parallel processing of large amounts of data. In some embodiments, data associated with experiments are versioned to enable iterative analysis of the results. For example, each of the experiments in a given batch of experiments may track different versions, for example, of model code, inputs (e.g., hyperparameters), and outputs (e.g., performance metrics, model files, etc.). In some embodiments, to support versioning of such data, each experiment is executed in an individual (i.e., isolated) resource container in the distributed computing cluster. Without versioned experiments, a user would need to consistently track the differences in the training artifacts (e.g., data, hyperparameters, code, performance metrics) across different experiments on their own. Even if the user somehow manages to track these varying values on their own, the lack of versioning would make it difficult to reproduce results and to explain results to other users.

At step 904, visualizations are displayed based on the results received at step 902. In some embodiments, visualizations are displayed in a GUI associated with the DS platform 320. The GUI may be displayed at a device 304 associated with a user (e.g., a client device 304). The GUI can be displayed via a web browser or some other type of application associated with the DS platform 320. Generally, visualizations displayed at step 904 may be indicative of relationships between the performance metric values included in the results and hyperparameter values used to configured ML models to generate the results. Visualizations may indicate relationships on a per experiment basis or across multiple experiments in a given batch. The various visualizations displayed in the GUI may include, for example, bar charts, line diagrams, scatter plots, parallel coordinate charts, confusion matrices, or any other type of visualizations. FIGS. 19-28, described in more detail later, depict some example visualizations and other interface features that may be displayed via a GUI.

To facilitate user exploration of the received results, at least some of the visualizations displayed at step 904 can be configured to dynamically change in response to user interaction via the GUI. For example, returning to FIG. 9, in response to detecting a user interaction with a particular visualization at step 906, a computer system may, at step 908, dynamically update display of the one or more of the visualizations in the GUI based on the detected interaction. This enables a user to, at step 910, iteratively explore relationships, for example, between hyperparameter values and performance metrics, gain insight based on perceivable patters, and use such insight to tune the hyperparameter values for a given ML model, for example, to improve the performance of an ML model.

Figure 10:
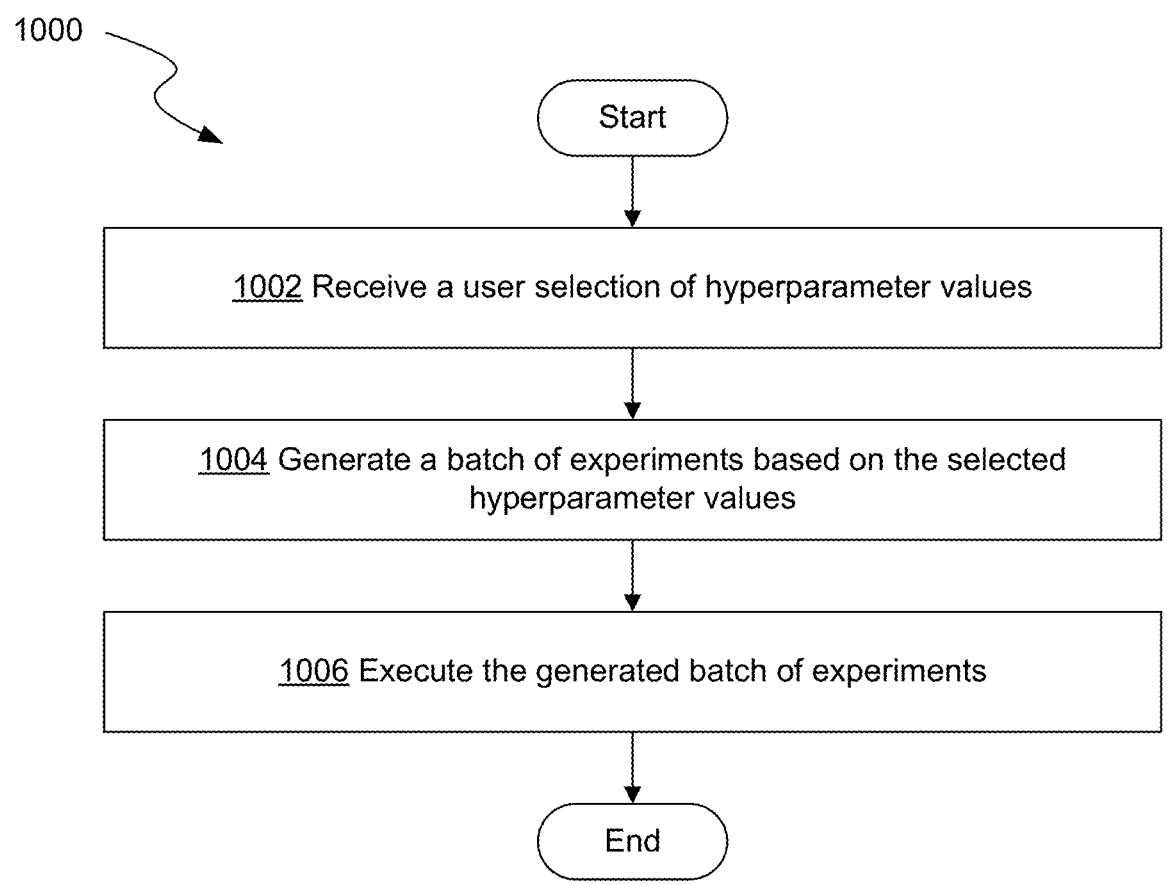
FIG. 10 shows a flow chart of an example process for generating new batches of experiments.

Sometimes the process of iteratively exploring relationships between hyperparameter values and performance metrics and identifying patterns may involve setting up and running new experiments using different hyperparameter values and/or different combinations of hyperparameter values. To facilitate such user exploration, in some embodiments, the GUI may include tools for setting up additional experiments. FIG. 10 shows a flow chart of an example process 1000 for generating new batches of experiments, according to some embodiments of the introduced technique.

The example process 1000 begins at step 1002 with receiving a user selection of hyperparameter values that the user wishes to test. As will be described in more detail, the user's selection may be received via a GUI associated with the DS platform 320 in a number of different ways. For example, the user may simply select one or more specific hyperparameter values or a range of hyperparameter values using various types of UI features such as an editable text box, slider bars, selection of portions of a visualization, etc. An example GUI element for receiving user selected hyperparameter values is depicted in FIG. 25A which is described in more detail later.

At step 1004, a computer system generates a batch of experiments based on the hyperparameter values selected by the user at step 1002. In some embodiments, process 1000 is performed after a user has already analyzed (using visualizations) results from a first batch of experiments. Accordingly, step 1004 may involve generating a second subsequent batch of experiments that applies a different set of hyperparameter values when processing an underlying dataset.

In some embodiments, the process of generating the batch of experiments may include creating isolated build images where each of the experiments is to be executed. To create such build images, the DS platform 320 may take a snapshot of the file system for a given project, for example, that includes model code, training datasets, etc. Once the snapshot is created, the DS platform 320 may utilize a build script that defines, for example, which portions from the project file system should be included in the build image for a given experiment as well as arguments to apply. For example, arguments may include the user selected hyperparameter values that define the properties of the ML model to be tested as part of the experiment.

At step 1006, the one or more experiments included in the batch generated at step 1004 are executed and results are returned. As previously discussed, in some embodiments, experiments are executed in a distributed computing cluster such as computing cluster 435. Specifically, in some embodiments, each experiment (e.g., using the build image) is executed in a different resource container (e.g., containers 422*a-c*) at nodes in the distrusted computing cluster to allow for versioning of the experiments.

Figure 11:
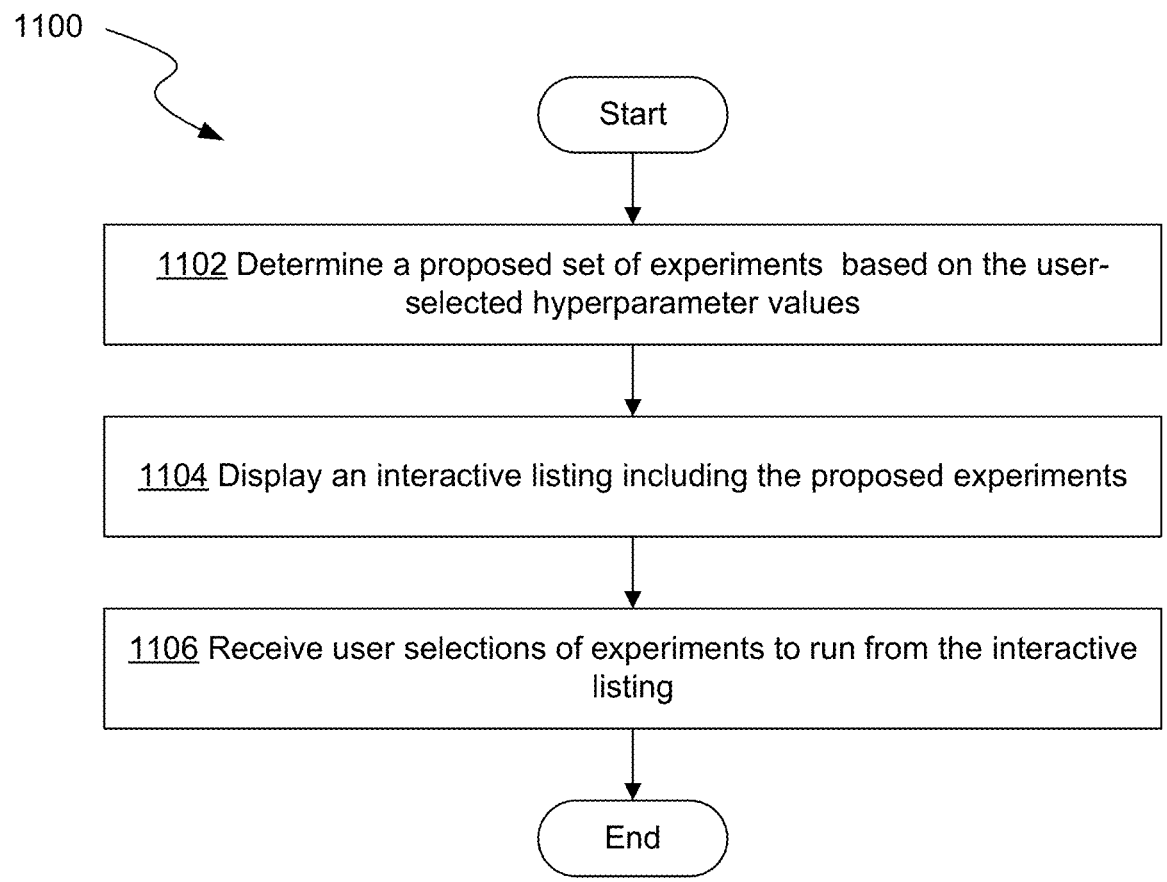
FIG. 11 shows a flow chart of an example process for proposing new experiments to a user.

In some embodiments, the user may select from a proposed listing of experiments to be executed. FIG. 11 shows a flow chart of an example process 1100 for proposing new experiments to a user, for example, based on user-selected hyperparameter values, and receiving user selections based on the proposals.

The example process 1100 begins at step 1102 with determining a proposed set of experiments to be executed based on the user-selected hyperparameter values, for example, received at step 1002 in the example process 1000 depicted in FIG. 10. Before generating a batch of experiments at step 1004, a computer system may first determine which experiments are needed to test ML model configurations based on the received hyperparameter values. The proposed set of experiments will depend on the number of different hyperparameter combinations to be tested. This includes the number of hyperparameters to be applied (e.g., batch size, number of epochs, dropout rate, etc.) as well as the number of values for each hyperparameter. The number of values for each hyperparameter may be based on specific values selected by the user and/or on a user-selected range of values and step size (e.g., dropout rate of between 0.3 and 0.7 with a step size of 0.1). In some embodiments, the proposed set of experiments may include every unique combination of hyperparameter values, although as will be described, this can be focused, for example, to save on execution costs.

Figure 25B:
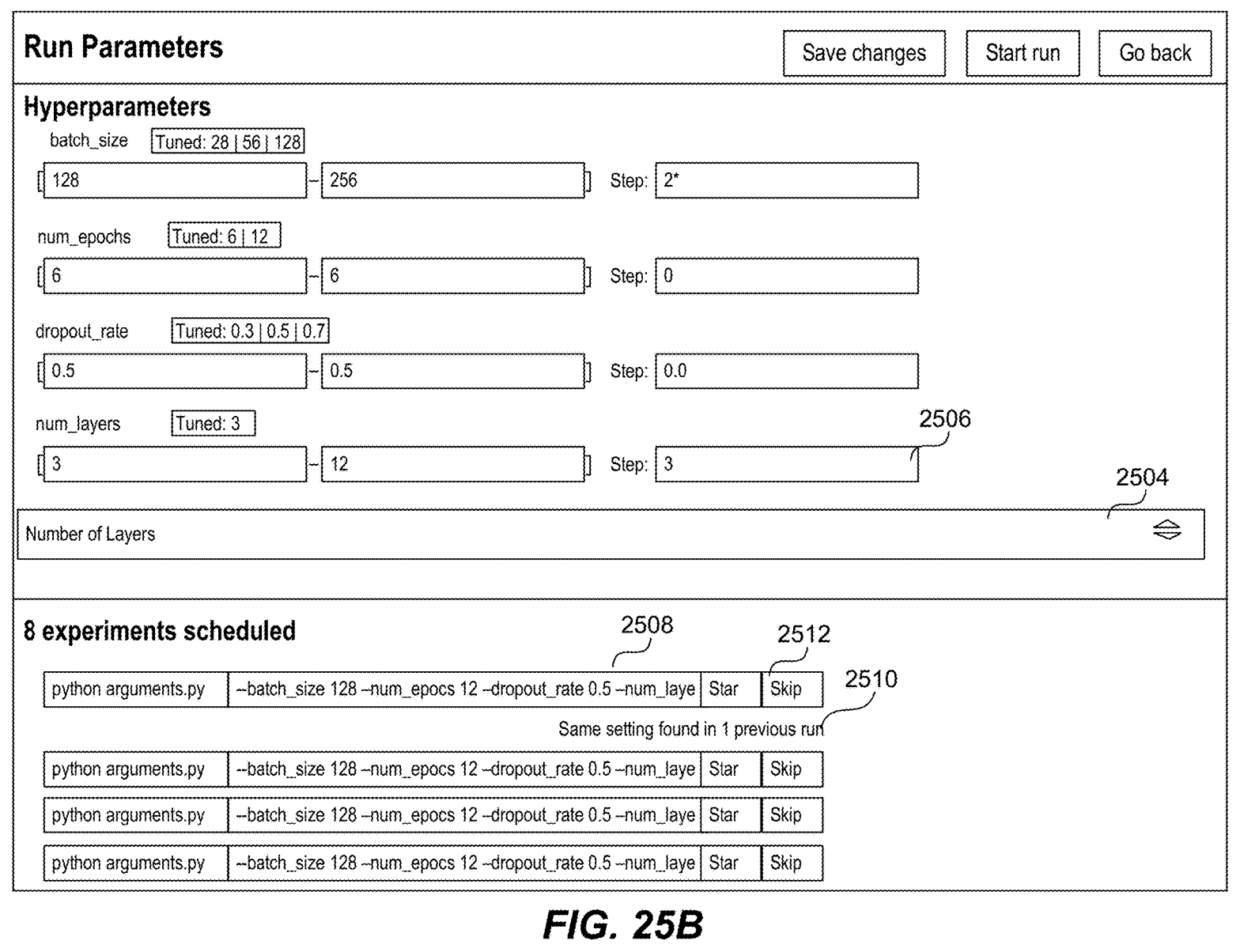

At step 1102, an interactive listing of the proposed set of experiments is displayed to the user, for example, via a GUI at a user device. An example interactive listing of proposed experiments is depicted in FIG. 25B which is described in more detail later.

At step 1104, selections by a user of which of the proposed experiments to run are received, for example, via the interactive listing displayed in the GUI at the user device. The user may select all of the proposed experiments from the interactive listing or may elect to execute only some of the experiments, for example, based on additional information included in the listing of proposed experiments. In any case, in response to receiving the user selection at step 1106, the computer system then generates a batch of experiments based on the user selection (e.g., similar to step 1004 in FIG. 10), executes the generated batch of experiments (e.g., similar to step 1006 in FIG. 10), and returns the results for further analysis (e.g., by repeating process 900 of FIG. 9).

As alluded to above, in some cases, a user may wish to run fewer than all of the proposed experiments and instead may wish to select certain experiments to be run. For example, in some situations, one or more of the proposed experiments (or at least experiments with similar settings) may have already been run in a previously executed batch. Executing such redundant experiments would take additional time, waste computing resources, and drive up costs. Accordingly, in some embodiments, the DS platform 320 can be configured to track which experiments have been run, notify the user of redundancies, and allow the user to skip proposed experiments to avoid rerunning redundant experiments.

Figure 12:
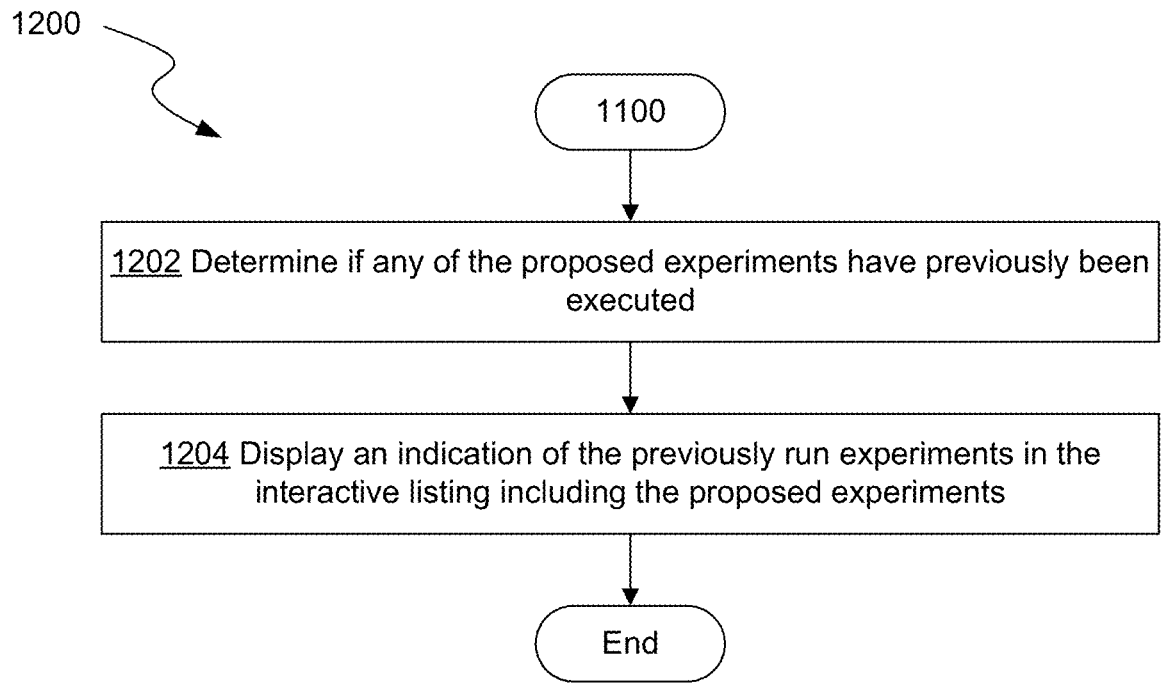
FIG. 12 shows a flow chart of an example process for notifying a user of redundant proposed experiments.

FIG. 12 shows a flow chart of an example process 1200 for notifying a user of redundant experiments. The example process 1200 begins at step 1202 with determining if any of the proposed experiments (e.g., those proposed at step 1102 in process 1100) have already been executed as part of a previous batch of experiments.

If any of the proposed experiments have already been executed, or if similar experiments have already been executed, process 1200 continues at step 1204 with displaying an indication, for example in the interactive listing, of which of the proposed experiments have already been executed. An example interactive listing of proposed experiments that includes such an indication is depicted in FIG. 25B which is described in more detail later.

In some other situations, a user may wish to streamline or otherwise reduce the number of experiments run, for example, to conserve computing resources, reduce the time to run the experiments, and/or reduce monetary costs. To aid the user in such a decision process, the DS platform 320 may be configured to display additional information regarding the potential costs associated with any one or more of the proposed experiments.

Figure 13:
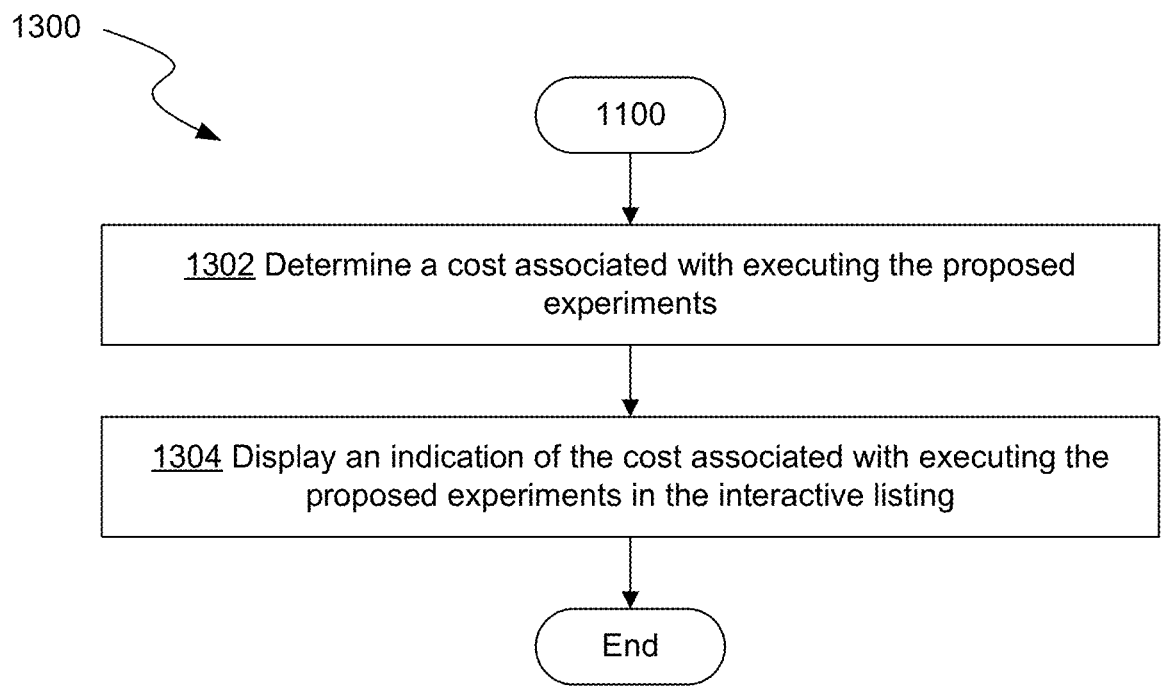
FIG. 13 shows a flow chart of an example process for notifying a user of costs associated with executing proposed experiments.

FIG. 13 shows a flow chart of an example process 1300 for notifying a user of costs associated with executing proposed experiments. The example process 1300 begins at step 1302 with determining a cost associated with executing any one or more of the proposed experiments (e.g., those proposed at step 1102 in process 1100). The costs of executing an experiment may include, for example, resource utilization cost, monetary cost, and/or time cost. In some embodiments, a computer system performing process 1300 may communicate with a resource manager (e.g., resource manager 408) for the executing computer system (e.g., a distributed computing cluster 435) to determine a cost associated with executing an experiment or at least to gather information that can be utilized to calculate such a cost. In some embodiments, previously executed experiments (by the same user and/or other users) having similar configurations (e.g., algorithms, scripts, dataset [size, split, format, etc.], infrastructure, and settings, etc.) may be analyzed to inform cost estimates for proposed experiments. Determined costs may be calculated on a per experiment basis and/or across a batch of experiments.

At step 1304, an indication of the costs associated with executing any one or more of the proposed experiments is displayed to the user, for example, via the interactive listing of proposed experiments.

In some embodiments, the DS platform 320 may be configured to generate recommendations to optimize a proposed set of experiments to satisfy one or more constraints, for example, based on limited computing resources, limited budgets, limited time, or any other constraints. For example, given limited available resources in an executing computer system (e.g., distributed computing cluster 435), a recommendation may be presented to the user to limit the number of proposed experiments so as not to exceed usage of the available computing resources.

Figure 14:
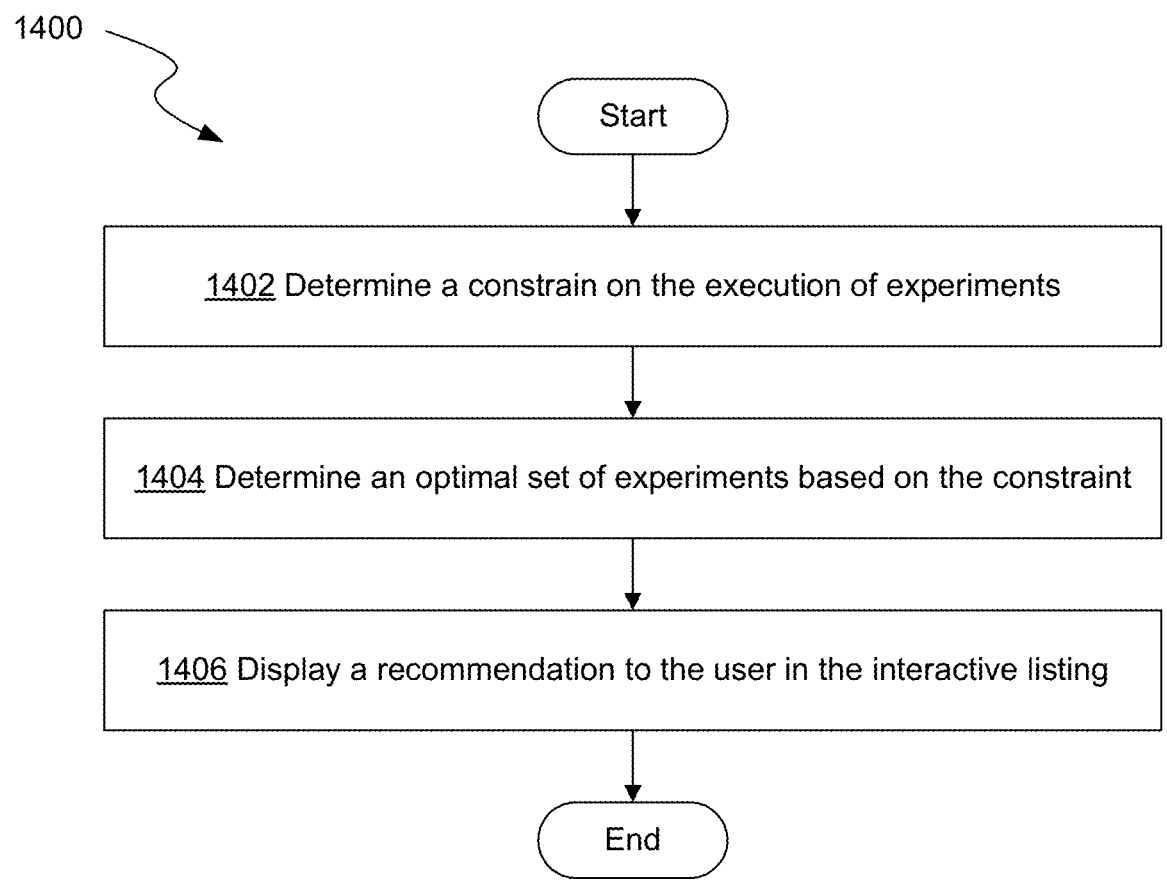
FIG. 14 shows a flow chart of an example process for providing recommendations to a user to optimize a proposed set of experiments.

FIG. 14 shows a flow chart of an example process 1400 for providing recommendations to a user to optimize a proposed set of experiments. The example process 1400 begins at step 1402 with determining a constraint associated with the execution of any of the proposed experiments (e.g., those proposed at step 1102 in process 1100). The determined constraint may be based on any of available computing resources to execute experiments, cost to execute experiments, time to execute experiments, etc. In some embodiments, a computer system performing process 1300 may communicate with a resource manager (e.g., resource manager 408) for the executing computer system (e.g., a distributed computing cluster 435) to determine the constraint. For example, the resource manager 408 of a distributed computing cluster 435 may return a constraint based on computing resources (e.g., CPU, memory, storage, etc.) that are currently available in the cluster. In some embodiments, constraints may be set by an administrator user of the DS platform 320. For example, an administrator user may wish to constrain how much computing resources are utilized by data science professionals when running their experiments. In some embodiments, constrains may be set by the user initiating the experiments (e.g., the data science professional). For example, a user may wish to stay within a particular budget (e.g., set by department policy) and may input a constraint that limits the monetary costs of each experiment, batch of experiments, etc.

At step 1404, an optimal set of experiments based on the constraint is determined. For example, given one or more hyperparameter values (e.g., selected by a user) and one or more constraints (determined at step 1402), the computer system may determine an optimal set of experiments to include in a batch of experiments. The set of experiments may be optimized to maximize utility of the returned results while satisfying the one or more constraints. The set of experiments can be optimized in a number of different ways. As an illustrative example, if a user has selected a range of values for a particular hyperparameter, the computer system may increase the step size to reduce the overall number of experiments thereby reducing computing resource utilization. As another illustrative example, the computer system may analyze previously run experiments (by the same user or other users) and determine that certain experiments (or similar experiments) provided less insight. For example, the computer system may analyze annotations left by users to determine whether certain experiments led to important insights.

At step 1406, a recommendation based on the optimal set of experiments (determined at step 1404) is displayed to the user, for example, via the interactive listing of proposed experiments. For example, in some embodiments, the interactive listing of proposed experiments may include recommendations of experiments to skip to satisfy one or more constraints.

Although not depicted in FIG. 14, in some embodiments, the DS platform 320 may be configured to adjust automatically the set of proposed experiments to be included in the interactive listing in order to satisfy the one or more constraints and without any input by the user.

In some embodiments, the DS platform 320 may be configured to generate recommendations for hyperparameter values to assist the user in the tuning process. For example, after executing one or more experiments, a computer system may analyze the results, identify patterns, and generate recommendations for hyperparameter values to optimize one or more ML model performance metrics. This recommendation may continually update as subsequent experiments are executed.

Figure 15:
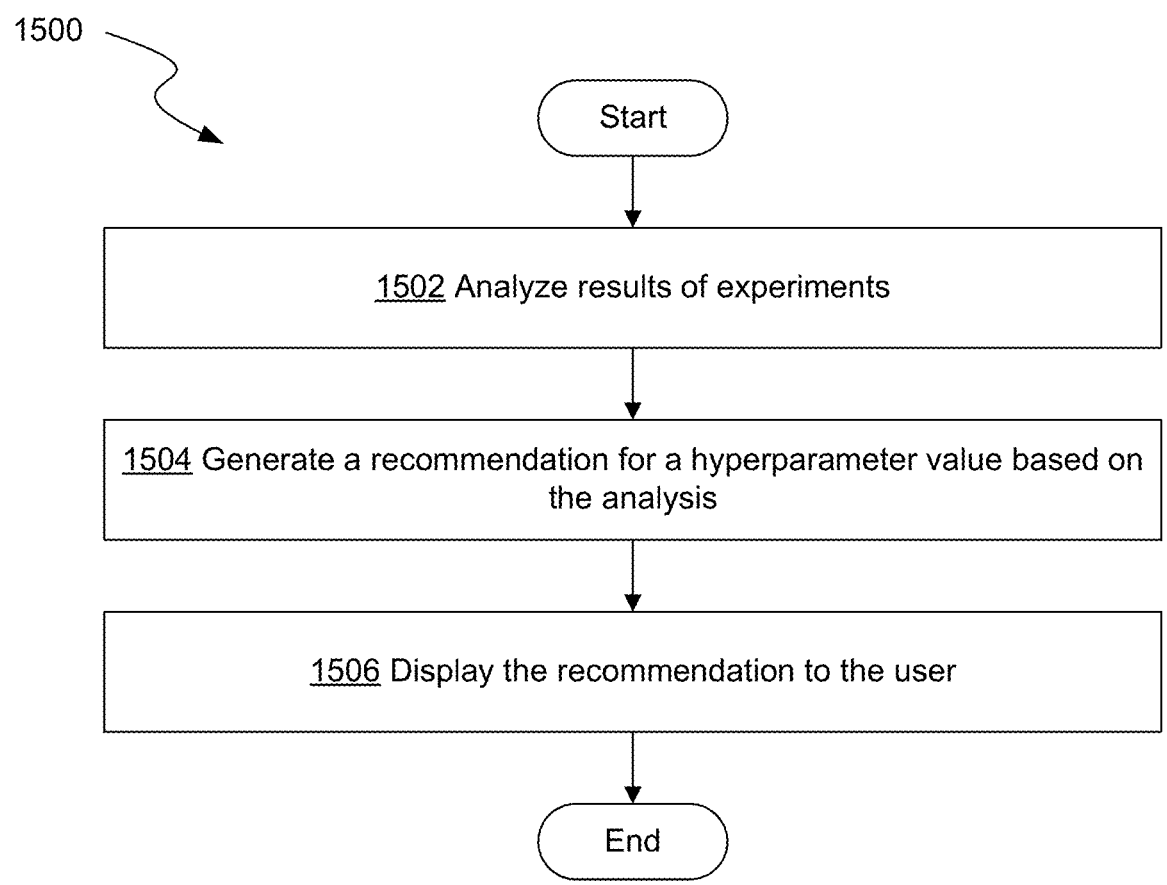
FIG. 15 shows a flow chart of an example process for generating hyperparameter value recommendations.

FIG. 15 shows a flow chart of an example process 1500 for generating hyperparameter value recommendations. The example process 1500 begins at step 502 with analyzing the results of one or more experiments, for example, to identify patterns in the results and provide insight into how certain hyperparameter values or combinations of hyperparameter values impact ML model performance metrics.

At step 1502, a recommendation for one or more hyperparameter values is generated based on the analysis. For example, step 1502 may include selecting a hyperparameter value or combination of hyperparameter values that maximizes one or more ML model performance metrics.

At step 1504, the recommendation is displayed to the user, for example, via a GUI associated with the DS platform 320.

In some embodiments, the user may guide the analysis performed by the computer system, for example, by identifying patterns or trends in the data. For example, a user-drawable layer may be overlaid on any one or more of the visualizations presented to the user via the GUI. After reviewing the results as depicted in a particular visualization, the user may draw over the visualization, for example, to define a trend line, circle clusters of relevant data points, etc. Based on the user drawn lines, a computer system performing an analysis of the results may select a function (e.g., linear, quadratic, etc.) to use when fitting the data points. In other words, the computer system may determine a selected data pattern for the results based on the detected user interaction with a visualization and may apply the selected data pattern when analyzing the results of the experiments or future experiments. As another example, the computer system may only analyze data points closest to the user's drawn line, while ignoring data points further from the user's drawn line. As another example, the computer system may apply different weights to data points depending on their relationship (e.g., proximity, within a circle, etc.) to the user's drawn line. In some embodiments, instead of providing a user drawable layer, the computer system may automatically pre-fit one or more candidate functions (e.g., linear, quadratic, etc.) to the data, display the candidate functions as an overlay over one or more of the visualizations, and allow the user to select from the one or more candidate functions before performing the analysis of the results based on the user selection.

After using the aforementioned visual analytics tools to iteratively explore the relationships between various hyperparameters and performance metrics, the user may select one or more hyperparameter values (i.e., tuned hyperparameter values) to configure the ML model.

Figure 16:
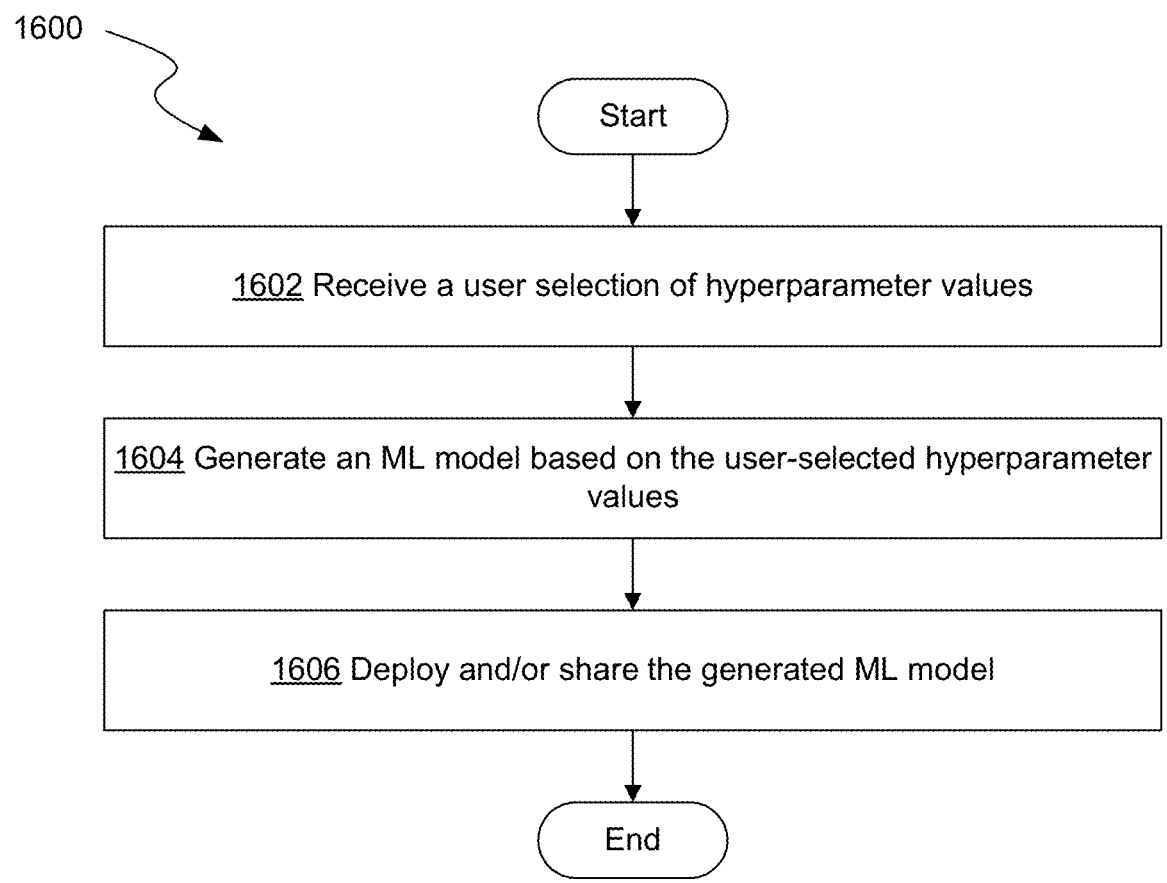
FIG. 16 shows a flow chart of an example process for generating and deploying an ML model based on tuned hyperparameters.

FIG. 16 shows a flow chart of an example process 1600 for generating and deploying an ML model based on tuned hyperparameter values. The example process 1600 begins at step 1602 with receiving a selection of the one or more hyperparameter values (i.e., the tuned hyperparameter values). For example, after performing the tuning process using visual analytics, a user may select an option, via the GUI, to build an ML model and may select, via that option, one or more hyperparameter values to utilize to configure the ML model.

At step 1604, an ML model is generated based on the tuned hyperparameter values and at step 1606 the ML model can be deployed, for example, into an enterprise computer system to perform business processes, or may be shared with other users such as other data science professionals or ML professionals.

Example Graphical User Interface

FIGS. 17-28 show screen captures of an example GUI through which the introduced technique for hyperparameter tuning can be implemented. Each of the illustrations is accompanied by descriptions of how the GUI operates and how a user can use the GUI to perform hyperparameter tuning when developing ML models. The included screen captures of the example GUI are provided for illustrative purposes to show certain example features. Other embodiments may include fewer or more user interaction features, may utilize different types of GUI elements, and/or may arrange the GUI elements differently than as described with respect to the following figures while remaining within the scope of the presently described innovations.

In some embodiments, the GUI described with respect to FIGS. 17-28 is implemented as part of a module of the DS platform 320. For example, a GUI module associated with the DS platform 320 may comprise hardware and/or software instructions configured to cause display of the GUI (including interactive elements associated with the GUI) at a client device associate with a user. The GUI module may also receive user inputs via the GUI and relay those user inputs to other computer systems associated with the DS platform 320 for carrying out other processes associated with the introduced technique. The GUI module may carry out certain processes for causing display of the GUI at the client device such as generating and rendering visualizations and other GUI elements and receiving user inputs (e.g., via an input device such as a keyboard, mouse, touch screen display, etc.). In some embodiments, the example GUI described with respect to FIGS. 17-28 is displayed at the client device via a web browser or another application associated with DS platform 320.

FIG. 17 shows an example ML model project overview screen. The example project overview screen depicted in FIG. 17 may represent an initial screen through which the user can view and define files to include in an ML model development project (e.g., datasets, scripts, etc.), set up jobs to be run as part of the project, and set up models to develop as part of the project. In the example screen depicted in FIG. 17, a user has set up a project to develop an ML model (specifically a convolutional neural network or "CNN") for recognizing handwritten digits using a training data set (specifically the MNIST dataset) that includes labeled images of handwritten digits. Such an ML model may be applied, for example, as part of a bank computer system for optical character recognition (OCR) of handwritten checks. The example GUI screens depicted in FIGS. 17-28 are described in the context of this use case (i.e., specifically relating to applying a CNN to perform OCR); however, a person having ordinary skill in the art will recognize that the described GUI features can similarly be applied to perform hyperparameter tuning of other types of ML models and for different purposes.

Figure 18:
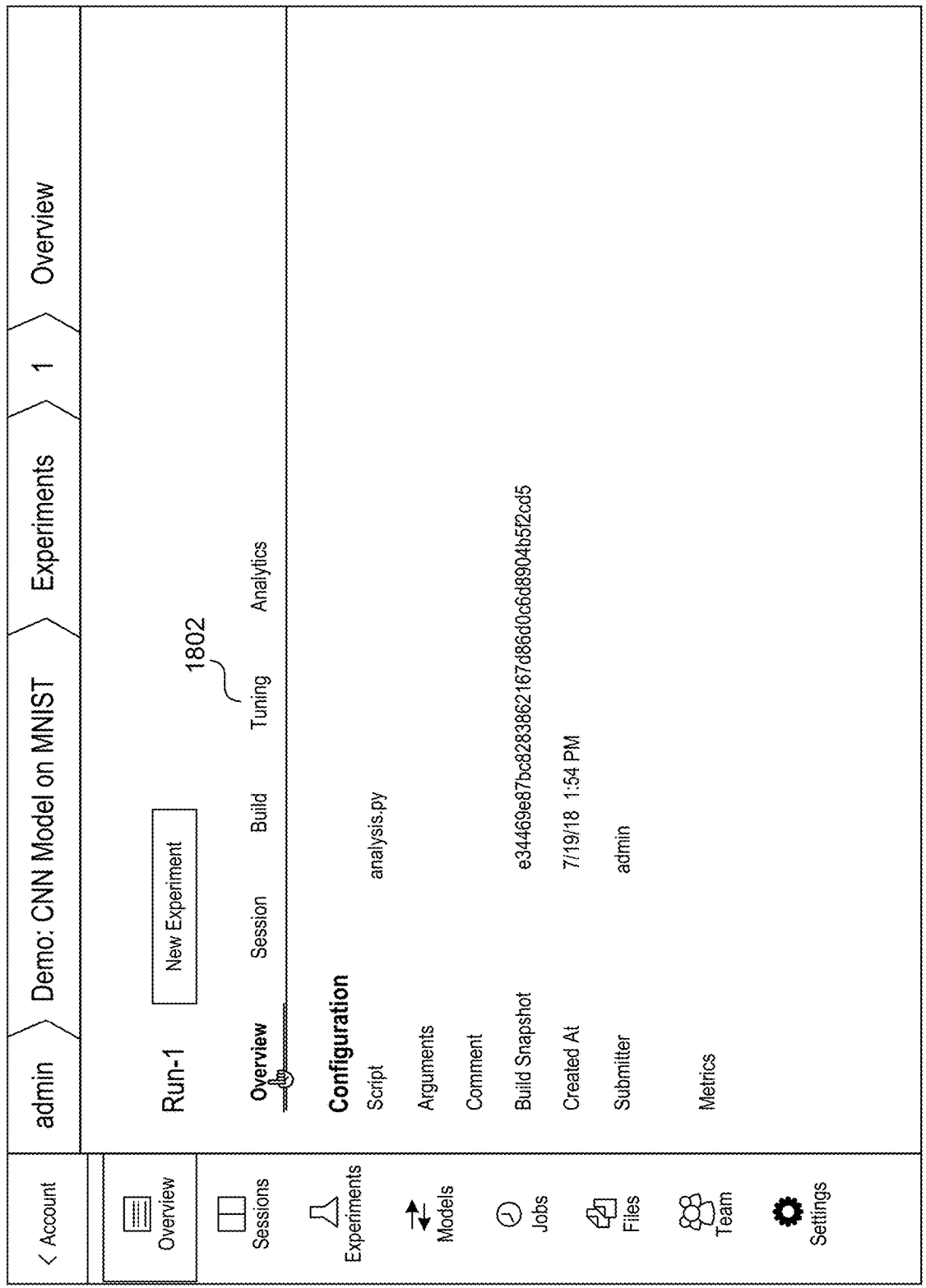
FIG. 18 shows an example experiment overview screen in the example GUI.

FIG. 18 shows an example experiment overview screen. For example, after setting up a new ML project (e.g., as described with respect to FIG. 17), the user can set up experiments to be run using the training dataset. As previously described, experiments may be defined using user-created scripts. For example, the experiment (or batch of experiments) called "Run-1" depicted in FIG. 18 will utilized a python script called "analysis.py" in order to process the training dataset and produce results.

Once the experiment (or batch of experiments) has been executed (partially or completely) a user can begin the process of analyzing the results and tuning the hyperparameter values for the ML model to improve results (i.e., improve performance metrics). For example, via the experiment overview screen depicted in FIG. 18, a user can select an interactive option 1802 to perform hyperparameter tuning.

In response to selecting the interactive option 1802 to perform hyperparameter tuning, the user is presented with a hyperparameter tuning dashboard, for example, as depicted in FIG. 19. FIG. 19 shows an example hyperparameter tuning dashboard that includes a hyperparameter panel 1902, a performance metric panel 1904, an overview table 1906, and one or more visualizations 1908.

The hyperparameter panel 1902 displays, for example, the ranges of values applied for one or more hyperparameters in a batch of experiments. For example, FIG. 19 depicts a scenario in which a batch of experiments (e.g., at least eight as suggested by table 1906) have been run based on a range of values for various hyperparameters such as batch size ("batch_size"), number of epochs ("num_epochs"), and dropout rate ("dropout_rate"). The types of hyperparameters depicted in panel 1902 are examples that may apply to a particular ML model type (i.e., a CNN), but may not apply to other model types. The types of hyperparameters depicted in the hyperparameter panel 1902 will differ depending on the type of ML project being analyzed. In some embodiments, the ranges of values for each hyperparameter may be displayed as a slider bar GUI element that enables user interaction to change the ranges. For example, in response to a user adjusting the ranges of values for a given hyperparameter (e.g., by interacting with a slider bar), other elements in the tuning dashboard such as visualization 1908 and/or performance metric panel 1904 may be dynamically updated to reflect the change, thereby enabling the user to iteratively explore relationships between hyperparameter values and performance metrics.

Similar to the hyperparameter panel 1902, the performance metric panel 1904 displays ranges of resulting values for various performance metrics such as accuracy ("acc"), loss ("loss"), etc. For example, the range of values for loss may represent the range of values for loss across the eight experiments executed as part of a batch of experiments. The range in values for the various performance metrics may be due, at least in part, to the ranges of various hyperparameter values applied when executing the experiments. Using the hyperparameter tuning dashboard, the user can explore these relationships. The types of performance metrics depicted in panel 1904 will differ depending on the type of ML project being analyzed.

In some embodiments, the hyperparameter panel 1902 and performance metric panel 1904 may be configured to support value (range) lock and filtering which can be utilized to carry through values when setting up new batches of experiments to run.

The overview table 1906 provides an overview of various experiments executed as part of a batch being analyzed. The overview table may include, for example, the hyperparameter values applied and resulting performance metric values output for each of the multiple experiments included in a batch of experiments. In the example scenario depicted in FIG. 19, the table 1906 includes a row for each experiment included in the batch with columns of values for each of the various hyperparameters and performance metrics for each experiment.

In some embodiments, the overview table 1906 can be linked to other visualizations and support sorting, filtering, selecting, etc. For example, by selecting a particular row in table 1906, other elements such as panels 1902, 1904, and visualization 1908 may be dynamically updated to reflect data for the experiment represented by that particular row. Similarly, a user may interact with table 1906 to select a subset of experiments from the batch (i.e., filter) or sort the experiments. In each case, user interaction with the table 1906 may cause other linked visualizations to be dynamically updated to reflect data based on the filtering, sorting, etc.

The visualization 1908 depicted in FIG. 19 is just an example of one type of visualization that may be displayed via a hyperparameter tuning dashboard. The example visualization 1908 in FIG. 19 includes a bar chart that plots values for a particular performance metric (e.g., accuracy) across each of the multiple experiments included in the batch. In some embodiments, certain visualization elements may be coded (e.g., color coded) to assist the user in analysis. For example, each bar plot in the example visualization 1908 may be color coded to a particular experiment included in the batch. As will be described in more detail, user interaction with visualizations such as visualization 1908 may similarly cause one or more other visualizations in the hyperparameter tuning dashboard to be dynamically updated. For example, in response to a user selecting one or more of the bar plots in the bar chart of visualization 1908, other elements such as panels 1902, 1904, and overview table 1906 may be dynamically updated to reflect the data associated with the selected bar plot. As an illustrative example, in response to the user selecting the bar plot for experiment 1 in table 1908 (i.e., the bar plot on the left), the overview table 1906 may be dynamically updated to highlight the values for experiment 1 (i.e., the first row of values). Similarly, the hyperparameter panel 1902 may be dynamically updated to reflect the hyperparameter values applied as part of experiment 1, and performance metric panel 1904 may be dynamically updated to reflect the values for various performance metrics included in the results for experiment 1.

Figure 20A:
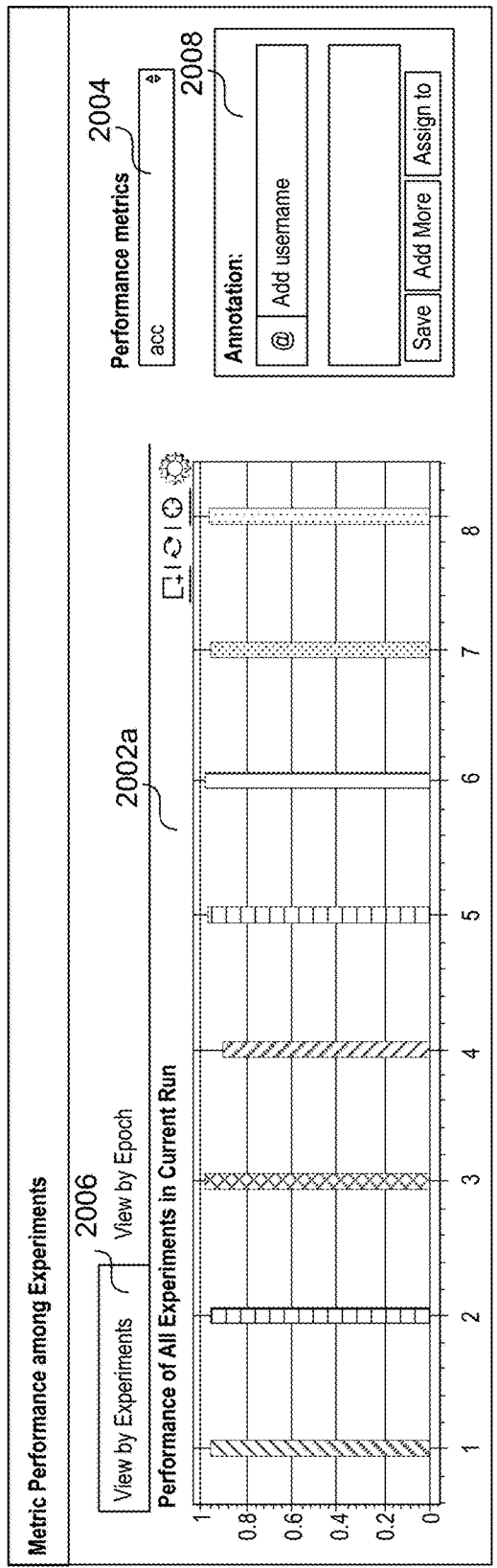
FIGS. 20A-20B show details of example interactive bar chart visualizations in the example hyperparameter tuning dashboard in the example GUI.

FIGS. 20A-20D show various interactive features associated with visualizations that enable users to explore relationships between hyperparameters and performance metrics. FIG. 20A shows a screen capture of an interactive visualization, for example, similar to the interactive visualization 1908 described with respect to FIG. 19. The visualization depicted in FIG. 20a includes a first state of a bar chart 2002a and various GUI elements such as an option 2004 to select a performance metric, an option 2006 to select a chart type, and option 2008 to enter user annotations.

Figure 20B:
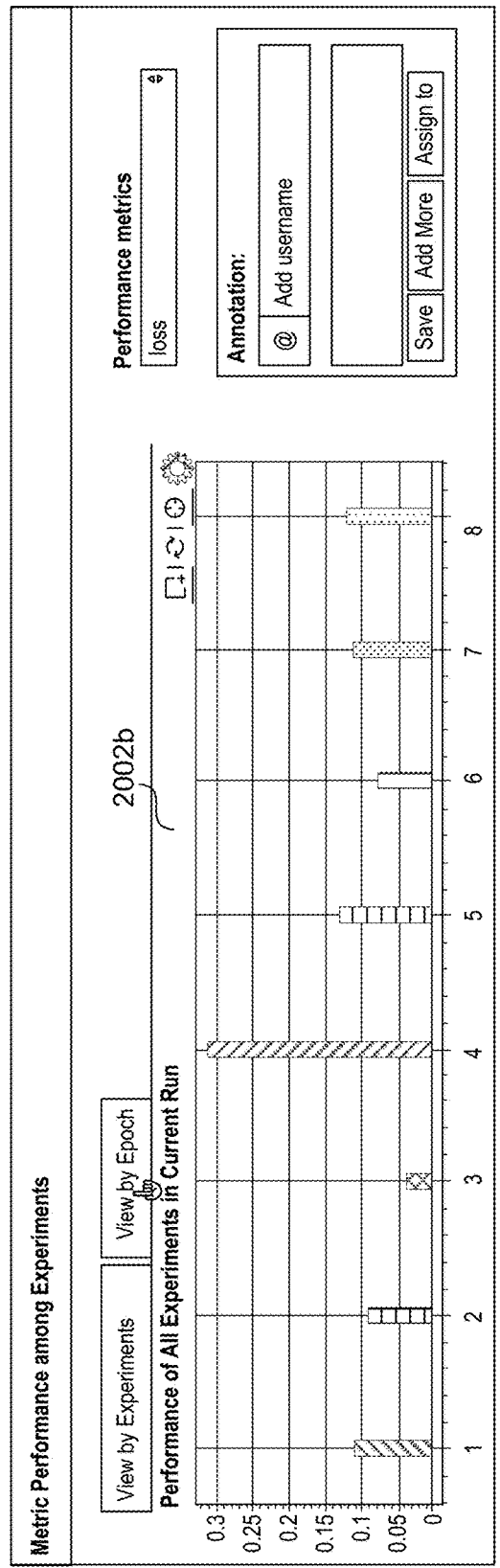

Using option 2004, a user may adjust the visualization to reflect the values for different performance metrics. For example, the first state of the bar chart 2002a plots the values for the accuracy performance metric for each of the multiple experiments included in the batch. Notably, in this example, the accuracy is roughly similar across each of the multiple experiments, each having different combinations of hyperparameter values. This does not provide the user with much insight into how the various hyperparameters impact overall performance of the ML model. In other words, despite some variation, accuracy seems to be relatively high across all tested hyperparameter values. If the user instead wishes to view how a different performance metric varies across experiments they can select that performance metric via the option 2004. For example, FIG. 20B shows a second state of the bar chart 2003b that plots values for loss across the various experiments. In this case, the bar chart 2002b depicted in FIG. 20B reveals that loss is particularly high in experiment 4, which differs significantly from the values for loss in the other experiments. Using this information, the user can gain insight into how certain hyperparameter values affect loss for this particular ML model.

The example option 2004 is depicted for illustrative purposes in FIGS. 20A-20D as a pull-down menu; however, this is not to be construed as limiting. Various other types of GUI features may be implemented without departing from the scope of the present disclosure.

Figure 20C:
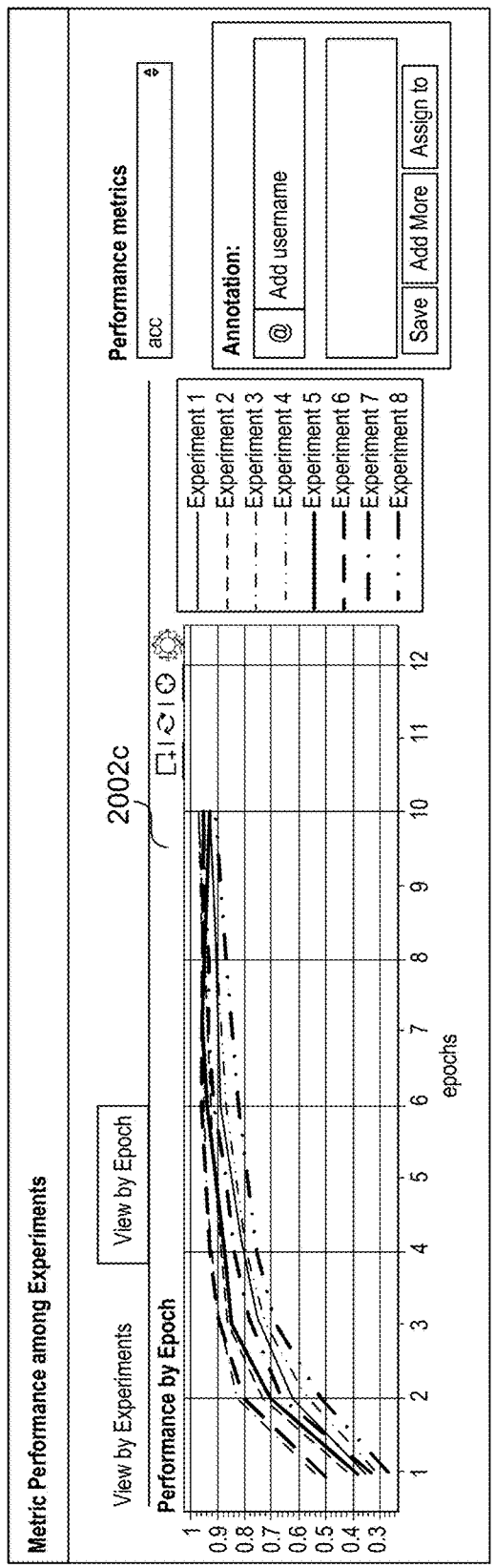
FIGS. 20C-20D show details of example interactive line graph visualizations in the example hyperparameter tuning dashboard in the example GUI.
Figure 20D:
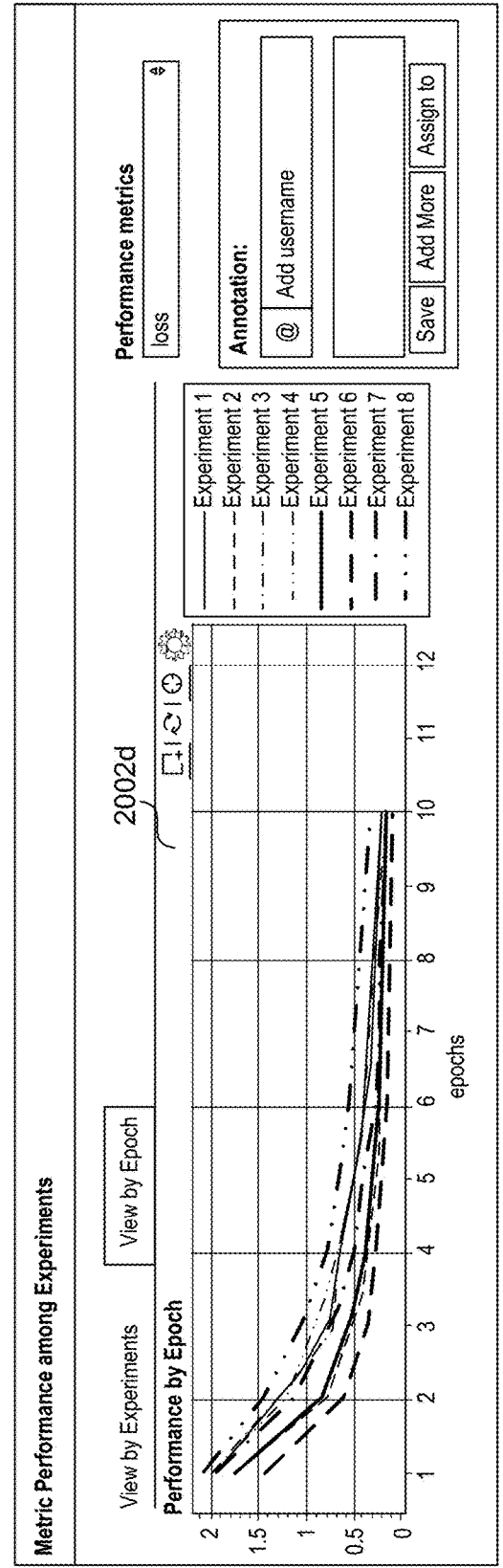

The visualizations in FIGS. 20A and 20B depict bar charts that plot various performance metrics by experiment; however, other types of visualizations may also be displayed. FIGS. 20C and 20D show line graphs that plot various performance metrics by epoch for each of the experiments and may be displayed, for example, in response to user interaction with option 2006. Specifically, FIG. 20C shows a line graph 2002c that plots accuracy values returned for each experiment at each epoch and FIG. 20D shows a line graph 2002d that plots loss values returned for each experiment at each epoch. The epoch hyperparameter may only be applicable in certain types of ML models such as CNNs. For example, epoch in the context of a CNN refers to each time the dataset is iteratively passed through the CNN. As seen in FIG. 20C, accuracy increases at each epoch, but the rate of increase decreases. Similarly, loss decreases at each epoch, but the rate of decrease also decreases. In other words, by viewing the visualizations in FIGS. 20C-20D, a user may gain the insight that increasing the number of epochs in a given CNN results in diminishing returns (at least for accuracy and loss) after a certain number of epochs.

Returning to FIG. 20A, the option 2008 to enter user annotations enables a user to enter annotations regarding their insights. These annotations may be linked to particular states of various visualizations which enables the user to go back and explore the methodology of their analysis, aid in forming conclusions, and share with others, for example, to collaborate on developing a model. The option 2008 to enter annotations is depicted in FIGS. 20A-20D as an editable text field; however, this is not to be construed as limiting. Various other types of GUI features may be implemented without departing from the scope of the present disclosure.

Figure 21:
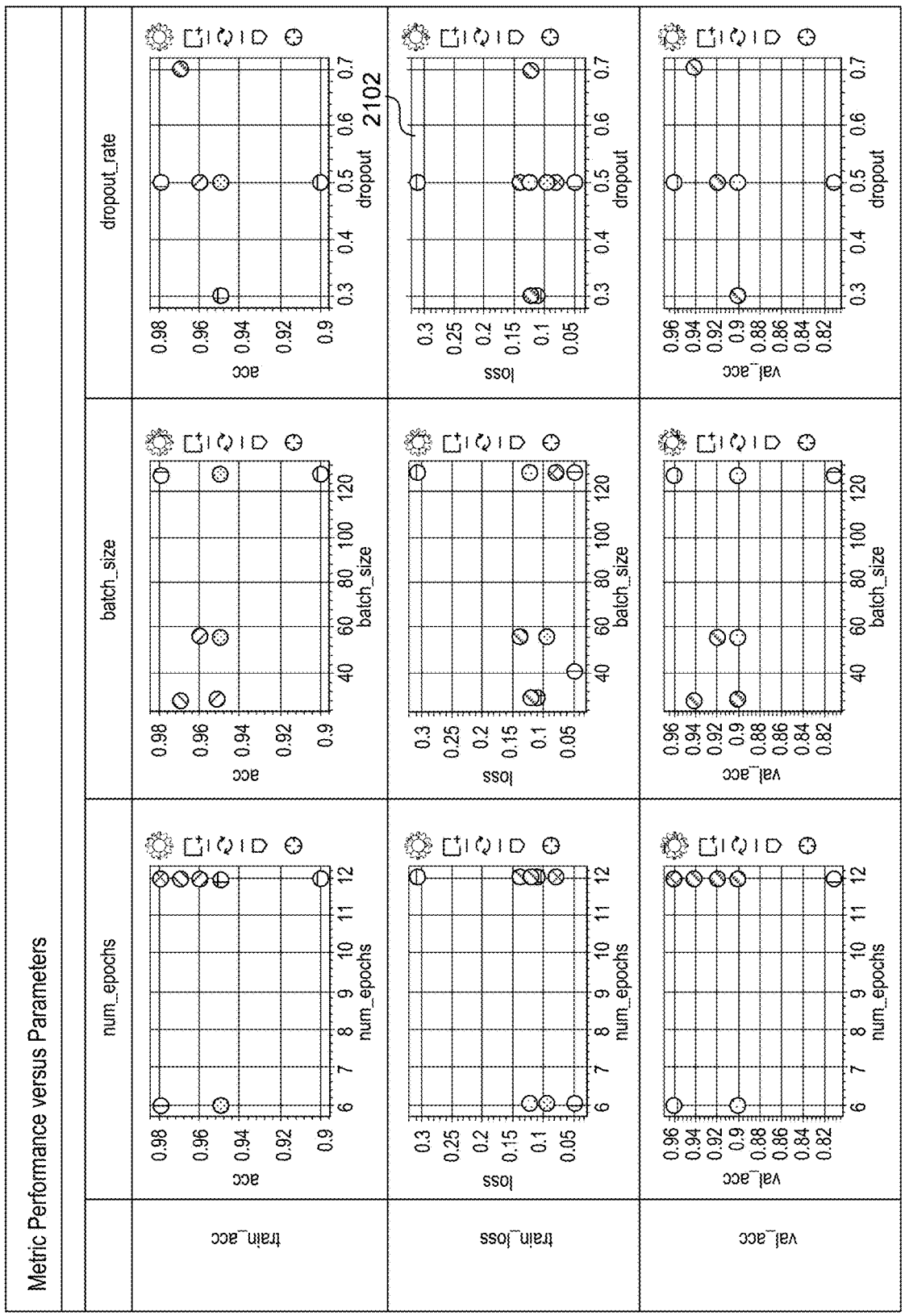
FIG. 21 shows a detail of an example interactive scatter plot visualization in the example hyperparameter tuning dashboard in the example GUI.

FIG. 21 shows an example interactive visualization in the form of a scatterplot matrix. The example scatterplot matrix depicted in FIG. 21 includes multiple scatter plot visualizations arranged in columns (according to hyperparameters) and rows (according to performance metric). For example, a particular scatter plot 2102 plots the value pairs for a particular combination of hyperparameter and performance metric (specifically, dropout rate and training loss, respectively) for each of the multiple experiments included in a batch of experiments. For example, a particular data point in the particular scatter plot 2102 plots the value for the dropout rate hyperparameter on the x-axis versus the resulting value for the training loss performance metric on the y-axis for a particular experiment included in the batch of experiments.

Presenting scatter plots for multiple hyperparameter/performance metric value pairs in such a grid format may allow a viewing user to quickly identify patterns and gain insight into how certain hyperparameters affect certain performance metrics. In some embodiments, each data point in each scatter plot in the example scatter plot matrix may be coded (e.g., color coded) to a particular experiment included in the batch to aid the user in such analysis.

Figure 22:
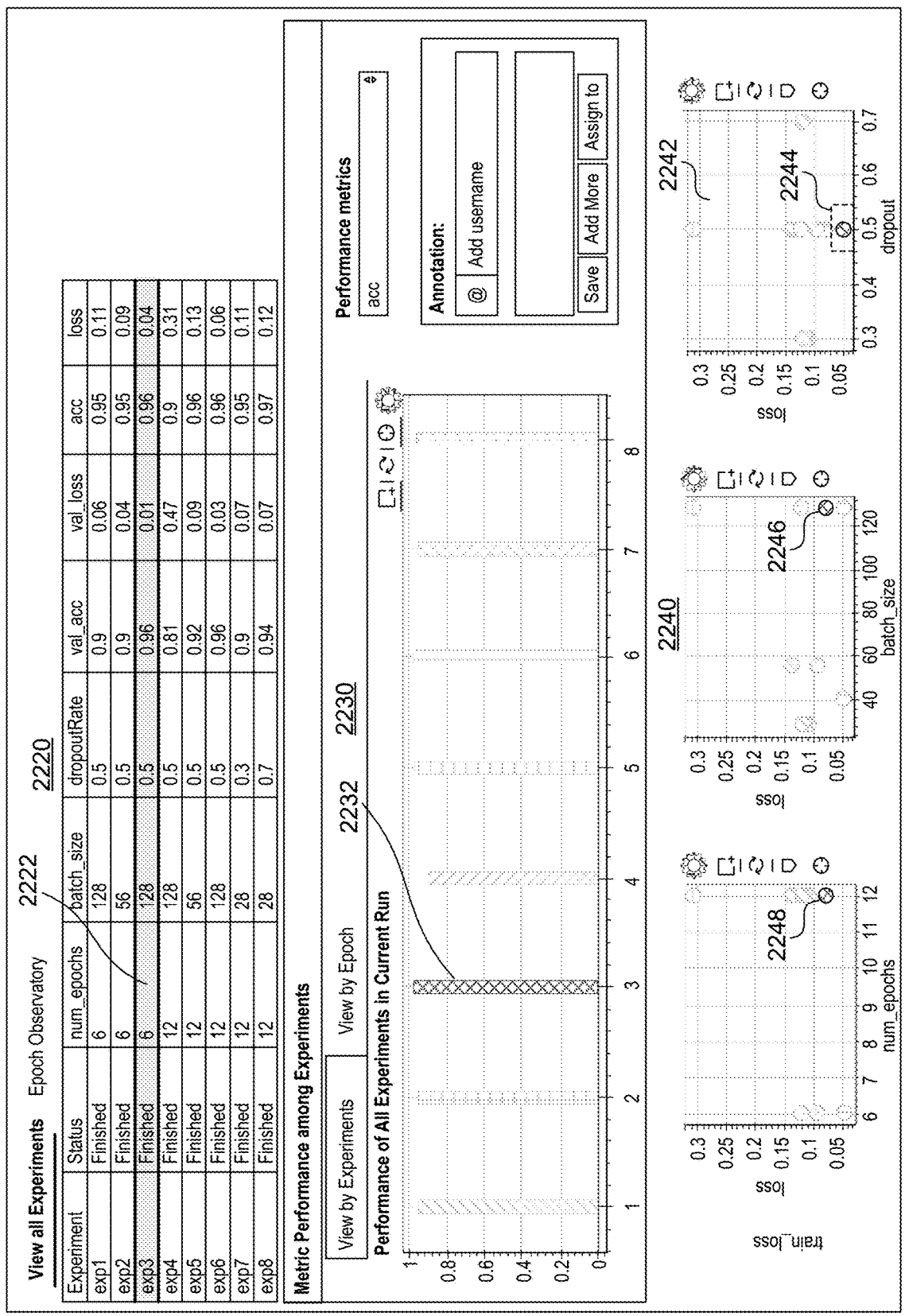
FIG. 22 illustrates the linking of various visualizations in the example hyperparameter tuning dashboard in the example GUI.

As previously discussed, various visualizations in a hyperparameter tuning dashboard may be linked together. In other words, one visualization may be linked to another visualization such that user interaction with one visualization causes the other visualization to dynamically update based on the user interaction. FIG. 22 shows an example view of the interactive hyperparameter tuning dashboard that illustrates the linking of various visualizations. Specifically, the example view depicted in FIG. 22 shows an overview table 2220 (similar to overview table 1906 in FIG. 19), a bar chart visualization 2230 (similar to bar chart visualization 1908 in FIG. 19), and a scatter plot matrix 2240 (similar to the scatter plot matrix in FIG. 21).

In the example screen depicted in FIG. 22, each of these three visualization types are linked such that user interaction with any one of the visualizations causes the other visualizations to be dynamically updated based on the user interaction. For example, a user may select one or more of the plotted points in one of the scatter plots 2242 included in the scatter plot matrix 2240. The user's selection input may include, for example, clicking (or touching) one or more of the points in scatter plot 2242, providing a drawing input (e.g., circling one or more of the points), or providing a brushing input (e.g., by dragging and releasing a cursor). For example, in FIG. 22, a user has provided a brushing input by dragging the cursor over a particular one of the plotted points in scatter plot 2242. This selected area based on the user's brushing input is indicated by the dotted line 2244.

In response to detecting the user interaction with scatter plot 2242 selecting the particular point, the other visualizations 2220 and 2230 may be dynamically updated based on the user interaction. For example, since the selected point is based on one of the experiments, the other visualizations may be updated to highlight that relevant experiment. Specifically, the overview table 2220 may be dynamically updated to highlight the row 2222 pertaining to the relevant experiment and the bar chart 2230 may be updated to highlight the bar plot pertaining to the relevant experiment. The other interactive scatter plots in the scatter plot matrix 2240 may be similarly updated. For example, the other scatter plots may be updated to highlight plotted points 2246 and 2248 that pertain to the relevant experiment (i.e., the same experiment as plotted point 2244). This interface mechanism may work similarly based on user interaction with any of the other linked visualizations such as 2220 and 2230. In this way, if the user identifies a data point of interest in one visualization they are immediately and automatically presented with information in other visualizations relating to that data point.

Figure 23A:
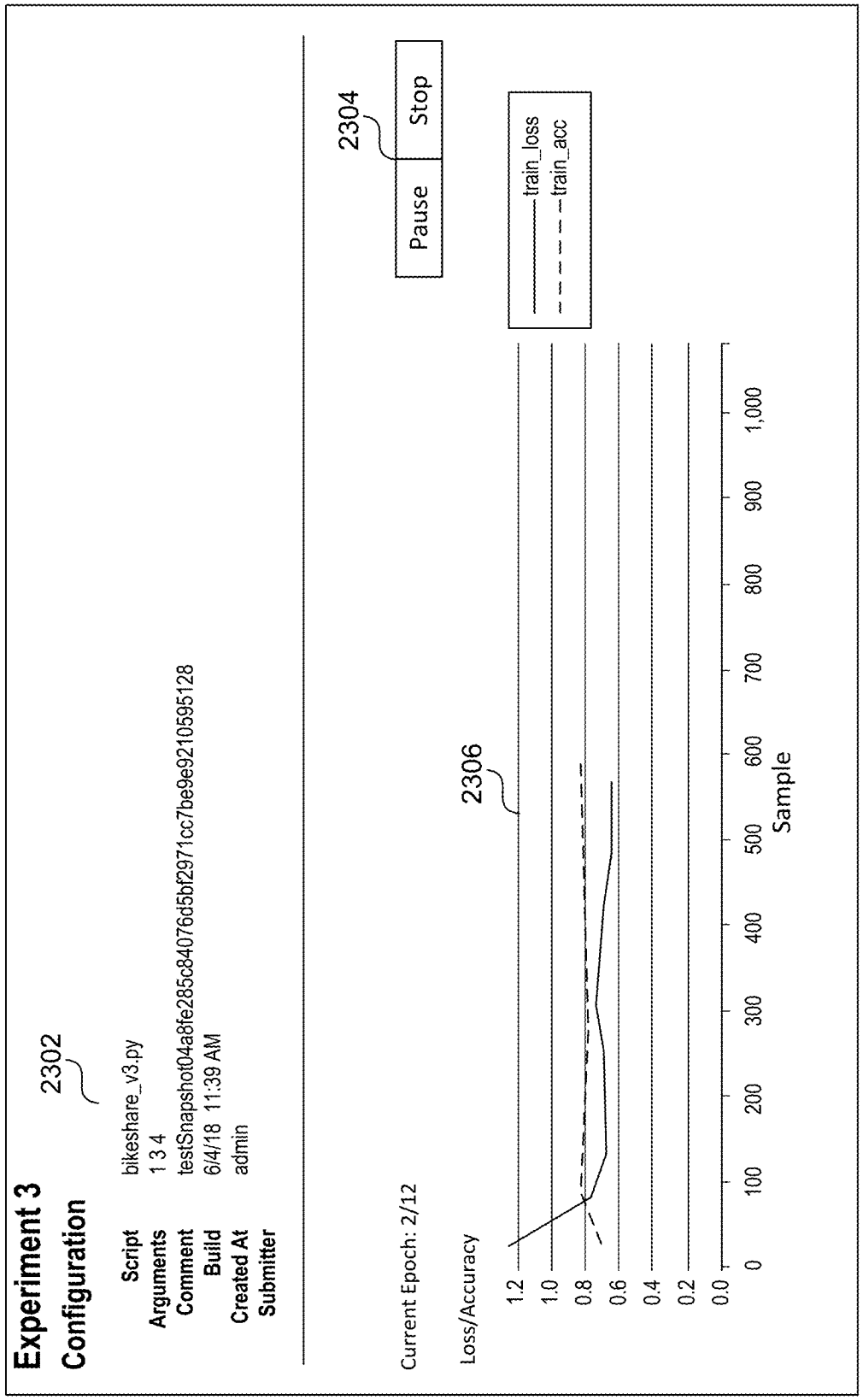
FIG. 23A shows a detail of an example interactive epoch observatory visualization in the example hyperparameter tuning dashboard in the example GUI.
Figure 23C:
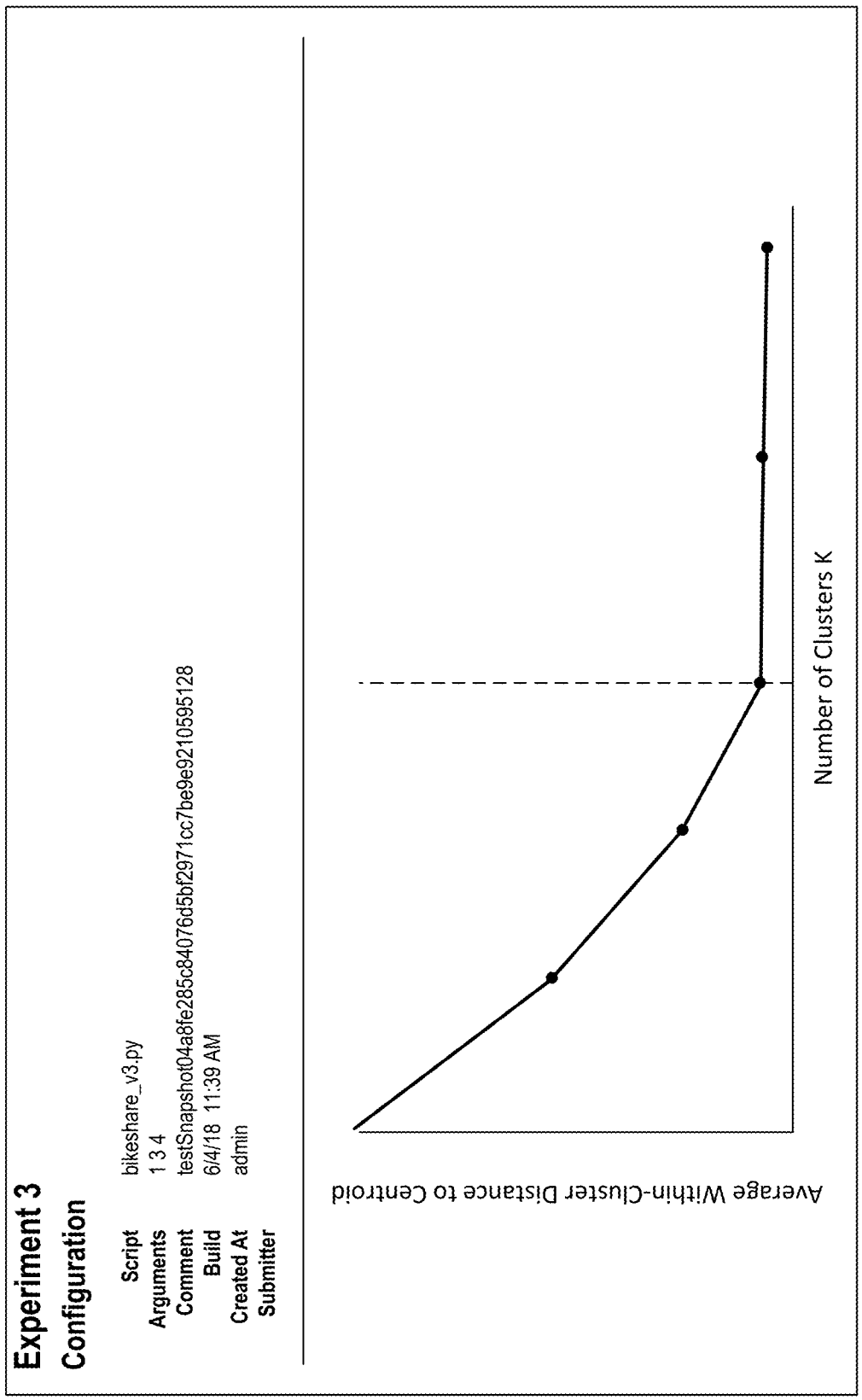
FIG. 23C shows a detail of an example interactive elbow graph visualization in the example hyperparameter tuning dashboard in the example GUI.

In some embodiments, the hyperparameter tuning dashboard may be configured to allow users to drill down into the data for specific experiments included in the batch of experiments. FIGS. 23A-23C show some example experiment-specific visualizations that may be displayed to a user, for example, in response to the user selecting a specific experiment from another visualization.

FIG. 23A shows an example screen of an epoch observatory visualization. As previously mentioned, epochs may be applicable to certain ML models such as CNNs, but are not necessarily applicable to others. As shown in FIG. 23A, the epoch observatory visualization may include information 2320 regarding the visualized experiment as well as a line graph 2306 that plots the progress of various performance metrics (in this case loss and accuracy) over various epochs during the experiment execution. In some embodiments, an option 2304 may be presented to allow the user to start, stop, pause, and rewind the progression of the plot over the multiple epochs. For example, in response to pressing play, the two lines depicted in graph 2306 will dynamically extend from left to right charting the progress of the two performance metrics during execution of the experiment. The user can pause or stop this animation to observe the data, rewind, or otherwise interact with the visualization, for example, using any of the aforementioned GUI mechanics.

FIG. 23B shows an example screen of a confusion matrix visualization. Again, such a visualization may be specific to certain ML models such as a CNNs, specifically CNNs configured to recognize handwritten digits. A confusion matrix such as the one depicted in FIG. 23B may provide a user with valuable insight into how the ML model will perform in the real world. For example, FIG. 23B shows a particular state of a confusion matrix visualization in which a user has placed a cursor over a point in a grid 2312 corresponding to the number of times a handwritten "2" was misclassified by the ML model as a "6." The visualization further includes images 2314 of the misclassified handwritten digits. As the user moves a cursor over the grid 2312 the images 2314 will dynamically change to depict images of other misclassified digits (e.g., a handwritten "8" misclassified as a "3").

The experiment-specific visualizations depicted in FIGS. 23A-23B are only examples provided for illustrative purposes and may only apply to certain ML model types and ML model goals (e.g., a CNN configured for OCR). Other types of experiment specific visualizations may similarly be utilized for other types of ML models and goals. For example, FIG. 23C shows an example line experiment-specific visualization in the form of an elbow graph that can be displayed to a user to assist a user in identifying an optimal number of clusters K for a k-means clustering algorithm. For example, the visualization depicted in FIG. 23C plots the number of clusters K (a hyperparameter) against the average within-cluster distance to centroid (a performance metric) and identifies an optimal value for K at the "elbow" of plot as visually indicated by the vertical dotted line.

FIGS. 24-26C show a series of screens that illustrate how a user can utilize the hyperparameter tuning dashboard to set up additional experiments, for example, to analyze new hyperparameter values.

Figure 24:
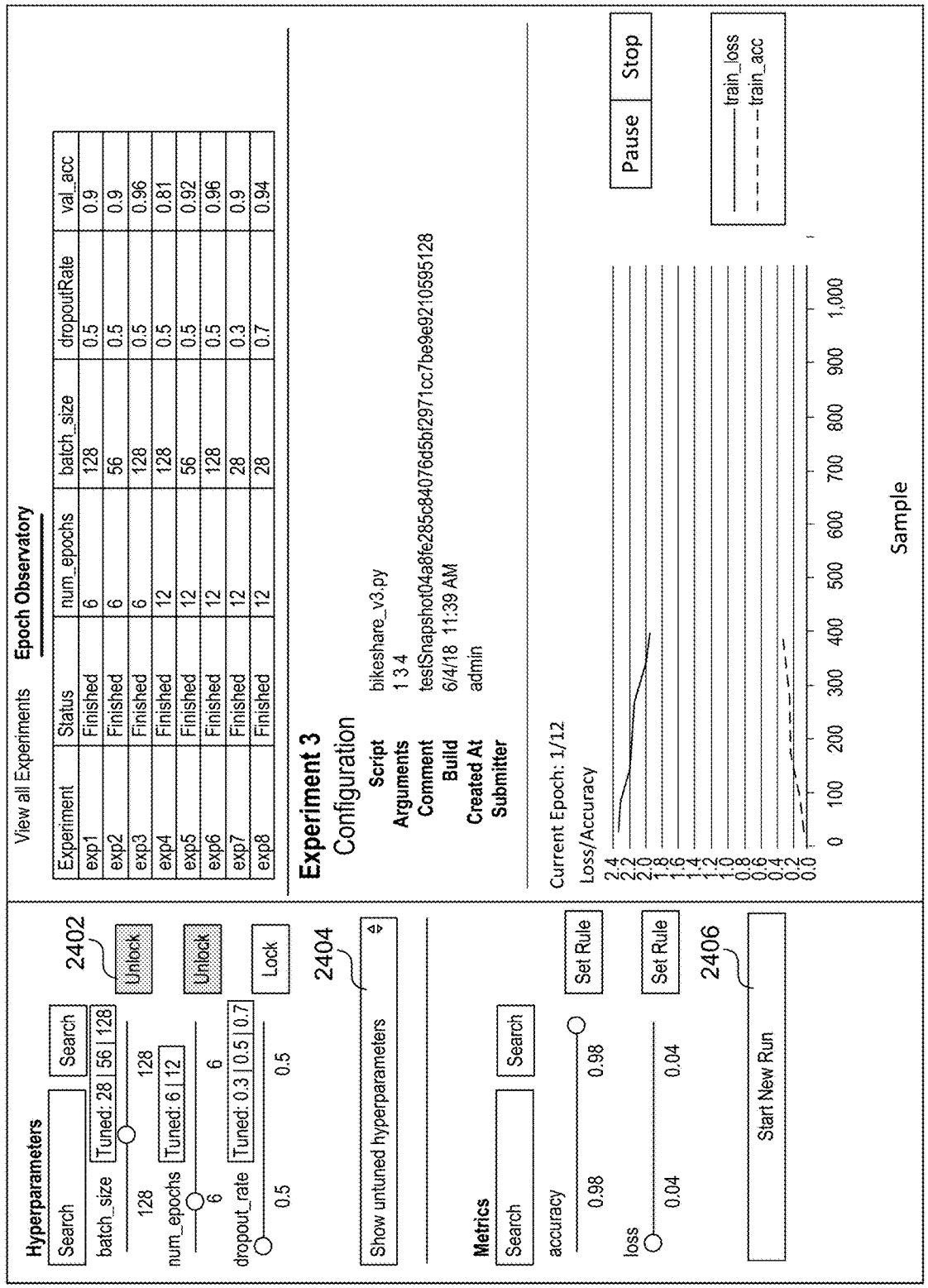
FIG. 24 illustrates the selection of hyperparameter values in the example hyperparameter tuning dashboard in the example GUI.

FIG. 24 shows a view of the hyperparameter tuning dashboard, for example, similar to the dashboard depicted in FIG. 19. In the example scenario depicted in FIG. 24, the user has locked a few of the hyperparameter values, for example, by interacting with the elements 2402 in the hyperparameter panel 1902. After having analyzed the results of an initial batch of experiments, the user may select a preferred value or range of preferred values for various hyperparameters and lock that value or range of values in as a tuned hyperparameter.

At this point hyperparameter tuning may be complete, or the user may wish to explore model performance using additional hyperparameters. For example, in the scenario depicted in FIG. 24, the hyperparameters batch size ("batch_size"), number of epochs ("num_epochs"), and dropout rate (dropout_rate") have been tuned. Since the user is developing a CNN, the user may also wish to explore how the number of layers in the CNN affects model performance. To do so, the user may select other untuned hyperparameters, for example, by interacting with option 2404. The types of available hyperparameters will depend on the type of ML model being developed. The example option 2404 is depicted in FIG. 24 as a as a pull-down menu; however, this is not to be construed as limiting. Various other types of GUI features may be implemented without departing from the scope of the present disclosure.

The user can elect to run a new batch of experiments, for example, by interacting with element 2406. In response to interacting with element 2406, the user is presented with a hyperparameter selection screen, for example, as depicted in FIG. 25A. As shown in FIG. 25A, values for certain hyperparameters may be pre-populated, for example, based on user input locking certain values and/or ranges of values via panel 1902. The prepopulated values are depicted in the editable text fields 2502. Through these editable text fields, a user can modify the value selections, for example, by entering new values. Hyperparameter selection screen also includes an option 2504 to add new hyperparameters for testing using the new batch of experiments. The example hyperparameter selections 2502 are depicted in FIG. 25A as editable text fields and the example option 2504 is depicted in FIG. 25A as a as a pull-down menu; however, these are not to be construed as limiting. Various other types of GUI features may be implemented without departing from the scope of the present disclosure.

As previously discussed with respect to FIG. 11, in response to receiving a user selection of hyperparameter values to be tested, the system may display to the user an interactive listing of proposed experiments to run to test the various hyperparameter combinations. FIG. 25B shows an interactive listing 2508 that includes eight additional proposed experiments based on the user's selection (e.g., via option 2504) to include a range of values for a hyperparameter defining the number of layers in the CNN, as indicated at 2506.

In some embodiments, the interactive listing 2508 of proposed experiments may include experiments for every combination of selected hyperparameter values; however, as described with respect to FIG. 12, some of these proposed experiments may be redundant to previously executed experiments. Such redundant experiments can be highlighted to the user via the interactive listing 2508, for example, as shown in notification 2510. Notification 2510 conveys to the user that a previously executed experiment had settings that are similar to the first proposed experiment included in the interactive listing. To save computing resources and thereby save time and money, the user may elect to skip this first proposed experiment, for example, by interacting with option 2512. As shown in FIG. 25B each proposed experiment in the interactive listing 2508 includes an option 2512 to skip that experiment (i.e., to not include it in a batch execution).

Figure 25C:
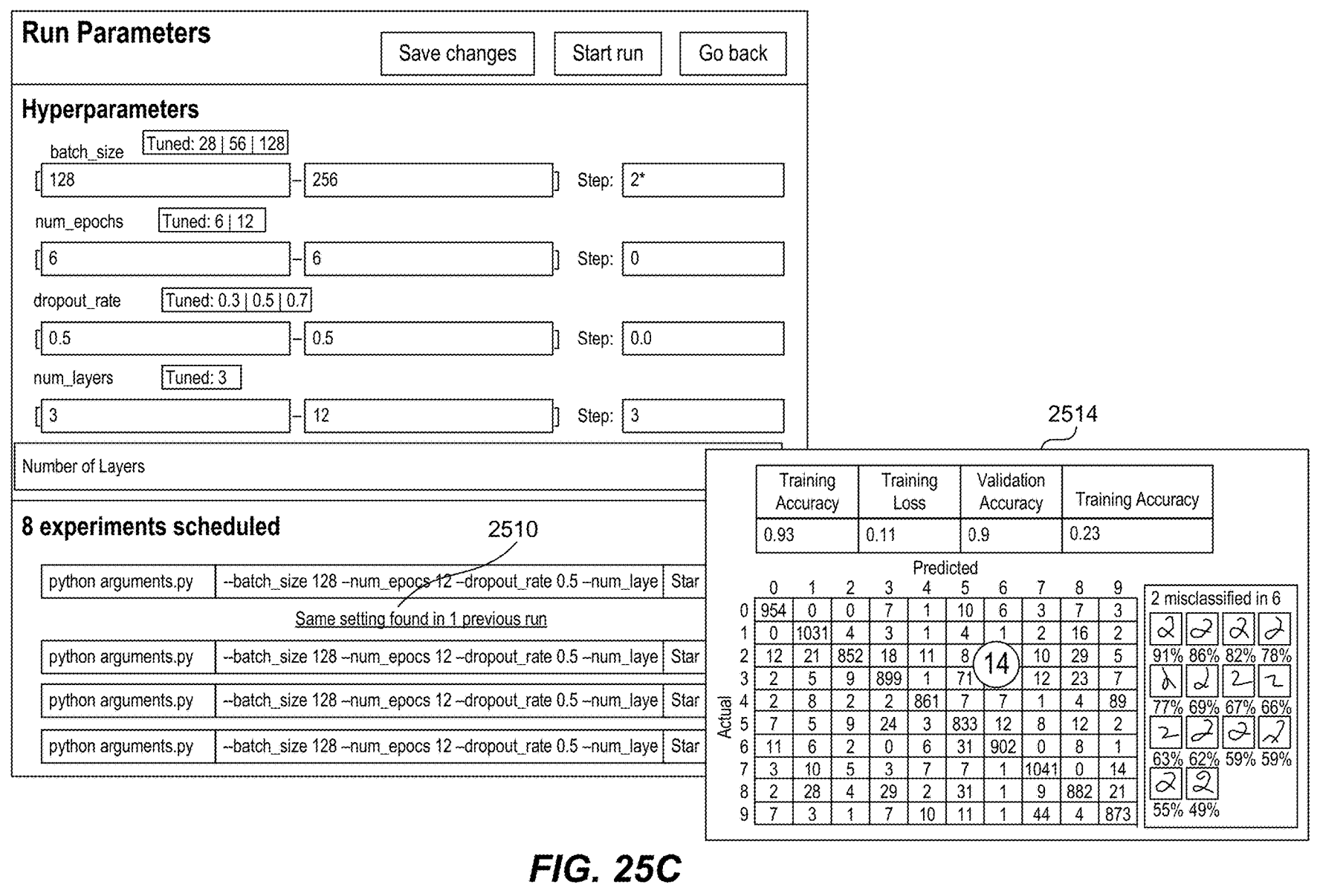

Before skipping the first experiment, the user may wish to review the results from that previously executed experiment. For example, as shown in FIG. 25C, in response to interacting with the notification 2510, a user may be presented with information regarding the results from the experiment(s) referenced by notification 2510. In FIG. 25C, the information presented to the user includes a confusion matrix 2514 that depicts various performance metrics included in the results of the experiment as well as a graphical representation of the predictions versus actual values resulting from application of the resulting ML model. The example confusion matrix 2514 depicted in FIG. 25C is specific to a CNN configured for OCR, specifically for recognizing handwritten digits. Other embodiments may present information differently depending on characteristics of the referenced experiment, the type of ML model being developed, the problem to be solved by the ML model, etc.

In some embodiments, the interactive listing may include additional information to provide intelligent assistance to the user in setting up new batches of experiments. For example, as previously described with respect to FIG. 13, in some embodiments, the system can determine costs associated with executing any of the proposed experiments and display those costs in the interactive listing of proposed experiments.

FIG. 25D shows an interactive listing 2508 that further includes an associated interactive element 2516 (e.g., in the form of a pull-down menu) that displays determined costs associated with executing any of the proposed experiments. The costs displayed may include, for example, monetary costs as well as time costs (i.e., time duration of execution). Notably, the interactive element 2516 displays determined costs for several computing resource options such as a premises computing cluster option, a first cloud computing cluster option (e.g., Amazon AWS On-Demand™), and a second cloud-computing cluster option (e.g., Amazon EC2 Spot™). For example, Amazon AWS On-Demand™ may be relatively quicker, but relatively more expensive and Amazon EC2 Spot™ may be relatively cheaper, but relatively slower. The costs displayed in interactive element 2516 may be calculated on a per-experiment and/or for the entire batch. For example, in some embodiments, each row in the interactive listing 2508 may include an associated interactive element similar to element 2516 through which a user may view the costs associated with executing each experiment. In some embodiments, as the user selects which experiments to run and which to skip a total overall cost 2518 may be displayed in the interactive listing 2518.

As alluded to above, in some embodiments the DS platform 320 may support various different computing resources that can be utilized to execute experiments. In addition to displaying the associated costs, in some embodiments, the interactive listing may include an option to select a computing resource to utilize to execute any one or more experiments. For example, the interactive element 2516 depicted in FIG. 25D includes options to select one of the available computing resource options. In some embodiments, the interactive listing 2508 may enable the user to select specific computing resources for each experiment or may enable the user to select one computing resource that will be utilized to process an entire batch.

Further, as described with respect to FIG. 14, in some embodiments, the system can determine constraints associated with the processing of the experiments and either display recommendations in the interactive listing to optimize the set of experiments or automatically adjust the set of proposed experiments included in the listing to optimize.

FIG. 25E shows an example element 2520 associated with the interactive listing 2508 that displays a recommendation to optimize the set of experiments. For example, based on some constraint (e.g., available computing resources, costs to execute, etc.), element 2520 may display a recommendation to select or deselect certain listed experiments (e.g., as indicated by the checked and un-checked boxes). This is only an example of a recommendation that is presented in simplified terms for illustrative purposes. In some embodiments the recommendation may be presented with additional information (e.g., associated costs) to convey to the user the basis of the recommendation. Further, the recommendation may not always be binary (i.e., yes/no). In some embodiments the system may generate, for example, a score that indicates a level of recommendation for a given experiment to the user. As an illustrative example, element 2520 may display to the user a score (e.g., a value from 0-10, with 0 indicating strongly not recommended and 10 indicating strongly recommended) that indicates a gradient level of recommendation for each proposed experiment included in the interactive listing 2508.

After executing one or more batches of experiments, the user can switch to a hyperparameter analytics dashboard to perform further analysis of the results. FIGS. 26A-28 show several screens of an example hyperparameter analytics dashboard. The hyperparameter analytics dashboard may be similar to the hyperparameter tuning dashboard in that it includes multiple linked visualizations but may differ in that the visualizations are based on results from multiple batches of experiments.

Figure 26A:
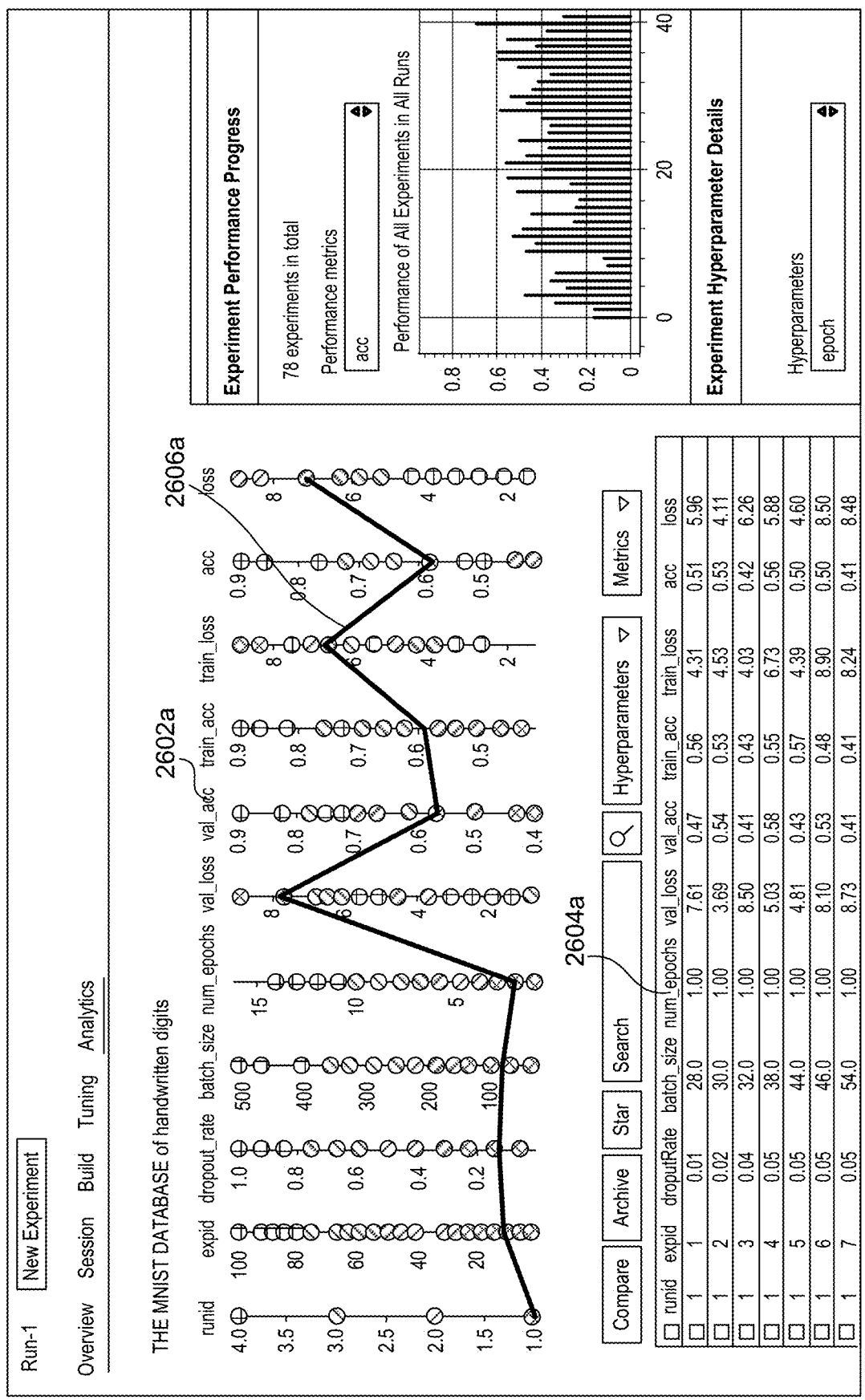
FIG. 26A shows an example hyperparameter analytics dashboard in the example GUI.

FIG. 26A shows a first screen of an example hyperparameter analytics dashboard. As shown in FIG. 26A, the hyperparameter analytics dashboard may include an interactive visualization in the form of a parallel coordinates graph 2602a. The example parallel coordinates graph 2602a arrays multiple variables (including hyperparameter values and performance metric values) alongside one another with each scaled from highest to lowest value (highest at the top, lowest at the bottom). In some cases, lines connect each entity's position for each variable, horizontally across the graph. The example graph 2602a depicted in FIG. 26A includes a single line 2606a that connects variable values relating to a specific experiment. As the user selects other experiments, the line 2606a will dynamically update, thereby revealing patterns to the user. The user may select certain experiments, for example, by interacting with the graph 2606a (e.g., by clicking on a coordinate in one of the columns), by selecting one of the experiments included in the overview table 2604a.

Figure 26B:
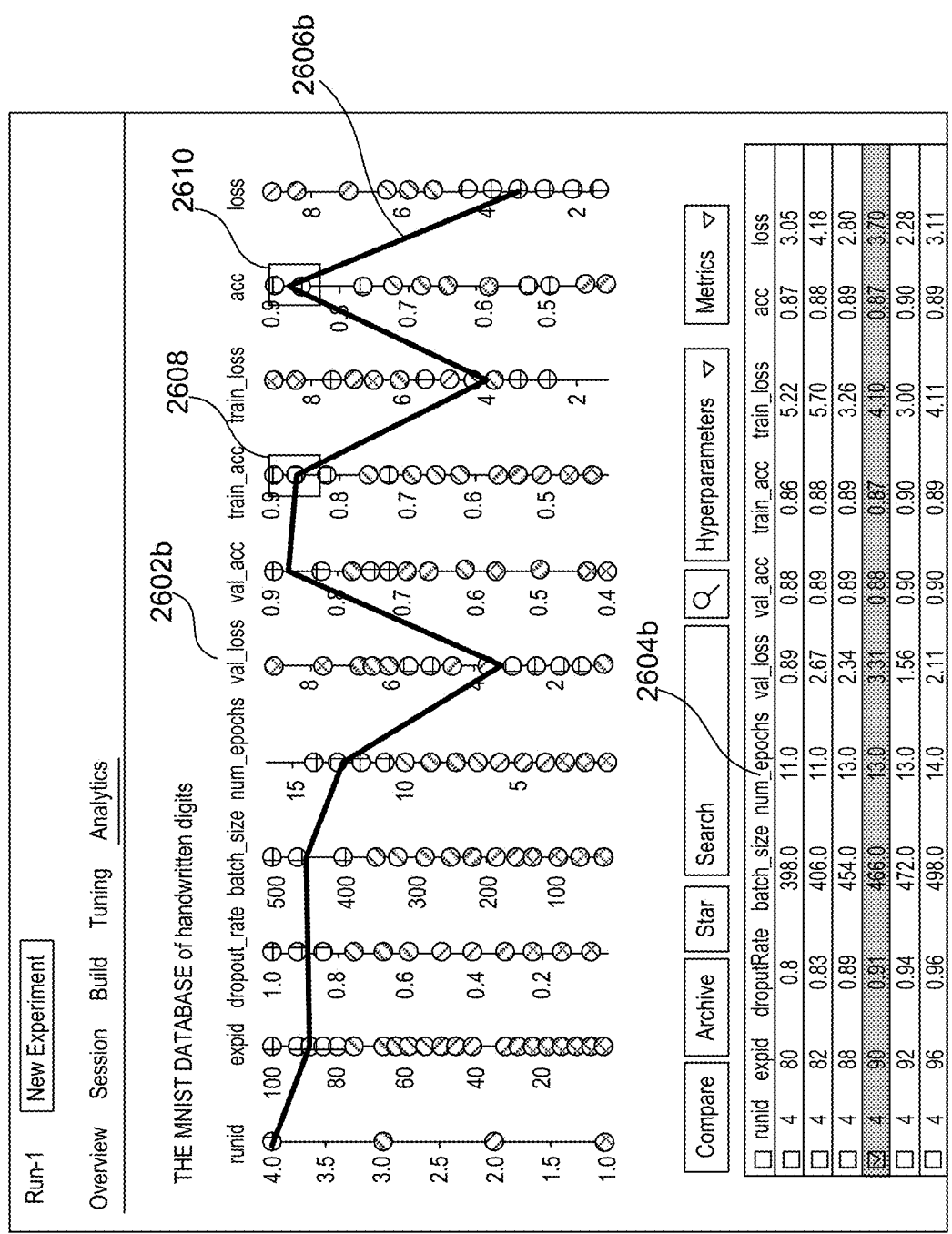
FIG. 26B shows a detail of an example interactive parallel coordinates visualization in the example hyperparameter analytics dashboard in the example GUI.

In some embodiments, the user may select ranges of values, for example, by providing a brushing input over one or more of the columns in a parallel coordinates graph. FIG. 26B shows a second screen of the example hyperparameter analytics dashboard that illustrates this GUI mechanism. Specifically, FIG. 26B shows a second state 2602b of the parallel coordinates graph 2602a shown in FIG. 26A. As shown in FIG. 26B, a user has interacted with the parallel coordinates graph 2602b to provide a brushing input along the columns for two of the variables, specifically performance metrics for training accuracy ("train_acc") and overall accuracy ("acc"), as indicated by the boxes 2608 and 2610 (respectively).

The user's brushing input may filter the displayed results based on specified ranges for these two hyperparameter values. For example, the user may wish to identify which experiments resulted in a training accuracy and overall accuracy in the specified ranges and what values were set for various hyperparameters in those experiments. In the example depicted in FIG. 26B, the line 2606b indicates to the user that experiment 4 (i.e., associated with "runid" 4), resulted in values for both training accuracy and overall acracy that fall within the ranges specified based on the brushing input.

Further, the user can quickly ascertain the hyperparameter values set for experiment 4 by observing where line 2606b intersects various other columns. For example, by observing line 2606b, the user may quickly identify that for experiment 4, the dropout rate ("dropout_rate") was set to approximately 0.90, the batch size ("batch_size") was set to approximately 450, and the number of epochs ("num_epochs") was set to approximately 13. In some embodiments, this information may also be ascertained by dynamically updating the corresponding overview table, for example, by highlighting the values associated with the relevant experiment, as shown in table 2604b.

In the example depicted in FIG. 26B, the parallel coordinates graph 2602b only displays a line 2606b corresponding to one experiment; however, in other scenarios the graph may display multiple lines corresponding to multiple experiments. For example, if multiple experiments included results for training accuracy and overall accuracy that satisfy the filters specified by brushing inputs 2608 and 2610, the parallel coordinates graph 2602b may display multiple lines, each corresponding to a different experiment. As with other visualizations, the multiple lines connecting parallel coordinates may be coded (e.g., color coded) to allow the user to easily distinguish between results. In some embodiments, the multiple lines may be weighted in some way to highlight the results of certain experiments over others. As an illustrative example, a line corresponding to an experiment that included values closest to the median of a user's specified range may be highlighted over others.

Figure 27:
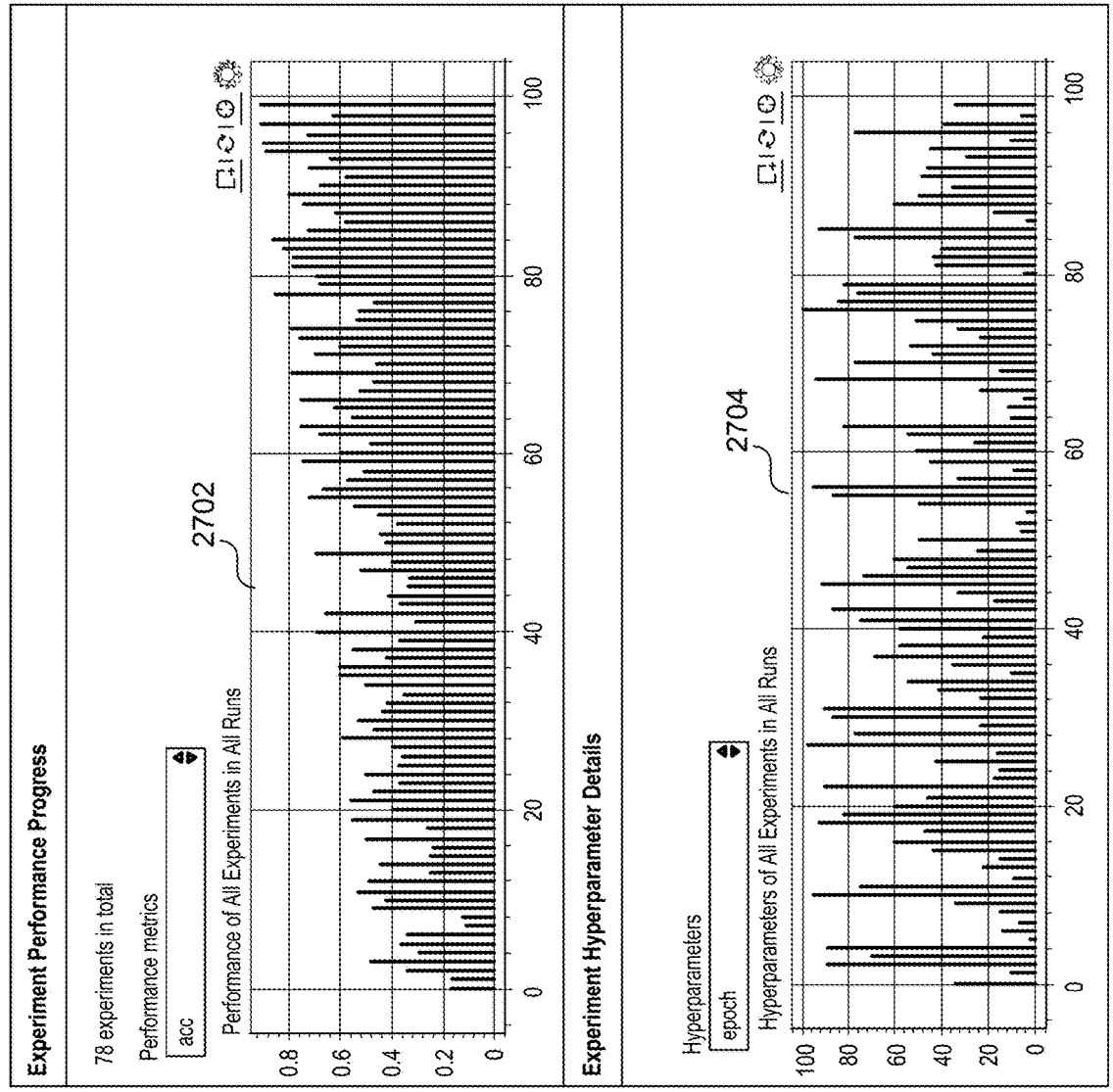
FIG. 27 shows a detail of example interactive bar charts in the example hyperparameter analytics dashboard in the example GUI.

In some embodiments, the hyperparameter analytics dashboard may include other typed of visualizations besides the parallel coordinates graph described with respect to FIGS. 26A-26B. For example, FIG. 27 depicts example visualizations in the form of bar graphs based on results from multiple batches of experiments. Specifically, FIG. 27 depicts a first bar graph 2702 that plots the values of one or more performance metrics across multiple experiments in multiple batches of experiments, and a second bar graph 2704 that plots the values for one or more hyperparameters across multiple experiments in multiple batches of experiments. As with other visualizations, in some embodiments, the example bar graphs 2702 and 2704 are linked to other visualizations in the hyperparameter analytics dashboard. For example, in response to detecting, via the parallel coordinates graph 2602a, a brushing input selecting a range of performance metric values, the bar graphs 2702 and 2704 may be dynamically updated to highlight bar plots corresponding to experiments that resulted in the selected range of values.

In some embodiments, the hyperparameter analytics dashboard may provide GUI mechanisms that allow a user to drill down and compare the ML model outputs from two or more experiments. Consider, for example, a scenario in which a user has narrowed their analysis down to the hyperparameter values from two different experiments. The two experiments may exhibit relative strength in certain performance metrics and relative weakness in others, but without additional information it may be difficult for a user to make an informed selection of one over the other. To address this issue, using a hyperparameter analytics dashboard, a user can select two or more experiments and display side-by-side results.

FIG. 28 shows an example visualization for a side-by-side comparison of multiple experiments. Specifically, the visualization in FIG. 28 includes a first confusion matrix 2802 based on a first experiment displayed next to a second confusion matrix 2804 based on a second experiment. In the illustrative example of a CNN configured to recognize handwritten digits, confusion matrices such as those depicted in FIG. 28 can provide a user with valuable insight into how the model will perform in the real world. For example, the confusion matrices 2802 and 2804 show a particular state in which the user has placed a cursor over a point in the grid corresponding to the number of times a handwritten "2" was misclassified by the respective models as a "6." Images of the misclassified handwritten digits are displayed below. Displaying this additional information from the two experiments side-by-side allows the user to gain insight into how models with different configurations will actually perform in the real world that may not be readily apparent by simply comparing performance metric values. As previously discussed, confusion matrices are example visualization types that may only apply to certain ML model types and ML model goals (e.g., a CNN configured for OCR). Other types of visualizations may be utilized for side-by-side comparison without departing from the scope of this disclosure.

Example Computer Implementation

Figure 29:
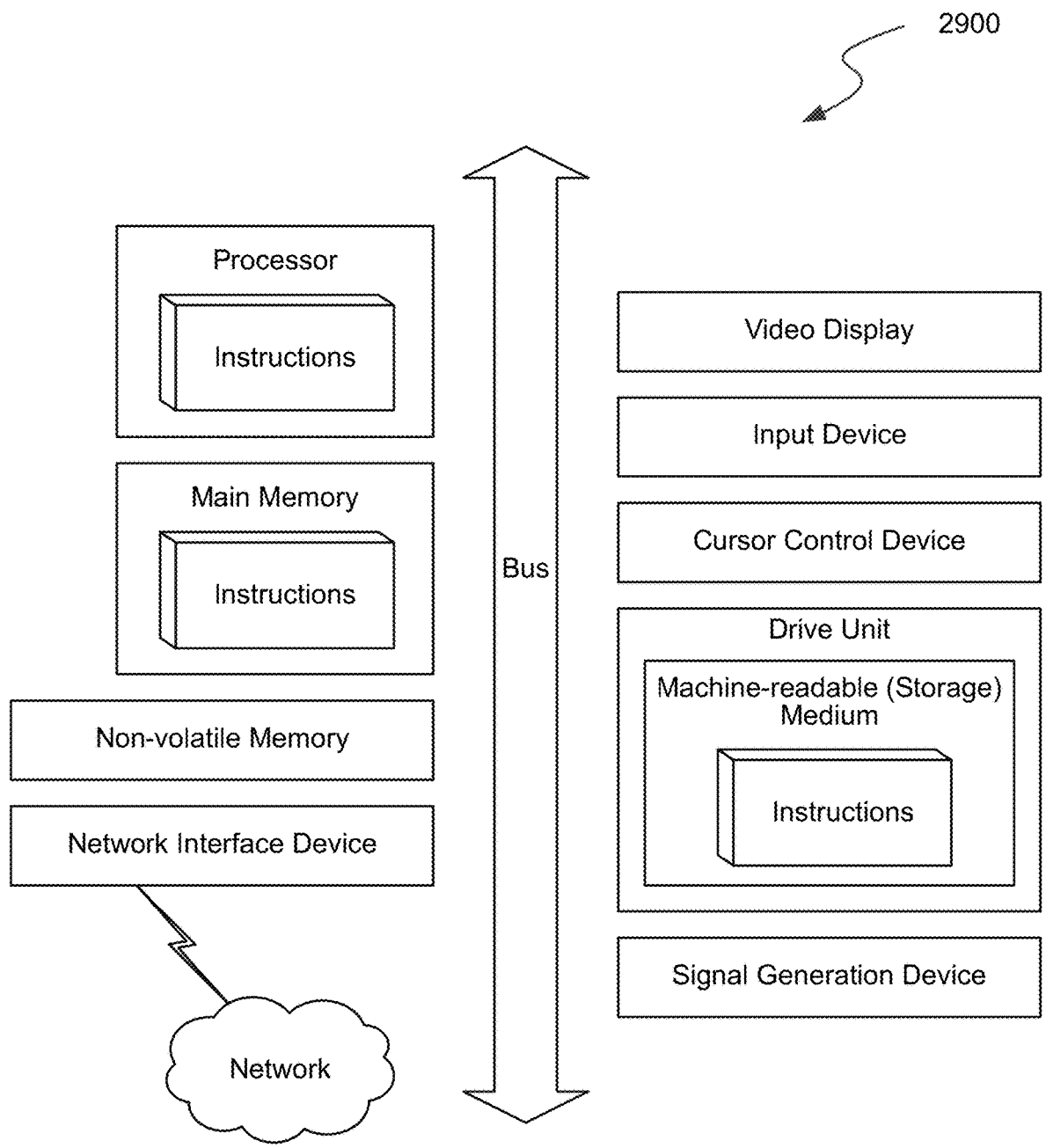
FIG. 29 shows a diagrammatic representation of a machine in the example form of a computer system within which a set of instructions, for causing the machine to perform any one or more of the techniques discussed herein, may be executed.

FIG. 29 shows a diagrammatic representation of a machine in the example form of a computer system within which a set of instructions, for causing the machine to perform any one or more of the techniques discussed herein, may be executed.

In the example of FIG. 29, the computer system 2900 includes a processor, memory, non-volatile memory, and an interface device. Various common components (e.g., cache memory) are omitted for illustrative simplicity. The computer system 2900 is intended to illustrate a hardware device on which any of the components depicted FIGS. 3-8 (and any other components described in this specification) can be implemented. The computer system 2900 can be of any applicable known or convenient type. The components of the computer system 2900 can be coupled together via a bus or through some other known or convenient device.

The processor may be, for example, a conventional microprocessor or central processing unit (CPU) such as an Intel Pentium microprocessor. The processor may also be or include other types of general processors configured or graphical processing such as a graphical processing unit (GPU). The processor may also be a specialized processor such an application-specific integrated circuit (ASIC), for example, implemented in a field programmable gate array (FPGA). One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 29 reside in the interface.

In operation, the computer system 2900 can be controlled by operating system software that includes a file management system, such as a disk operating system. One example of operating system software with associated file management system software is the Windows® operating system and its associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Disclaimers

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The terms "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually affect the distribution.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, mean any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A method for facilitating tuning of machine learning (ML) model hyperparameters using interactive visualizations, the method comprising:
    causing, by a computer system, a user device to display a graphical user interface (GUI), the GUI including a plurality of features for selecting hyperparameters for an ML model;
    receiving, by the computer system from the GUI, a first plurality of hyperparameter values selected by a user;
    determining a first set of experiments based on (1) a number of different hyperparameters to be applied and (2) a number of values for each of the first plurality of hyperparameter values;
    executing the first set of experiments with the ML model applying the first plurality of hyperparameter values;
    causing, by the computer system, the user device to display an interactive visualization representing results of the first set of experiments via the GUI, the interactive visualization including a plurality of plot visualizations comparing one or more hyperparameter values to one or more performance metric values, wherein the plurality of plot visualizations are linked with one another such that a user interaction within a first plot visualization causes a second plot visualization to be dynamically updated to highlight data points in the second plot visualization that are related to the user interaction within the first plot visualization;
    receiving, by the computer system, a command to lock at least one of the first plurality of hyperparameter values, via toggleable features included in the GUI for each of the number of different hyperparameters, based on the interactive visualization of the first set of experiments;
    in response to a user selection of an additional hyperparameter not included in the number of different hyperparameters, determining, by the computer system, a second plurality of hyperparameter values for the additional hyperparameter based on the at least one of the first plurality of hyperparameter values that is toggled to locked;
    executing a second set of experiments with the ML model applying the at least one of the first plurality of hyperparameter values that is toggled to locked and the second plurality of hyperparameter values; and
    training the ML model using final values selected for the number of different hyperparameters and the additional hyperparameter based at least on the first set of experiments and the second set of experiments.

2. The method of claim 1, wherein user interaction within the first plot visualization that causes the second plot visualization to be dynamically updated includes a selection of any of:
    a subset of the first set of experiments;
    a subset of the first plurality of hyperparameter values; or
    a subset of the one or more performance metric values.

3. The method of claim 1, wherein the user interaction within the first plot visualization that causes the second plot visualization to be dynamically updated includes a brushing input.

4. The method of claim 1, wherein the interactive visualization for the first set of experiments includes a display of a subset of the first plurality of hyperparameter values and performance metric values associated with a given experiment.

5. The method of claim 4, wherein the plurality of plot visualizations includes an epoch observatory visualization that dynamically plots a progression of a particular performance metric over a plurality of epochs during the given experiment in response to user interaction.

6. The method of claim 1, wherein the plurality of plot visualizations includes a scatter plot matrix, the scatter plot matrix comprising:
a plurality of scatter plot visualizations arranged in columns and rows based on hyperparameters and performance metric values, each of the plurality of scatter plot visualizations including a plot of value pairs for a particular combination of hyperparameter and performance metric for each of the first set of experiments.

7. The method of claim 1, wherein the plurality of plot visualizations includes a chart that plots values for a user-selectable performance metric resulting from each of the first set of experiments.

8. The method of claim 1, wherein executing the first set of experiments includes:
processing a dataset to train the ML model configured based on a particular combination of the first plurality of hyperparameter values; and
generating the one or more performance metric values based on the processing.

9. The method of claim 1, wherein each of the first set of experiments is associated with versioned hyperparameter value inputs and performance metric outputs.

10. The method of claim 1, wherein each of the first set of experiments is executed in a distributed computing cluster.

11. The method of claim 10, wherein each of the first set of experiments is executed in a different resource container in the distributed computing cluster.

12. The method of claim 1, wherein any one or more of the first plurality of hyperparameter values, the second plurality of hyperparameter values, and the one or more performance metric values are continuous values, discrete values, and/or categorical values.

13. The method of claim 1, further comprising:
before executing the second set of experiments:
causing, by the computer system, the user device to display in the GUI an option to select from a plurality of different execution computer systems to execute the second set of experiments, the plurality of different execution computer systems including a premises computing cluster and one or more cloud-based computing clusters;
receiving, by the computer system, via the displayed option, a selection of a particular execution computer system from the plurality of different execution computer systems; and
causing the particular execution computer system to execute the second set of experiments.

14. The method of claim 1, further comprising:
determining, by the computer system, a proposed plurality of experiments to include in the second set of experiments based on the second plurality of hyperparameter values;
causing, by the computer system, the user device to display via the GUI an interactive listing of the proposed plurality of experiments; and
receiving, by the computer system, via the interactive listing, a selection by the user of experiments from the proposed plurality of experiments;
wherein the second set of experiments includes the experiments selected by the user.

15. The method of claim 14, further comprising:
determining, by the computer system, if any of the proposed plurality of experiments have already been executed; and
causing display, by the computer system, in the interactive listing, of an indication of which of the proposed plurality of experiments have already been executed based on the determining.

16. The method of claim 14, further comprising:
determining, by the computer system, a cost associated with executing the proposed plurality of experiments, the cost including any of resource utilization cost, monetary cost, and/or time cost; and
causing, by the computer system, the user device to display in the interactive listing an indication of the cost associated with executing the proposed plurality of experiments based on the determination of the cost.

17. The method of claim 16, wherein the determined cost includes:
a first cost associated with executing the proposed plurality of experiments using a first execution computer system; and
a second cost associated with executing the proposed plurality of experiments using a second execution computer system, the second execution computer system different than the first execution computer system;
wherein the indication of cost displayed in the interactive listing includes an option that enables the user to select the first execution computer system and/or second execution computer system to execute one or more of the proposed plurality of experiments.

18. The method of claim 16, wherein determining the cost includes:
analyzing, by the computer system, previously executed experiments.

19. The method of claim 14, further comprising:
determining, by the computer system, a constraint based on any of available computing resources to execute experiments, cost to execute experiments, and/or time to execute experiments;
determining, by the computer system, an optimal plurality of experiments to include in the second set of experiments based on the constraint; and
causing, by the computer system, the user device to display in the interactive listing a recommendation to the user based on the optimal plurality of experiments to include in the second set of experiments.

20. The method of claim 1, wherein the second plurality of hyperparameter values are determined based on a function-fitting analysis of the results of the first set of experiments with the first plurality of hyperparameter values.

21. The method of claim 20, wherein the function-fitting analysis is performed by the computer system on a data pattern within the results of the first set of experiments that is selected via the user interaction within the first plot visualization.

22. The method of claim 21, wherein the selected data pattern is indicative of a relationship between one or more pairs of hyperparameter and performance metric values.

23. The method of claim 21, wherein the user interaction with the first plot visualization includes a user-drawn line indicative of the selected data pattern.

24. The method of claim 1, further comprising:
generating, by the computer system, the ML model based on the first plurality of hyperparameter values.

25. The method of claim 24, wherein the ML model is any of a neural network, a classifier, or a clustering model.

26. The method of claim 1, wherein the hyperparameters for the ML model include any of batch size, number of epochs, dropout rate, learning rate, number of layers, number of clusters, number of trees, or depth.

27. The method of claim 1, wherein performance metrics include any of accuracy, loss, area under curve, or error.

28. A computer system for facilitating tuning of machine learning (ML) model hyperparameters using interactive visualizations, the computer system comprising:
at least one processor; and
at least one memory coupled to the at least one processor, the at least one memory including instructions stored thereon, which when executed by the at least one processor, cause the computer system to:
cause a user device to display a graphical user interface (GUI), the GUI including a plurality of features for selecting hyperparameters for an ML model;
receive, from the GUI, a first plurality of hyperparameter values selected by a user;
determine a first proposed set of experiments based on (1) a number of different hyperparameters to be applied and (2) a number of values for each of the first plurality of hyperparameter values;
execute the first set of experiments with the ML model applying the first plurality of hyperparameter values;
cause, by the computer system, the user device to display an interactive visualization representing results of the first set of experiments via the GUI, the interactive visualization including a plurality of plot visualizations comparing one or more hyperparameter values to one or more performance metric values, wherein the plurality of plot visualizations are linked with one another such that a user interaction within a first plot visualization causes a second plot visualization to be dynamically updated to highlight data points in the second plot visualization that are related to the user interaction within the first plot visualization;
receive, by the computer system, a command to lock at least one of the first plurality of hyperparameter values, via toggleable features included in the GUI for each of the number of different hyperparameters, based on the interactive visualization of the first set of experiments;
in response to a user selection of an additional hyperparameter not included in the number of different hyperparameters, determine a second plurality of hyperparameter values for the additional hyperparameter based on the at least one of the first plurality of hyperparameter values that is toggled to locked;
execute a second set of experiments with the ML model applying the at least one of the first plurality of hyperparameter values that is toggled to locked and the second plurality of hyperparameter values; and
train the ML model using final values selected for the number of different hyperparameters and the additional hyperparameter based at least on the first set of experiments and the second set of experiments.

29. A non-transitory computer-readable medium storing instructions, execution of which by at least one processor of a computer system causes the computer system to:
cause a user device to display a graphical user interface (GUI), the GUI including a plurality of features for selecting hyperparameters for an ML model;
receive, from the GUI, a first plurality of hyperparameter values selected by a user;
determine a first set of experiments based on (1) a number of different hyperparameters to be applied and (2) a number of values for each of the first plurality of hyperparameter value;
execute the first set of experiments with the ML model applying the first plurality of hyperparameter values;
cause, by the computer system, the user device to display an interactive visualization representing results of the first set of experiments via the GUI, the interactive visualization including a plurality of plot visualizations comparing one or more hyperparameter values to one or more performance metric values, wherein the plurality of plot visualizations are linked with one another such that a user interaction within a first plot visualization causes a second plot visualization to be dynamically updated to highlight data points in the second plot visualization that are related to the user interaction within the first plot visualization;
receive, by the computer system, a command to lock at least one of the first plurality of hyperparameter values, via toggleable features included in the GUI for each of the number of different hyperparameters, based on the interactive visualization of the first set of experiments;
in response to a user selection of an additional hyperparameter not included in the number of different hyperparameters, determine a second plurality of hyperparameter values for the additional hyperparameter based on the at least one of the first plurality of hyperparameter values that is toggled to locked;
execute a second set of experiments with the ML model applying the at least one of the first plurality of hyperparameter values that is toggled to locked and the second plurality of hyperparameter values; and
train the ML model using final values selected for the number of different hyperparameters and the additional hyperparameter based at least on the first set of experiments and the second set of experiments.

* * * * *